(12) United States Patent
Hattori et al.

(10) Patent No.: US 12,549,816 B2
(45) Date of Patent: Feb. 10, 2026

(54) INFORMATION PROCESSING DEVICE AND INFORMATION PROCESSING METHOD

(71) Applicant: SONY GROUP CORPORATION, Tokyo (JP)

(72) Inventors: Takafumi Hattori, Tokyo (JP); Rina Kotani, Tokyo (JP); Shiro Suzuki, Tokyo (JP); Yuuki Matsumura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/686,744

(22) PCT Filed: Mar. 10, 2022

(86) PCT No.: PCT/JP2022/010483
§ 371 (c)(1),
(2) Date: Feb. 26, 2024

(87) PCT Pub. No.: WO2023/042436
PCT Pub. Date: Mar. 23, 2023

(65) Prior Publication Data
US 2025/0142169 A1    May 1, 2025

(30) Foreign Application Priority Data
Sep. 16, 2021    (JP) .................................. 2021-150880

(51) Int. Cl.
*H04N 21/47*       (2011.01)
(52) U.S. Cl.
CPC .................................. *H04N 21/47* (2013.01)

(58) Field of Classification Search
CPC .............................. H04N 21/47; H04L 67/02
See application file for complete search history.

(56) References Cited

U.S. PATENT DOCUMENTS

| | | | |
|---|---|---|---|
| 2008/0028294 A1* | 1/2008 | Sell | G06F 15/00 |
| 2014/0255002 A1* | 9/2014 | Baldwin | H04N 5/93 |

FOREIGN PATENT DOCUMENTS

| | | |
|---|---|---|
| JP | 2013-021466 A | 1/2013 |
| JP | 2015-109505 A | 6/2015 |
| JP | 2017-151978 A | 8/2017 |

(Continued)

OTHER PUBLICATIONS

International Search Report and Written Opinion of PCT Application No. PCT/JP2022/010483, issued on May 24, 2022, 09 pages of ISRWO.

(Continued)

*Primary Examiner* — Anthony Bantamoi
(74) *Attorney, Agent, or Firm* — CHIP LAW GROUP

(57) ABSTRACT

Provided is an information processing device that includes a reception unit that receives reaction information indicating a reaction of another user, generated by each of a plurality of other terminals different from an own terminal and a generation unit that generates a presented video or a presented voice corresponding to a plurality of the reactions of the other users, on a basis of a plurality of pieces of the reaction information and environment information indicating an environment of the own terminal. The present technology is applicable to a remote live system.

19 Claims, 43 Drawing Sheets

(56) References Cited

FOREIGN PATENT DOCUMENTS

| | | |
|---|---|---|
| JP | 2019-050576 A | 3/2019 |
| JP | 2019-192178 A | 10/2019 |
| JP | 2020-009027 A | 1/2020 |
| JP | 2020-194030 A | 12/2020 |

OTHER PUBLICATIONS

"Beyond Live", The beginning of a new performance culture, Jun. 22, 2021, URL:https://campaign.naver.com/pr/v/beyondlive/ja/.

* cited by examiner

FIG. 8

| PERFORMER TERMINAL + RECORDING/ DISTRIBUTION DEVICE | RECEPTION INFORMATION | TRANSMISSION INFORMATION |
|---|---|---|
| | PERIOD INFORMATION OF A TO C | DISTRIBUTION VIDEO/VOICE |
| SPECTATOR TERMINAL 11A | DISTRIBUTION VIDEO/VOICE + PERIOD INFORMATION OF B AND C | PERIOD INFORMATION OF A |
| SPECTATOR TERMINAL 11B | DISTRIBUTION VIDEO/VOICE + PERIOD INFORMATION OF A AND C | PERIOD INFORMATION OF B |
| SPECTATOR TERMINAL 11C | DISTRIBUTION VIDEO/VOICE + PERIOD INFORMATION OF A AND B | PERIOD INFORMATION OF C |

FIG. 18
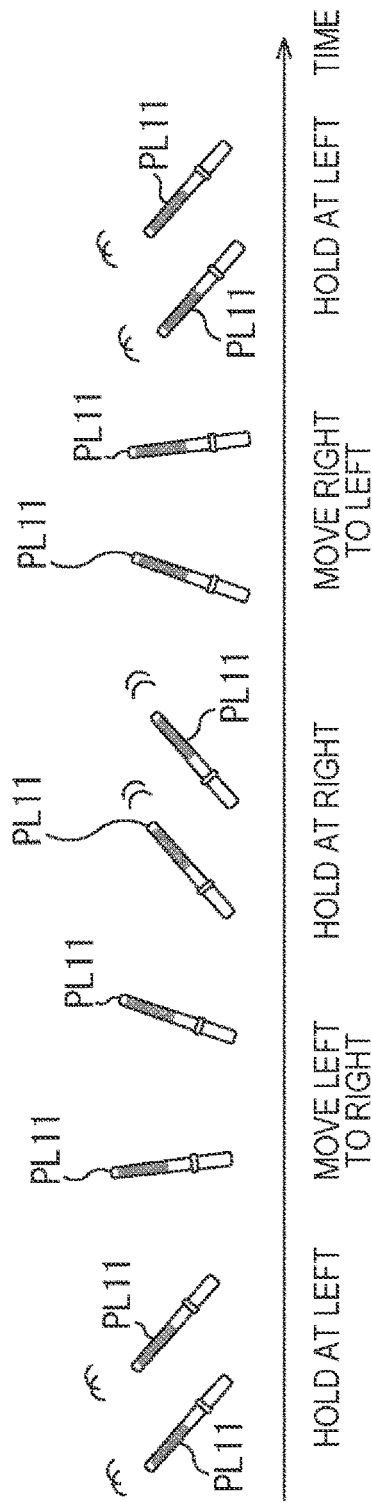
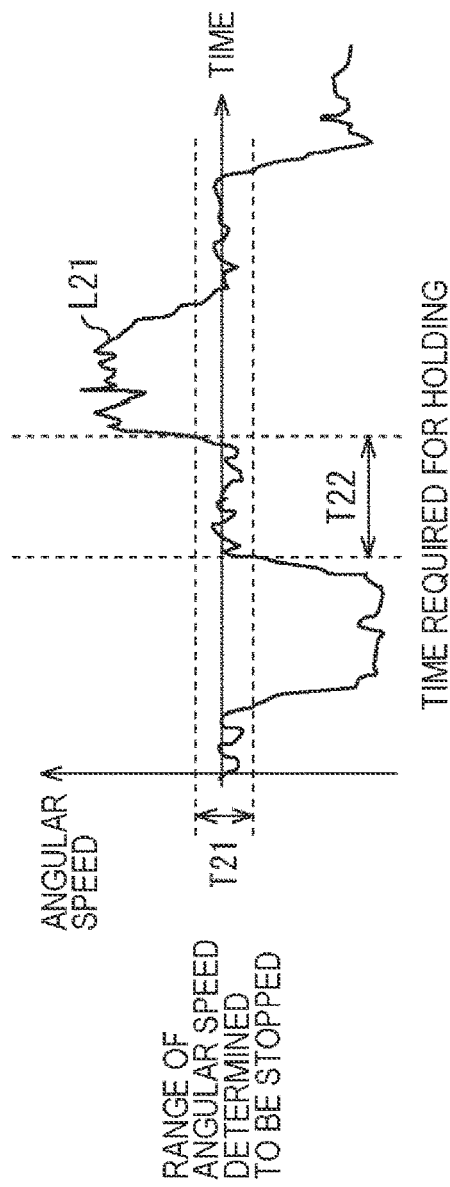

FIG. 26

| PERIOD INFORMATION ID | ANGLE | IMMEDIATELY PRECEDING HALF PERIOD [SECONDS] | DIFFERENCE FROM PERIOD INFORMATION 0 (OWN TERMINAL) |
|---|---|---|---|
| 0 (OWN TERMINAL) | 110° | 1.1 | N/A |
| 1 | 120° | 1.2 | +0.1 |
| 2 | 60° | 2.2 | +1.1 |
| 3 | 130° | 0.9 | −0.2 |
| 4 | 135° | 1.7 | +0.6 |

⇧ SELECT PERIOD INFORMATION 1 OF WHICH LENGTH OF HALF PERIOD IS CLOSEST, AS FIRST ONE

⇧ SELECT PERIOD INFORMATION 3 OF WHICH LENGTH OF HALF PERIOD IS SECOND CLOSEST, AS SECOND ONE

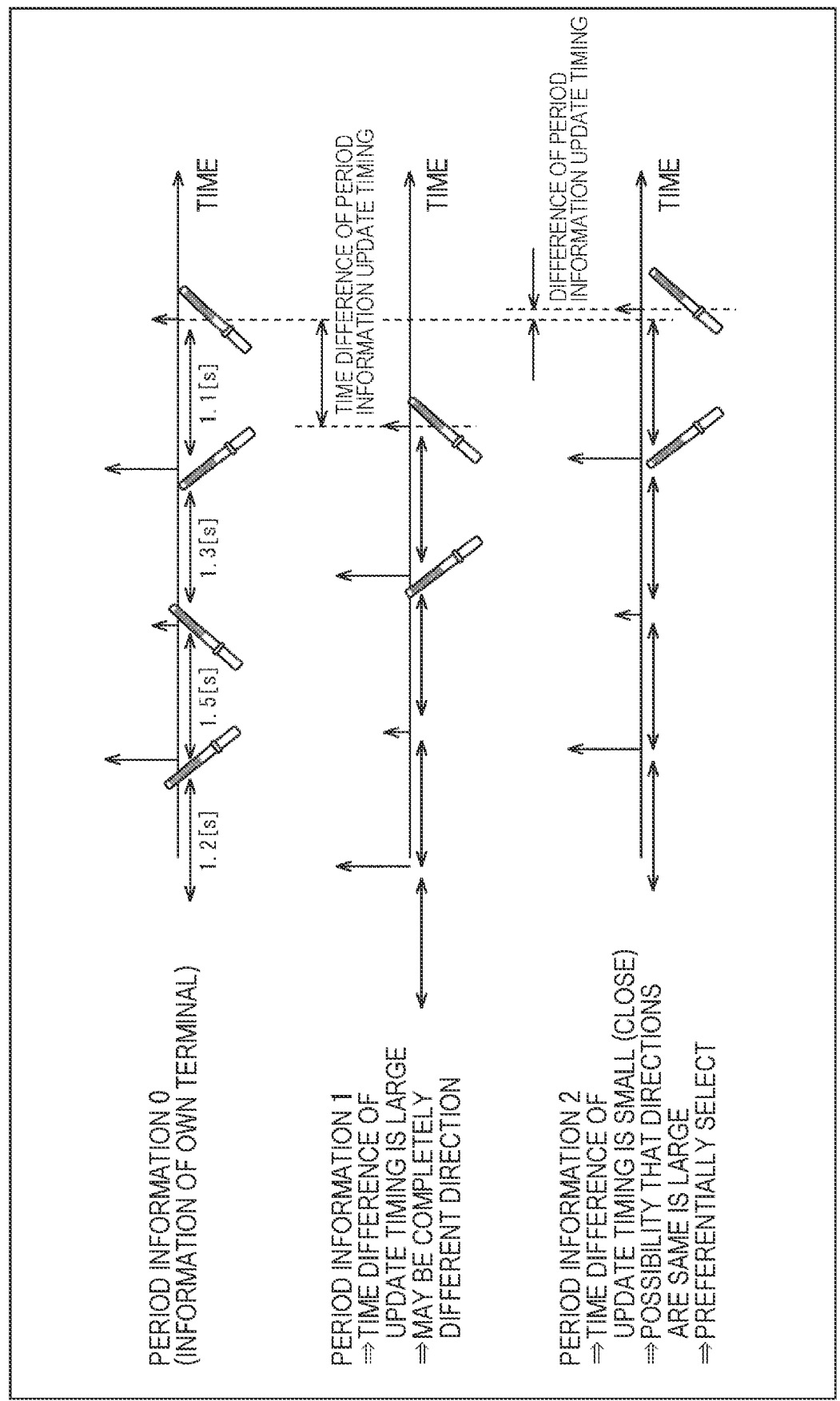

FIG. 28

VARIANCE OF HALF PERIOD IS SMALL → MOVEMENT FOR SWINGING LEFTWARD AND RIGHTWARD AT CERTAIN INTERVALS, HIGH PERIODICITY → EASY TO USE FOR REACTION VIDEO GENERATION → PRIORITIZE

| | ANGLE | HALF PERIOD [SECONDS] |
|---|---|---|
| OLD | 110° | 1.2 |
| | 60° | 1.5 |
| | 115° | 1.3 |
| NEW | 60° | 1.1 |

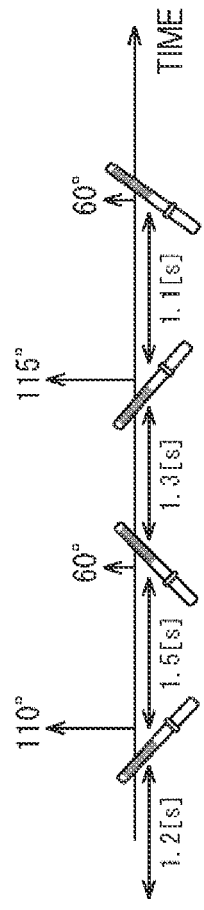

IMAGE OF MOTION

VARIANCE OF HALF PERIOD IS LARGE → MOTIONS VARY AND PERIODICITY IS LOW → HARD TO USE FOR REACTION VIDEO GENERATION

| | ANGLE | HALF PERIOD [SECONDS] |
|---|---|---|
| OLD | 110° | 1.2 |
| | 55° | 0.3 |
| | 120° | 1.1 |
| NEW | 40° | 2.7 |

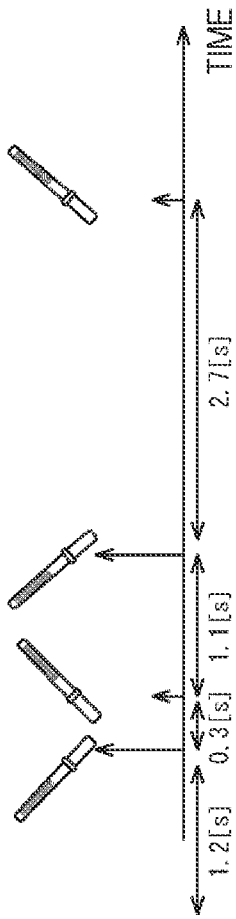

IMAGE OF MOTION

FIG. 29

| OBJECT ID | PERIOD INFORMATION ID | NOTE |
|---|---|---|
| 1 TO 25 | i = 7 | INFORMATION OF SPECTATOR TERMINAL 11G |
| 26 TO 35 | j = 2 | INFORMATION OF SPECTATOR TERMINAL 11B |
| 36 TO 50 | k = 13 | INFORMATION OF SPECTATOR TERMINAL 11M |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/010483 filed on Mar. 10, 2022, which claims priority benefit of Japanese Patent Application No. JP 2021-150880 filed in the Japan Patent Office on Sep. 16, 2021. Each of the above-referenced applications is hereby incorporated herein by reference in its entirety.

TECHNICAL FIELD

The present technology relates to an information processing device, method, and program, and more particularly, to an information processing device, method, and program that can present a video or a voice with less uncomfortable feeling.

BACKGROUND ART

In recent years, a large number of remote live events are held. However, it is difficult for a spectator to obtain feeling of participating in the event or obtain a sense of unity of the live.

Therefore, a method is proposed for sensing a reaction of a spectator by a head mounted display, an acceleration sensor, or the like and converting information obtained by sensing into motion information or the like and transmitting the information to a terminal of another person, and at the same time, receiving a reaction of the other person transmitted by the similar method. In this method, by presenting the received reaction of the other person as a video in which an object such as a penlight or an avatar moves, it is possible to induce participation feeling of the spectator in the event.

For example, in a case where a video indicated by an arrow Q11 in FIG. 1 is distributed, if a video in which the object moves indicated by an arrow Q12 is generated from the motion information indicating the reaction of the other person received by an own terminal, it is possible to superimpose the video in which the object moves on a video distributed as indicated by an arrow Q13 and to present the video. In this way, it is possible to induce the participation feeling of the spectator who is viewing the video of the live or the like with the own terminal in the event.

As such a technique, for example, Patent Document 1 discloses a method for implementing concept described with reference to FIG. 1 in a live event in a virtual space.

Specifically, a system including head mounted displays (HMD) worn by the spectators and various sensors presents a video of the live event held in the virtual space to the spectators and senses motions of the spectators, and the sensing result is transmitted to a server as position information and motion information. At the same time, motion information or the like obtained from other spectators is received from the server, and a video in which an avatar corresponding to the other spectator moves in the virtual space is presented using the motion information or the like.

Furthermore, Patent Document 2 discloses a method for presenting a reaction of a spectator who remotely participates in the live event on a display installed in a live event venue, in a case where people can participate in the live event in a real venue and remotely.

That is, the reaction of the spectator who remotely participates in the live event is sensed and is transmitted to the live venue as movement information, and a video in which an object moves is generated on the basis of the movement information. A performer who performs a program and the spectator in the live venue can confirm the reaction of the spectator who remotely participates, by viewing the video on the display installed in the venue, and feeling of creating the live together with the spectator who remotely participates is induced.

Non-Patent Document 1 discloses a system similar to that in a case of Patent Document 2, in which a reaction of a spectator imaged by a camera is transmitted to the live venue, and a state in the live venue is displayed. This situation is redistributed to the spectator as the distribution video.

In addition, a method for temporarily storing reaction information of the other person with the server and retransmitting reaction information to all terminals at the same timing (for example, refer to Patent Document 3) and a method for generating a reaction video with the server and distributing the reaction video to each terminal (for example, refer to Patent Document 4) are proposed.

CITATION LIST

Patent Document

Patent Document 1: Japanese Patent Application Laid-Open No. 2019-50576
Patent Document 2: Japanese Patent Application Laid-Open No. 2013-21466
Patent Document 3: Japanese Patent Application Laid-Open No. 2019-192178
Patent Document 4: Japanese Patent Application Laid-Open No. 2020-194030

Non-Patent Document

Non-Patent Document 1: "Beyond LIVE", [online], retrieved on Jun. 22, 2021, the Internet <URL:https://campaign.naver.com/pr/v/beyondlive/ja/>

SUMMARY OF THE INVENTION

Problems to be Solved by the Invention

However, with the above techniques, it has not been possible to present a video and a voice with less uncomfortable feeling.

For example, in the techniques described in Patent Documents 1 and 2 and Non-Patent Document 1, different delays depending on a communication path are caused in received reaction information (movement information, motion information, or the like) from other spectator, presented reactions of the respective spectators are deviated regardless of intentions. As a result, there is a possibility that it is not possible to achieve an original purpose for increasing participation feeling of the spectator in the event and obtaining the sense of unity of the live. The same applies to Patent Document 4.

Furthermore, for example, in Patent Document 3, when the reaction information is retransmitted to all the terminals after synchronizing timings by the server, since it is necessary to synchronize the timings with the terminal with a large delay amount, a delay of the reaction information increases. Therefore, it is difficult for the technique described in Patent Document 3 to practically adapt to the live of a large number of people.

The present technology has been made in view of such a situation and makes it possible to present a video or a voice with less uncomfortable feeling.

Solutions to Problems

An information processing device according to one aspect of the present technology includes a reception unit that receives reaction information indicating a reaction of another user, generated by each of a plurality of other terminals different from an own terminal and a generation unit that generates a presented video or a presented voice corresponding to a plurality of the reactions of the other users, on the basis of a plurality of pieces of the reaction information and environment information indicating an environment of the own terminal.

An information processing method or program according to one aspect of the present technology includes steps for receiving reaction information indicating a reaction of another user, generated by each of a plurality of other terminals different from an own terminal and generating a presented video or a presented voice corresponding to a plurality of the reactions the other users, on the basis of a plurality of pieces of the reaction information and environment information indicating an environment of the own terminal.

In one aspect of the present technology, reaction information indicating a reaction of another user generated by each of a plurality of other terminals different from an own terminal is received, and a presented video or a presented voice corresponding to a plurality of the reactions of the other users is generated on the basis of a plurality of pieces of the reaction information and environment information indicating an environment of the own terminal.

BRIEF DESCRIPTION OF DRAWINGS

FIG. 8 is a diagram for explaining transmission information and reception information.
FIG. 18 is a diagram for explaining a holding motion.
FIG. 26 is a diagram for explaining selection of the period information based on own terminal period information.
FIG. 27 is a diagram for explaining the selection of the period information based on the own terminal period information.
FIG. 28 is a diagram for explaining selection of the period information based on a half period variance.
FIG. 29 is a diagram illustrating an example of a correspondence table.

MODE FOR CARRYING OUT THE INVENTION

Hereinafter, embodiments to which the present technology is applied will be described with reference to the drawings.

First Embodiment

<Generation of Deviation of Reactions>

As described above, in a general system for receiving a reaction of another person and presenting the reaction of the other person as a video in which an object such as a penlight or an avatar moves, since a delay depending on a communication path is generated at the time of reception of the reaction of the other person, the presented reactions of the respective spectators are deviated regardless of intentions.

An example of such a deviation of the reactions of the others (spectator) will be described with reference to FIGS. 2 to 5.

Note that there are actually a large number of spectators. However, for convenience of illustration, only three spectators A to C are illustrated. Furthermore, for easy description, the "spectator" includes a person, and in addition, a terminal corresponding to each individual that has a function, for presenting a distribution video or transmitting a sensed reaction to the others. Similarly, a "performer" includes a person, and in addition, a distributor who records a video/sound of a program performed by the performer and transmitting the recorded video/sound to a server.

Figure 1:
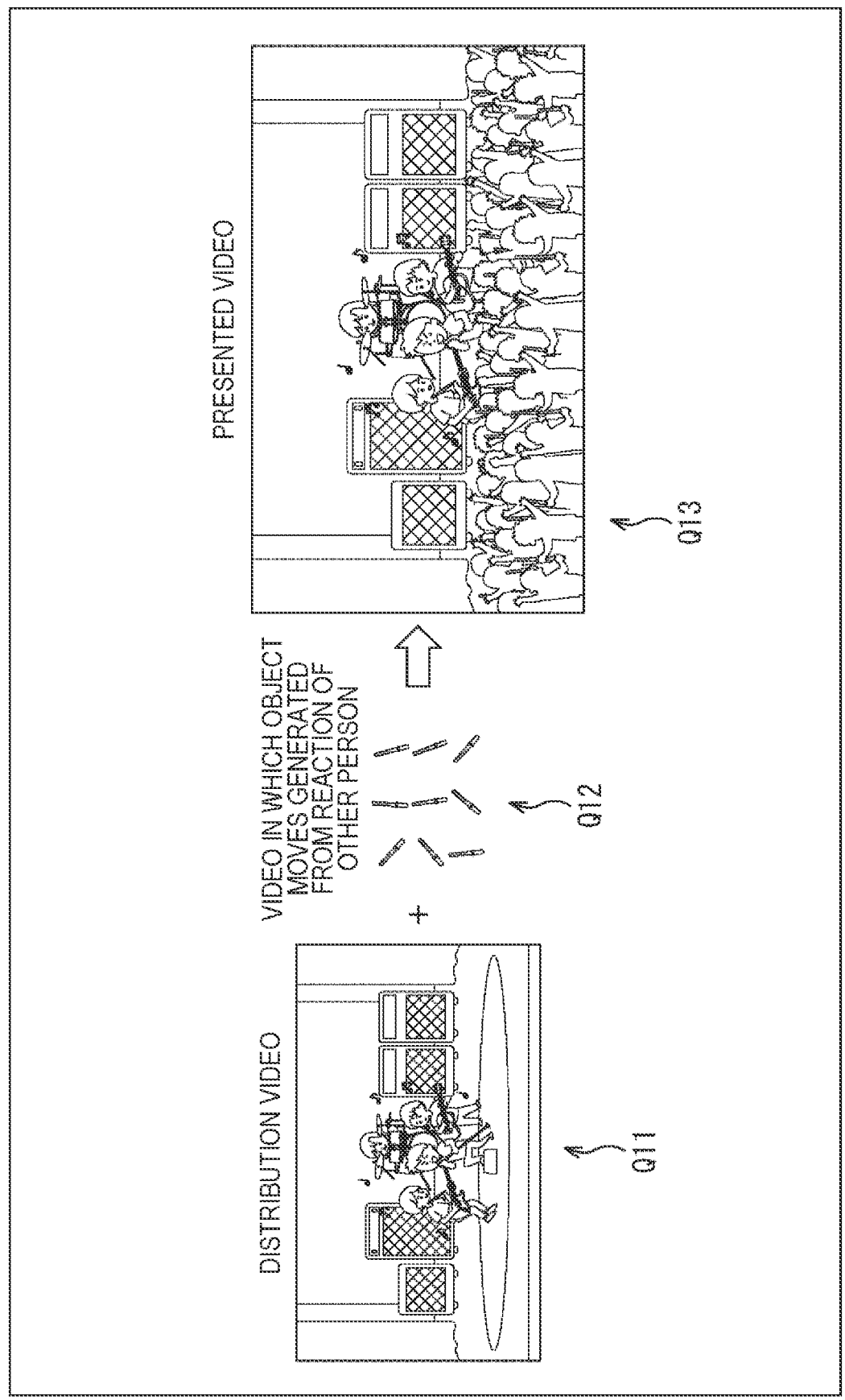
FIG. 1 is a diagram for explaining superimposition of a video generated from a reaction of another person.
Figure 2:
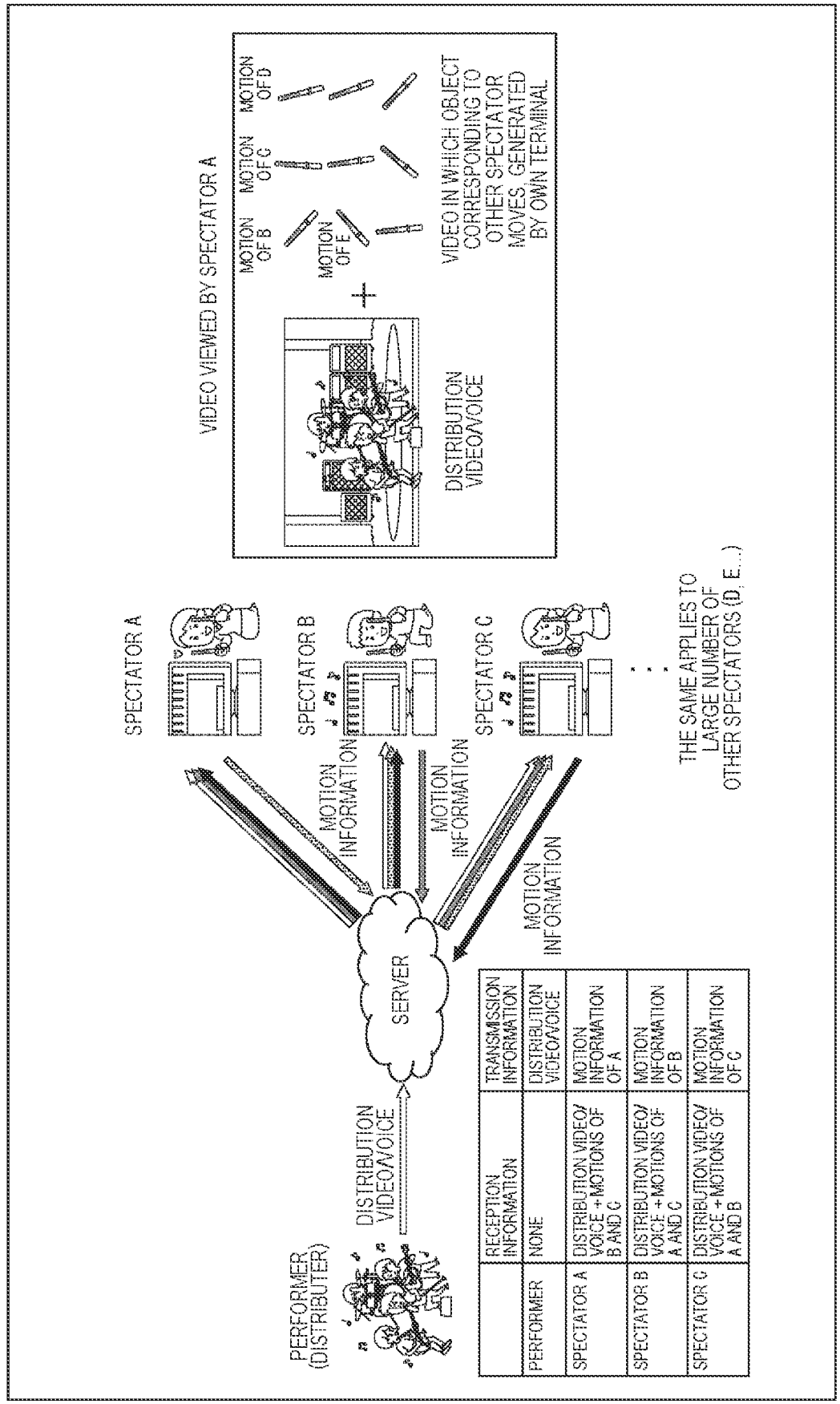
FIG. 2 is a diagram for explaining a system described in Patent Document 1.
Figure 3:
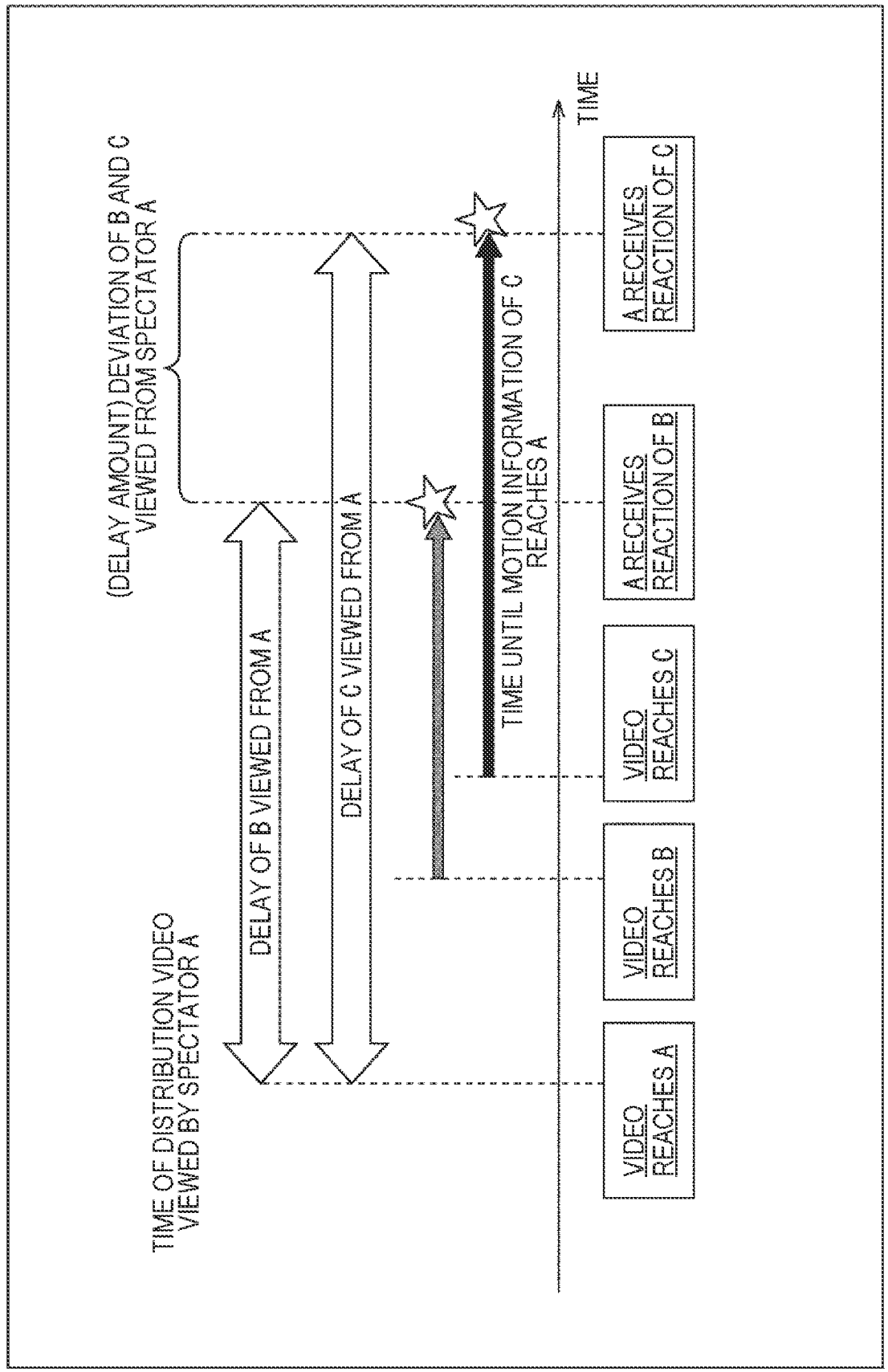
FIG. 3 is a diagram for explaining a deviation of reactions of spectators.

FIGS. 2 and 3 describe a system described in Patent Document 1 described above.

FIG. 2 illustrates a system described in Patent Document 1, simplified for description. In this system, the performer records a video/sound of the program, transmits the recorded video/sound as a distribution video/voice to the server, and each spectator receives the distribution video/voice from the server.

Each spectator senses the own reaction while viewing and listening to the distribution video/voice and transmits the video/voice to another spectator as motion information. At the same time, each spectator side receives motion information of the large number of other spectators, generates a video or a voice corresponding to the reaction of the other person using these pieces of motion information, superimposing the generated video/voice on the distribution video/voice, and presents the video/voice to the spectator.

For example, the spectator A views a video in which the reactions of the large number of other spectators such as other persons, that is, the spectators B and C, are superimposed as a video in which an object (avatar) is moving, in addition to the distribution video/voice.

However, in this system, for example, as illustrated in FIG. 3, due to a communication path delay different for each spectator, the reactions (motion information) of the other persons viewed from the spectator deviate.

FIG. 3 is a timing chart illustrating how much reactions of the other persons notified from the spectator A, that is, reactions of the spectators B and C are delayed as viewed from the spectator A, with a timing when the spectator A receives the distribution video at a certain time as a starting point.

In the system in FIG. 2, since the communication path delay different for each spectator is generated, times when the distribution video at the certain time reach the spectators A to C are different from each other. Furthermore, times when the reactions of the spectators B and C reach the spectator A are different from each other. Therefore, the reactions of the spectators B and C are delayed from the video viewed by the spectator A, and in addition, the delay amounts are different. Therefore, the reactions of the spectators B and C viewed from the spectator A are deviated with no intention.

Figure 4:
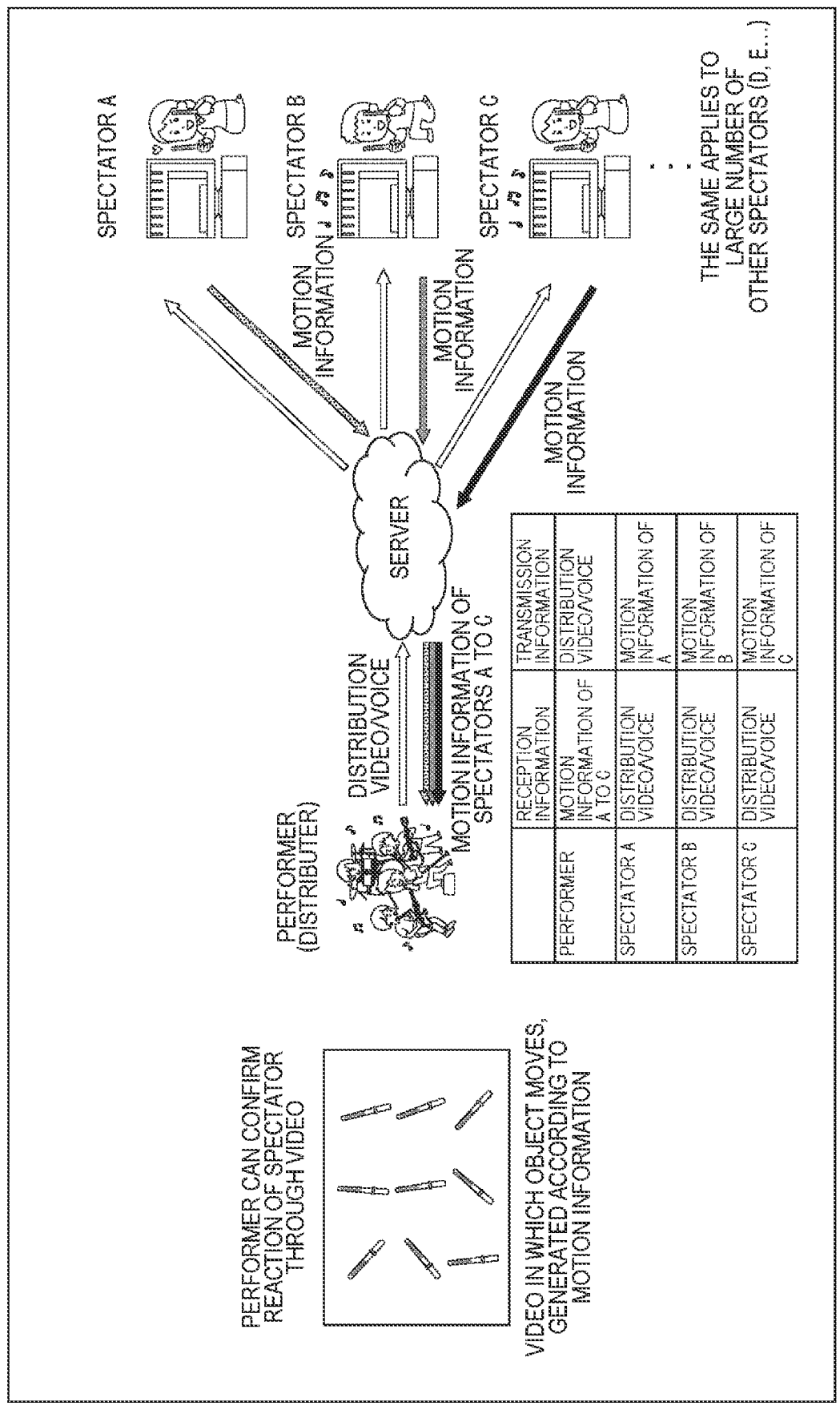
FIG. 4 is a diagram for explaining a system described in Patent Document 2.
Figure 5:
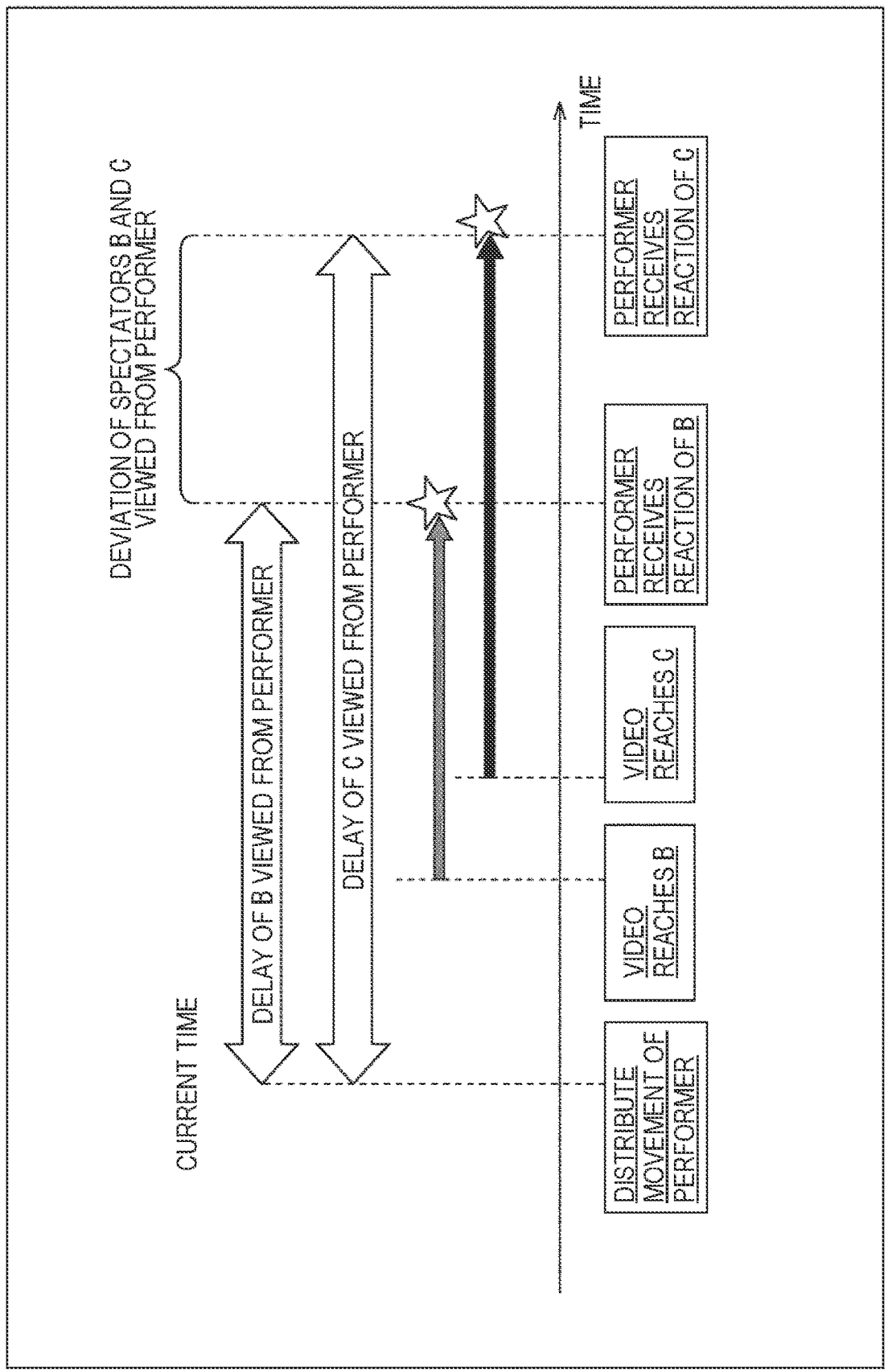
FIG. 5 is a diagram for explaining the deviation of the reactions of the spectators.

FIGS. 4 and 5 describe a system described in Patent Document 2.

In FIG. 4, the system described in Patent Document 2 simplified for description is illustrated. Although this system is close to the system illustrated in FIG. 2, a point is different that the motion information is notified only to the performer (live venue) as the reaction of the spectator is different from the system in FIG. 2.

That is, in the system illustrated in FIG. 4, the distribution video/voice obtained by recording the program by the performer is distributed to each spectator with the server. Furthermore, the motion information obtained by sensing performed by each spectator side is transmitted to the performer, and the motion information of each spectator is used to generate and present the video in which the object moves, on the performer side.

In such a system illustrated in FIG. 4, the reactions of the other persons viewed from the performer are deviated. This is because, for example, as illustrated in FIG. 5, in the timing chart in which the performer performs a certain movement and a timing when the state of the movement is distributed is set as a starting point, a relationship completely similar to the example described with reference to FIG. 3 is caused between the performer and the spectators B and C.

Note that, as described in Patent Document 4, in a case where a video corresponding to the reaction of the other person is generated by the server and the generated video is superimposed on the distribution video and distributed, a similar reaction deviation is generated. This is because, if the "performer" in FIG. 5 is replaced with the "server", a relationship completely similar to that in the example in FIG. 5 is caused between the server and the spectators B and C.

As described above, the sense of unity of the live is impaired due to the "deviation of the reactions of the other persons viewed from oneself". The state is described with reference to FIG. 6.

Figure 6:
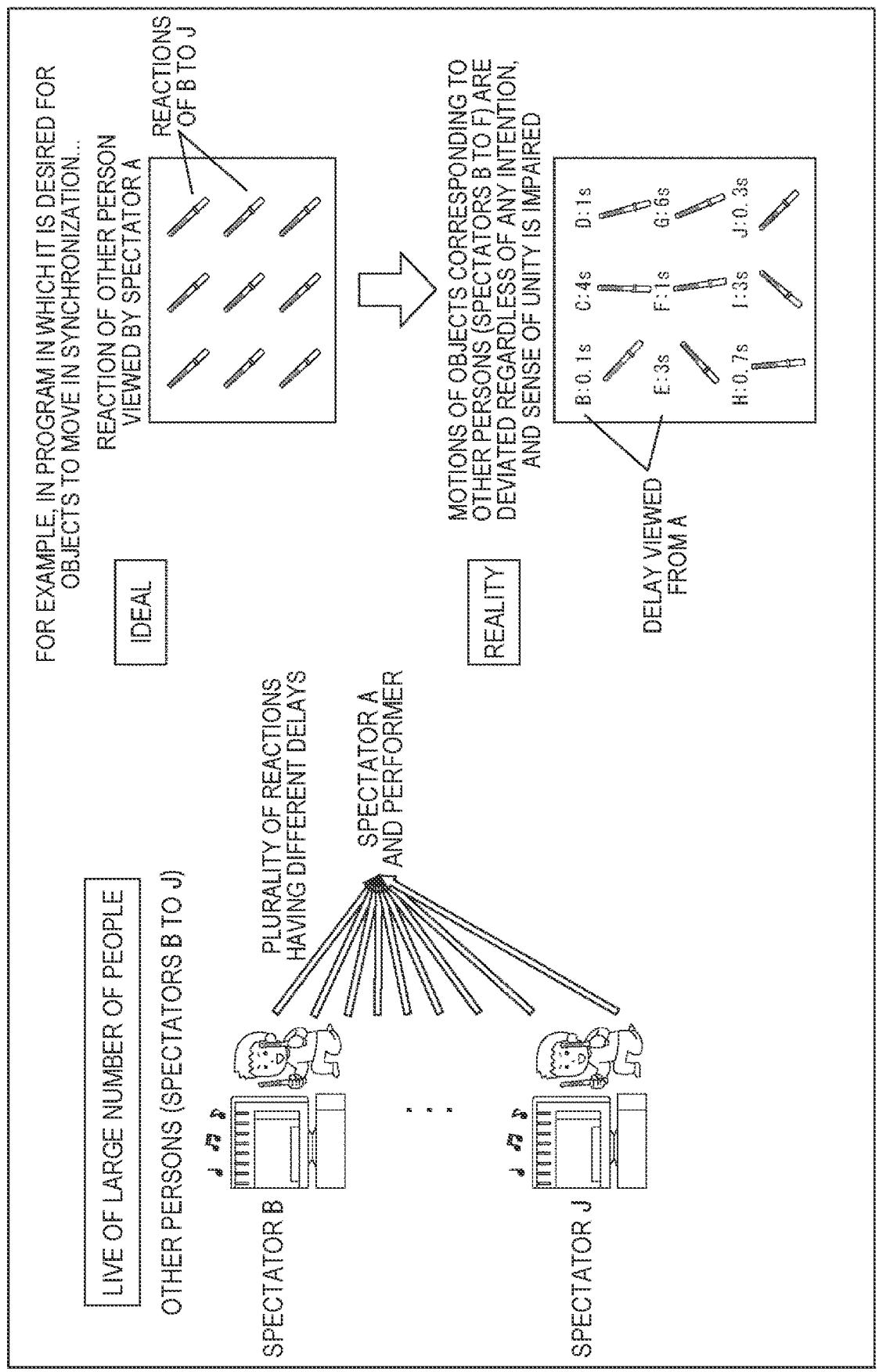
FIG. 6 is a diagram for explaining an example in which a sense of unity is destroyed by the deviation of in the reaction.

When a live with a large number of people is assumed, as illustrated on the left side in FIG. 6, for example, reactions from other spectators B to J to the spectator A have different delays.

Therefore, the video indicating the reactions of the other persons viewed from the spectator A practically deviates regardless of the intention of the spectators as illustrated on the lower right side in FIG. 6, even under a condition such that it is desired that the motions of the objects are ideally synchronized as illustrated on the upper right side in FIG. 6.

Therefore, according to the present technology, in a remote live system or the like that presents the reaction of the other person as the video in which the object moves or the voice, it is possible to effectively prevent uncomfortable feeling caused by s difference in delay amounts viewed from one terminal. In other words, it is possible to present a video or a voice with less uncomfortable feeling.

<Configuration Example of Remote Live System>

Then, hereinafter, details of the present technology will be described. In particular, hereinafter, an example will be described in which the present technology is applied to the remote live system.

First, terms used in the description of the present technology will be described.

(Performer)

The "performer" is a person who performs a program such as a performance in a live event. Note that, a main target of the present technology is a live concert that is remotely held. However, the program is not limited to this and includes plays, sports, or the like.

(Spectator)

The "spectator" is a spectator who remotely participates in the live event (user who is viewer). While viewing a video/voice presented by a spectator terminal to be described later, the spectator makes a reaction such as moving a sensing dedicated device or a terminal, moving a body, or clapping.

(Reaction Information)

The "reaction information" is information indicating a reaction of a spectator and is a generic term for period information to be described later, the motion information, or the like.

(Reaction Video)

The "reaction video" is a video mainly generated from reaction information of the other person, in which an object corresponding to the other person moves. For example, the reaction video is a video in which a penlight swings leftward and rightward, a video in which a head, a hand, or an arm of an avatar that imitates a human swings leftward and rightward, or the like.

(Reaction Voice)

The "reaction voice" is a voice mainly generated from the reaction information of the other person. For example, the reaction voice is a clapping sound, calls, or the like in a venue.

(Period Information)

The "period information" is one of the reaction information and is information simplified to only information indicating a period of a reaction (information based on reaction period), with respect to the reaction of the spectator having periodicity, for example, a motion of the penlight, a motion of the body, a clapping sound generated in conjunction with the program. For example, in a case where the motion of the penlight is presented as the reaction video, for example, information indicating that the penlight moves at an angle of 45° to 135° and a period of the motion is three seconds is set as the period information.

(Performer Terminal)

The "performer terminal" is a terminal corresponding to the performer, receives the reaction information and presents the reaction video and the reaction voice to the performer.

(Spectator Terminal)

The spectator terminal is a terminal corresponding to each spectator and receives the distribution video/voice and the reaction information, superimposes the reaction video and the reaction voice on the distribution video/voice, and presents the information to the spectator. Furthermore, the spectator terminal also has a function for sensing and analyzing a reaction of a spectator corresponding to an own terminal and transmitting the reaction to another terminal.

Figure 7:
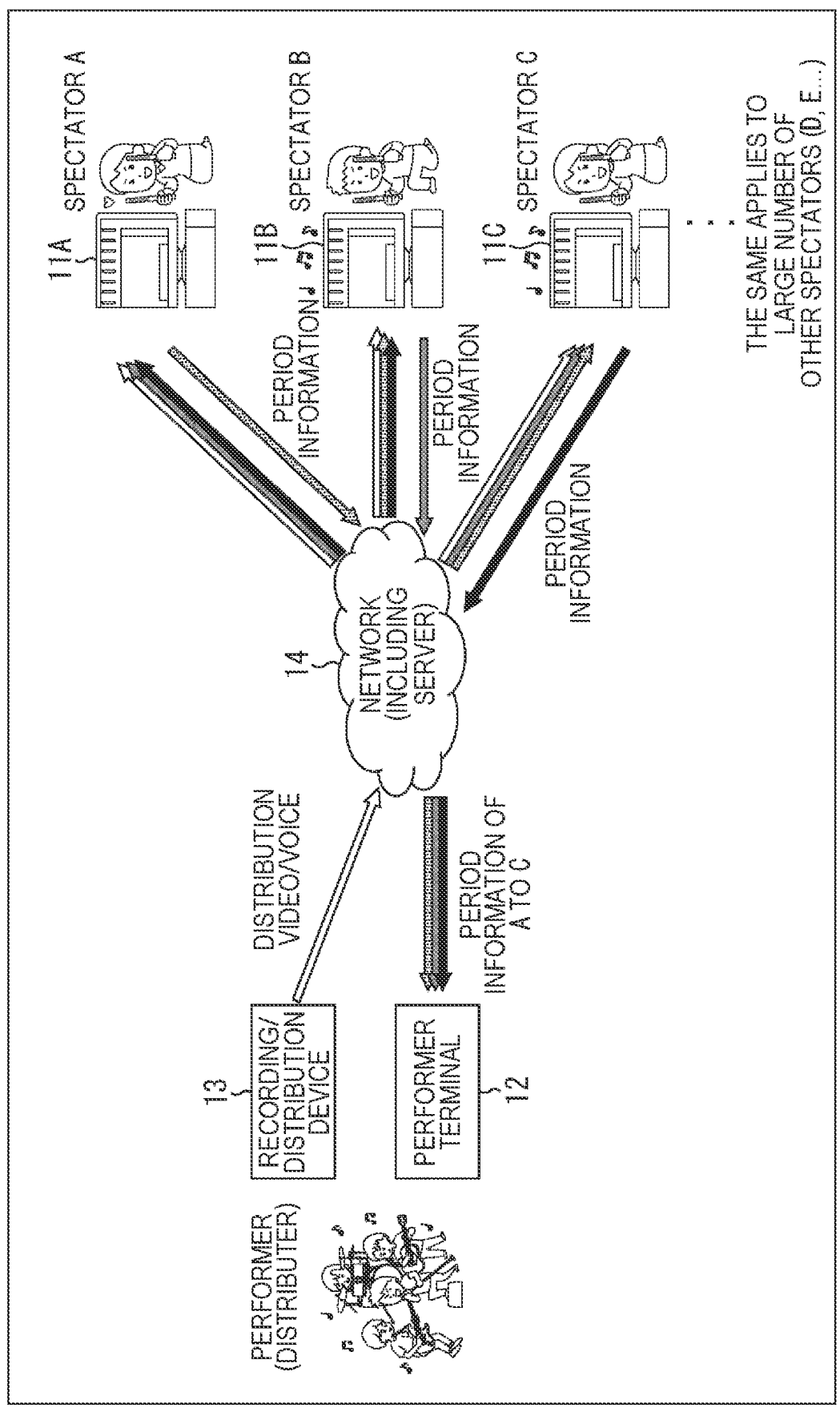
FIG. 7 is a diagram illustrating a configuration example of a remote live system.

FIG. 7 is a diagram illustrating a configuration example of an embodiment of the remote live system to which the present technology is applied.

The remote live system illustrated in FIG. 7 includes a large number of spectator terminals including spectator terminals 11A, 11B, and 11C, a performer terminal 12, a recording/distribution device 13, and a network 14.

In particular, here, for easy viewing of the drawing, as the spectator terminals, only the spectator terminal 11A of the spectator A, the spectator terminal 11B of the spectator B, and the spectator terminal 11C of the spectator C are illustrated. However, the spectator terminals of a large number of other spectators are actually connected to the network 14.

Note that, hereinafter, in a case where it is not particularly necessary to distinguish the large number of spectator terminals including the spectator terminals 11A to 11C from each other, the spectator terminals are simply referred to as a spectator terminal 11.

In the remote live system, the spectator terminal 11, the performer terminal 12, and the recording/distribution device 13 are connected to the network 14 including a server (not illustrated).

The program performed by the performer is recorded by the recording/distribution device 13 by a distributor not clearly indicated, and then, transmitted to the network 14 including the server, as the distribution video/voice, after being encoded.

That is, by performing recording (imaging) by the recording/distribution device 13, a distribution video including the performer as a subject, more specifically, video data of the distribution video (distribution video data) is obtained. Furthermore, by recording (collecting) the voice by the recording/distribution device 13, a distribution voice including a voice of the performer or the like, more specifically, voice data of the distribution voice (distribution voice data) is obtained. Content including these distribution videos and the distribution voices accompanying the distribution video is distributed to the spectator terminal 11.

Note that it is sufficient that the content to be distributed to the spectator terminal 11 be at least one of the distribution video or the distribution voice. Hereinafter, the distribution video and the distribution voice, that is, data including the distribution video data and the distribution voice data is referred to as a distribution video/voice.

When the distribution video/voice is obtained, the recording/distribution device 13 encodes the distribution video/voice and transmits an encoded distribution video/voice obtained as a result to the server on the network 14.

The server transmits (distribute) the encoded distribution video/voice transmitted from the recording/distribution device 13 to the large number of spectator terminals 11 including the spectator terminals 11A to 11C via the network 14.

Note that, hereinafter, the encoded distribution video/voice transmitted to the spectator terminal 11 is also simply referred to as a distribution video/voice. Furthermore, hereinafter, in a case where the video/voice obtained by imaging or recording by the recording/distribution device 13 is particularly distinguished from the encoded distribution video/voice distributed by the server on the network 14, for example, by encoding the video/voice, the video/voice obtained by imaging and recording is referred to as a raw video/voice.

For example, the spectator terminal 11 includes an information processing device (terminal device) such as a smartphone, a tablet, a game machine, or a personal computer.

The spectator terminal 11 receives the encoded distribution video/voice transmitted (distributed) by the recording/distribution device 13 via the network 14 (server) and decodes the received encoded distribution video/voice so as to obtain the distribution video/voice.

Furthermore, the spectator terminal 11 transmits and receives the period information at the same time as decoding the distribution video/voice.

That is, the spectator terminal 11 generates the period information regarding the reaction of the spectator corresponding to the own terminal (spectator terminal 11) and transmits the period information to the other spectator terminal 11 and the performer terminal 12 via the network 14 (server). Furthermore, the spectator terminal 11 receives the period information regarding the reactions of the other spectators corresponding to the other spectator terminals 11, from the plurality of other spectator terminals 11 via the network 14 (server).

For example, in this example, the spectator terminal 11A generates and transmits the period information regarding the reaction of the spectator A and receives the period information regarding the reaction of the spectator B and the period information regarding the reaction of the spectator C, from the spectator terminals 11B and 11C.

The spectator terminal 11 generates the reaction video and the reaction voice indicating the reactions of the plurality of other spectators (other user) on the own terminal, using the received period information. Furthermore, the spectator terminal 11 superimposes the reaction video/voice on the decoded distribution video/voice and presents a video (hereinafter, also referred to as presented video) and a voice (hereinafter, also referred to as presented voice) to a corresponding spectator.

Note that the presented video may be a video in which the reaction video is superimposed on the distribution video or may be only the reaction video. Similarly, the presented voice may be a voice in which the reaction voice is superimposed (synthesize) on the distribution voice or may be only the reaction voice.

The performer terminal 12 includes, for example, an information processing device (terminal device) such as a computer.

As in a case of the spectator terminal 11, the performer terminal 12 receives the period information regarding the reaction of the spectator, from each of the plurality of spectator terminals 11, via the network 14 (server). The performer terminal 12 generates the reaction video and the reaction voice indicating the reactions of the plurality of spectators on the own terminal, using the received period information and presents the reaction video and the reaction voice to the performer.

In the remote live system described above, the spectators who view the remote live distributed by the recording/distribution device 13, that is, the distribution video/voice are the three spectators A to C, information transmitted and received by each device is as illustrated in FIG. 8.

When the recording/distribution device 13 and the performer terminal 12 are considered as a single device on a distribution side, information (reception information) received by the device on the distribution side is period information generated for each of the spectators A to C. That is, the device on the distribution side receives the period information regarding each of the spectators A to C, from each of the spectator terminals 11A to 11C.

Furthermore, information (transmission information) transmitted by the device on the distribution side is a distribution video/voice that are a video and a voice of the remote live.

For the spectator terminal 11A, the reception information is the distribution video/voice, the period information regarding the spectator B, and the period information regarding the spectator C, and the transmission information is the period information regarding the spectator A.

Similarly, for the spectator terminal 11B, the reception information is the distribution video/voice, the period information regarding the spectator A, and the period information regarding the spectator C, and the transmission information is the period information regarding the spectator B. For the spectator terminal 11C, the reception information is the distribution video/voice, the period information regarding the spectator A, and the period information regarding the spectator B, and the transmission information is the period information regarding the spectator C.

In this way, both of the performer terminal 12 and the spectator terminal 11 receive the period information of the other person, and in addition, each spectator terminal 11 receives the distribution video/voice, in addition to the period information.

<Configuration Example of Spectator Terminal>

Figure 9:
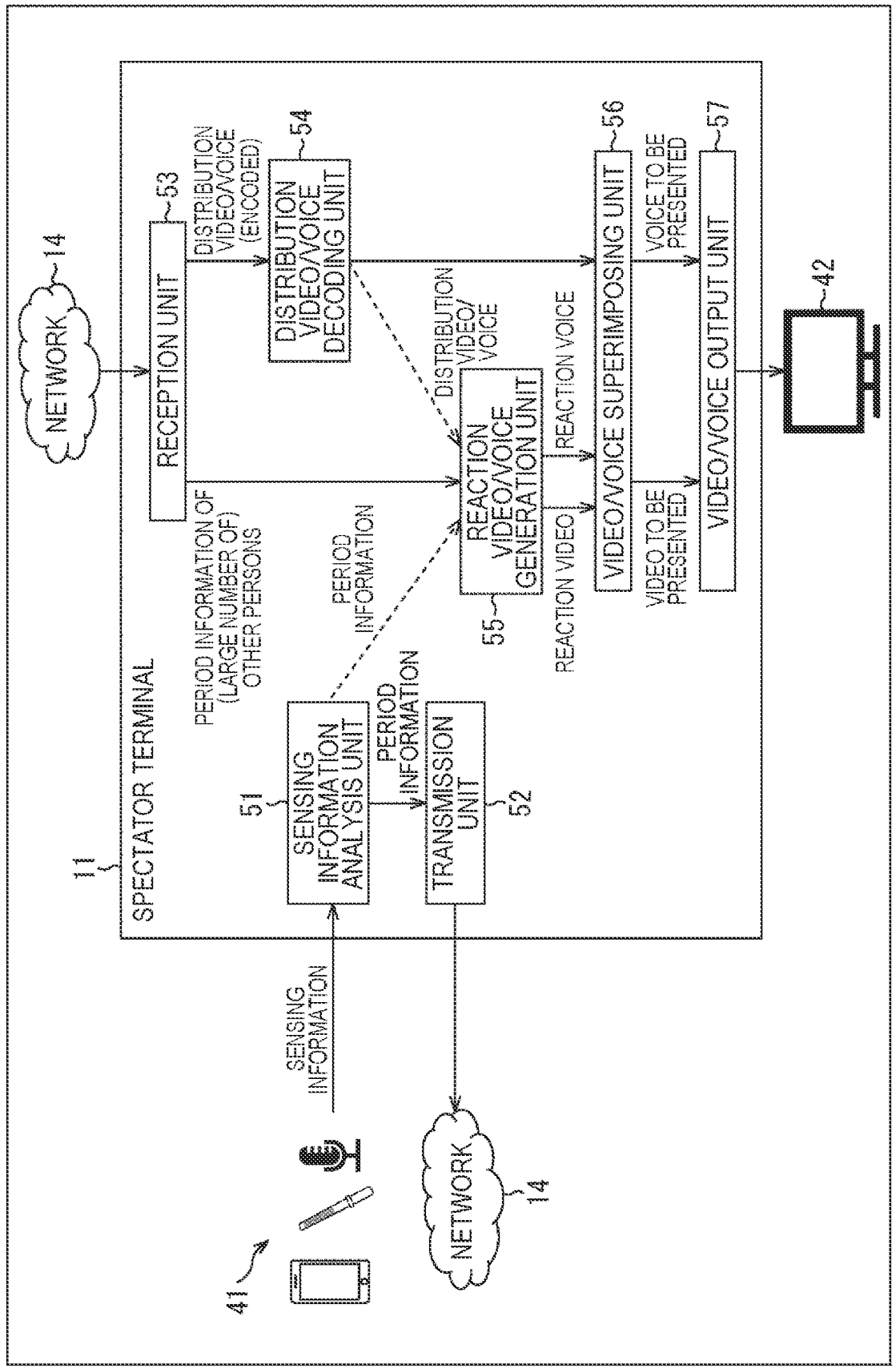
FIG. 9 is a diagram illustrating a configuration example of a spectator terminal.

The spectator terminal 11 is, for example, configured as illustrated in FIG. 9.

In this example, the spectator terminal 11 is connected to a sensing device 41 and a video/voice output device 42.

The spectator terminal 11 mainly has the following functions.

analyze a sensed reaction of a spectator and transmit the reaction as the period information
receive and decode the encoded distribution video/voice
receive the period information of the other person and generate the reaction video and the reaction voice
superimpose and output the distribution video/voice with the reaction video/voice The spectator terminal 11 includes a sensing information analysis unit 51, a transmission unit 52, a reception unit 53, a distribution video/voice decoding unit 54, a reaction video/voice generation unit 55, a video/voice superimposing unit 56, and a video/voice output unit 57.

The sensing information analysis unit 51 acquires a reaction of a spectator sensed by the sensing device 41 from the sensing device 41 as sensing information, converts the sensing information into the period information, and supplies the period information to the transmission unit 52 and the reaction video/voice generation unit 55. In other words, the sensing information analysis unit 51 functions as a reaction information generation unit that generates the period information as the reaction information, on the basis of the sensing information.

The sensing device 41 includes, for example, includes a device that mounts a single or a plurality of sensors such as a camera (image sensor), a microphone, an acceleration sensor, a gyro sensor, or a geomagnetic sensor. Specifically, for example, the sensing device 41 is a head mounted display worn by the spectator (user) corresponding to the spectator terminal 11, a penlight-type device held by the spectator, or the like.

The sensing device 41 senses a video in which a spectator is a subject, a voice of the spectator, an angular acceleration or an angular speed indicating a motion of the spectator, or the like as the reaction of the spectator and supplies the sensing information obtained as a result to the sensing information analysis unit 51. Note that the sensing device 41 may be provided outside the spectator terminal 11 and connected to the spectator terminal 11 or may be mounted in the spectator terminal 11.

Furthermore, the period information is notified (supplied) to the reaction video/voice generation unit 55 as auxiliary information. Therefore, the reaction video/voice generation unit 55 does not necessarily need to use the period information supplied from the sensing information analysis unit 51.

The transmission unit 52 transmits the period information supplied from the sensing information analysis unit 51 to the server on the network 14. The period information transmitted to the server is notified (transmitted) to the performer terminal 12 and the other spectator terminals 11.

The reception unit 53 receives the encoded distribution video/voice from the server on the network 14 and supplies the encoded distribution video/voice to the distribution video/voice decoding unit 54.

Furthermore, the reception unit 53 receives (acquire) a large number of pieces of period information of the other persons, as the reaction information of the other person (other spectator) from the server on the network 14 and supplies the period information to the reaction video/voice generation unit 55. That is, the reception unit 53 receives the reaction information of each of the plurality of other users (other spectator) generated by each of the plurality of spectator terminals 11 different from the own terminal.

The distribution video/voice decoding unit 54 decodes the encoded distribution video/voice supplied from the reception unit 53 and supplies the distribution video/voice obtained as a result to the reaction video/voice generation unit 55 and the video/voice superimposing unit 56.

In particular, the distribution video/voice is notified (supplied) to the reaction video/voice generation unit 55 as the auxiliary information. Therefore, the reaction video/voice generation unit 55 does not necessarily need to use the distribution video/voice supplied from the distribution video/voice decoding unit 54.

The reaction video/voice generation unit 55 generates a reaction video/voice corresponding to the reactions of the plurality of other users, that is, the reaction video and the reaction voice, on the basis of at least the period information of the other persons supplied from the reception unit 53, and supplies (transmit) the reaction video and the reaction voice to the video/voice superimposing unit 56.

The reaction video is, for example, a video of an object corresponding to each of the plurality of other persons who moves according to the reaction information (period information) of the other person. Furthermore, the reaction voice is a voice in which a specific sound corresponding to the reaction of each of the plurality of other persons is reproduced, for example, at a timing according to the reaction information (period information) of the other person.

Note that, at the time of generating the reaction video/voice, the reaction video/voice generation unit 55 may use not only the period information of the other person but also the auxiliary information.

For example, the reaction video/voice generation unit 55 may generate the reaction video/voice, using at least any one of the period information of the own terminal supplied from the sensing information analysis unit 51, the distribution video supplied from the distribution video/voice decoding unit 54, or the distribution voice supplied from the distribution video/voice decoding unit 54, as the auxiliary information.

The period information of the own terminal and the distribution video/voice used as the auxiliary information are information indicating an environment related to the distribution video/voice of the own terminal. Therefore, it can be said that these pieces of auxiliary information are environment information indicating an environment of the own terminal (spectator terminal 11) at the time when the distribution video/voice is reproduced.

Furthermore, hereinafter, the period information regarding the reaction of the spectator corresponding to the spectator terminal 11, generated by the sensing information analysis unit 51 of the spectator terminal 11 is also particularly referred to as own terminal period information. Moreover, hereinafter, the period information of the other person received by the spectator terminal 11 is also referred to as other person's period information.

The video/voice superimposing unit 56 generates the presented video/voice, by superimposing the reaction video/voice supplied from the reaction video/voice generation unit 55 on the distribution video/voice supplied from the distribution video/voice decoding unit 54 and supplies the presented video/voice to the video/voice output unit 57.

Note that the reaction video and the reaction voice may be used as the presented video and the presented voice as they are, as described above. Furthermore, only one of the presented video and the presented voice may be output.

The video/voice output unit 57 converts the presented video/voice supplied from the video/voice superimposing unit 56 into a format that can be actually output to the video/voice output device 42 and supplies (output) the converted presented video/voice to the video/voice output device 42. That is, the video/voice output unit 57 presents the presented video/voice to the user, by outputting the presented video/voice to the video/voice output device 42.

For example, the format that can be output to the video/voice output device 42 is a high-definition multimedia interface (HDMI) (registered trademark) output format, a known video/voice data format (format), or the like.

The video/voice output device 42 includes, for example, a device such as a display that has a video display function and a voice output function and presents the presented video/voice supplied from the video/voice output unit 57 to the spectator of the own terminal. That is, the video/voice output device 42 displays the presented video and reproduces the presented voice.

<Configuration Example of Performer Terminal>

Figure 10:
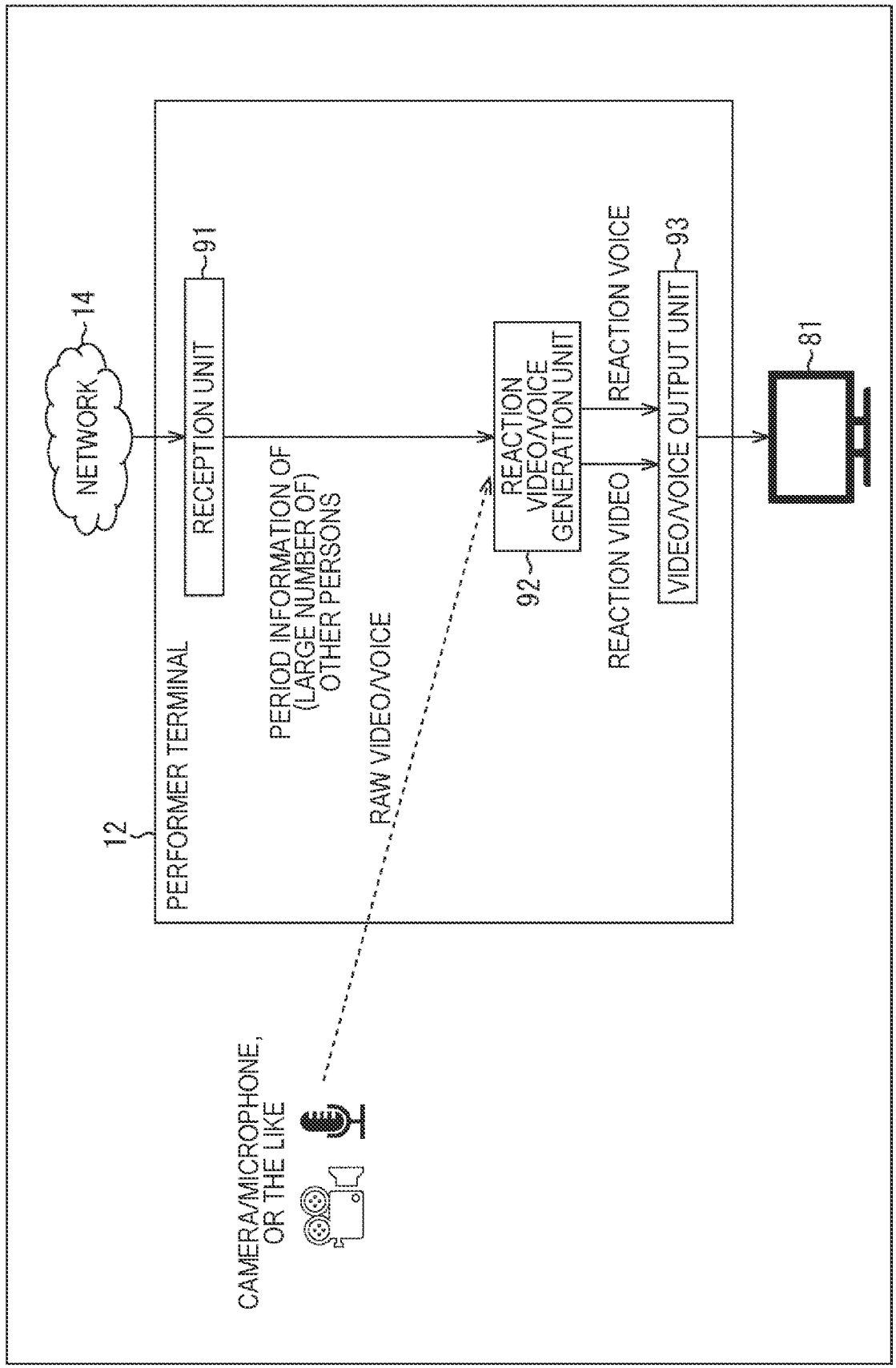
FIG. 10 is a diagram illustrating a configuration example of a performer terminal.

The performer terminal 12 is, for example, configured as illustrated in FIG. 10.

In this example, the performer terminal 12 receives supply of the raw video/voice obtained with the camera, the microphone, or the like and appropriately outputs the reaction video/voice generated using the raw video/voice as the auxiliary information to a video/voice output device 81 connected to the performer terminal 12.

The performer terminal 12 includes a reception unit 91, a reaction video/voice generation unit 92, and a video/voice output unit 93.

The reception unit 91, the reaction video/voice generation unit 92, and the video/voice output unit 93 respectively correspond to the reception unit 53, the reaction video/voice generation unit 55, and the video/voice output unit 57 of the spectator terminal 11. That is, the performer terminal 12 has only functions for receiving the other person's period information and generating the reaction video and the reaction voice, among the functions of the spectator terminal 11. Therefore, the configuration of the performer terminal 12 is a configuration obtained by removing some processing blocks from the spectator terminal 11.

The reception unit 91 acquires (receive) a large number of pieces of the period information of the other persons from the server on the network 14 and supplies the period information to the reaction video/voice generation unit 92.

The reaction video/voice generation unit 92 generates the reaction video that is the motion of the object and the reaction voice, on the basis of the period information of the other person supplied from the reception unit 91 and the raw video/voice supplied from outside as the auxiliary information and supplies the obtained reaction video/video to the video/voice output unit 93.

As described above, the raw video/voice is data obtained by imaging and recording the program, to be a source of the distribution video/voice to be distributed to the spectator. Furthermore, the raw video/voice that is the auxiliary information is not necessarily used to generate the reaction video/voice.

As in a case of the spectator terminal 11, for the performer terminal 12, it can be said that the raw video/voice used as the auxiliary information is the environment information indicating the environment of the own terminal (performer terminal 12).

The video/voice output unit 93 converts the reaction video/voice supplied from the reaction video/voice generation unit 92 into a format that can be actually output to the video/voice output device 81 and supplies (output) the converted reaction video/voice to the video/voice output device 81 as the presented video/voice.

For example, the format that can be output to the video/voice output device 81 is an HDMI (registered trademark) output format, a known video/voice data format (format), or the like.

By the way, a specific embodiment of the spectator terminal 11 described above may change according to a use case or a device owned by the spectator. Hereinafter, a specific example of the spectator terminal 11 is described.

Specific Example 1 of Spectator Terminal

The functions as the spectator terminal 11 are mounted on a smartphone or a tablet.

For example, by installing a live distribution application program that supports the remote live system in the smartphone or the like in advance, the smartphone or the like can be used as the spectator terminal 11.

In this case, as a device for sensing, that is, as the sensing device 41, a built-in camera of the smartphone or the like, a microphone, or the like can be used. Furthermore, the sensing device 41 including an acceleration sensor, a gyro sensor, or the like may be separately connected to the spectator terminal 11 in a wired or wireless manner.

For example, a holding device that includes a sensor such as the acceleration sensor or the gyro sensor, has a penlight-like shape, and emits light may be used as the sensing device 41. In such a case, for example, it is considered that the holding device as the sensing device 41 is purchased by the spectator before the live event or the holding device is distributed to the spectator together with a ticket.

Furthermore, the video is presented on a display mounted on or connected to the smartphone or the tablet as the spectator terminal 11, and the voice is presented by a speaker, an earphone, or a headphone, mounted on or connected to the spectator terminal 11.

Specific Example 2 of Spectator Terminal

The functions as the spectator terminal 11 are mounted on a personal computer (PC)/game machine.

By installing the live distribution application program that supports the remote live system in the PC or the like in advance, the PC or the like can be used as the spectator terminal 11.

In this case, as the device for sensing, that is, as the sensing device 41, the device including the acceleration sensor, the gyro sensor, or the like, a controller, a head mounted display, or the like can be used. Furthermore, the video is presented on the display or the head mounted display connected to the spectator terminal 11, and the voice is presented by the speaker, the earphone, the headphone, the head mounted display, or the like connected to the spectator terminal 11.

The function as the performer terminal 12 can be realized by the device similar to the example of the spectator terminal 11 described above. However, it is desirable that the performer terminal 12 include an interface that can input a video/voice of the row voice with a low delay.

On the side of the performer terminal 12, the video is presented by a display at a position where the performer can confirm, and the voice is presented by being mixed with other voices by a speaker installed in the venue, an earphone (in-ear monitor (IEM)) worn by the performer, or the like.

<Outline of Present Technology>

In the present technology, processing executed by the reaction video/voice generation unit 55 and the reaction video/voice generation unit 92 in the remote live system changes according to the environment of the own terminal.

Specifically, in addition to the received period information of the other person, the auxiliary information indicating the environment of the own terminal is appropriately referred, and the reaction video and the reaction voice are generated. The auxiliary information is, for example, a time stamp indicating a time of a distribution video being viewed, period information obtained by performing sensing by the own terminal, tempo information acquired from a voice, or the like.

Figure 11:
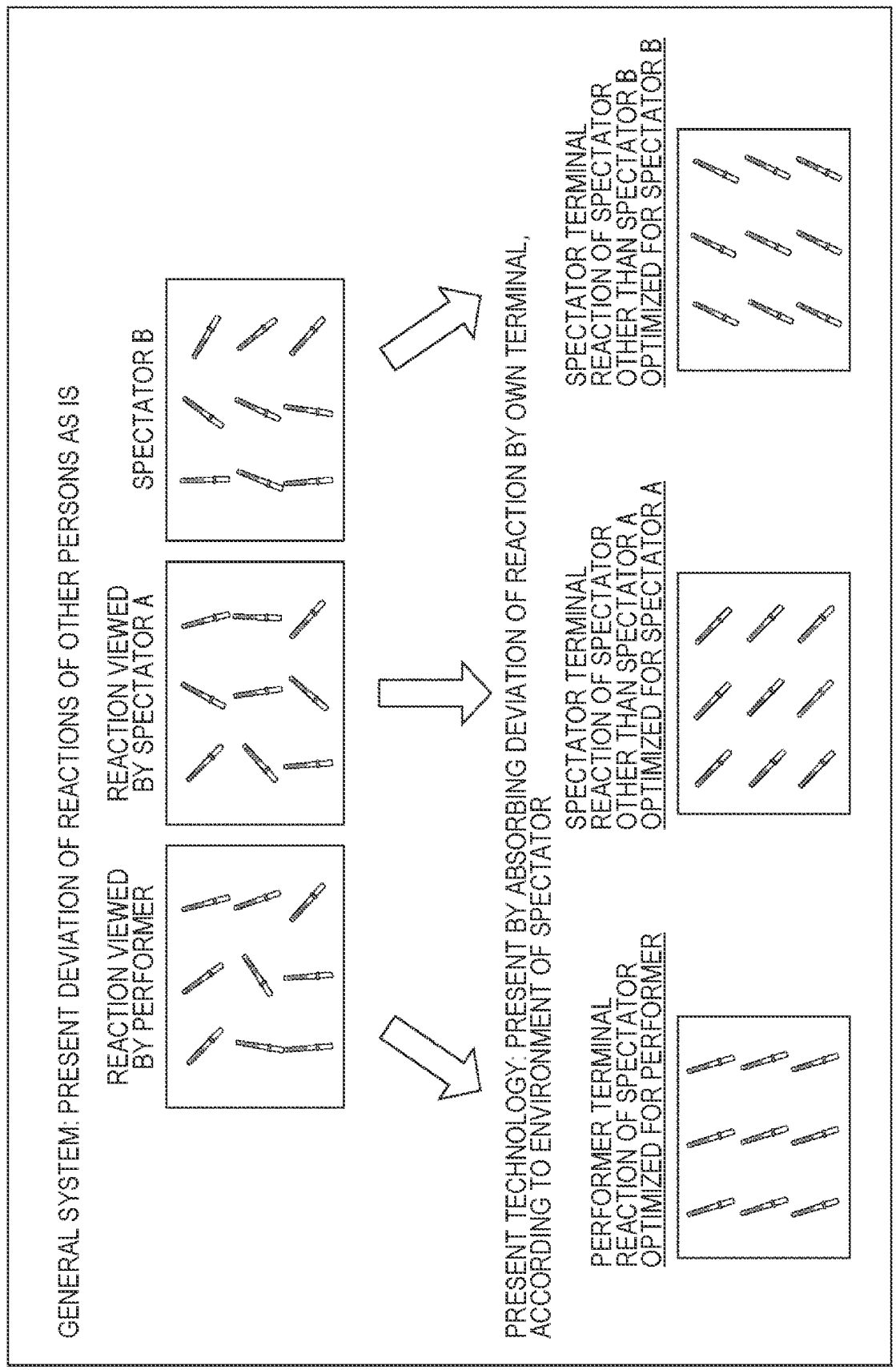
FIG. 11 is a diagram for explaining a difference from a general remote live system.

Here, FIG. 11 illustrates a difference between the remote live system to which the present technology is applied and a general remote live system.

In FIG. 11, on the upper side, an example of a reaction video presented to the performer, the spectator A, and the spectator B in the general remote live system is illustrated. Here, in the reaction video, a penlight is displayed as an object that moves according to a reaction of another person.

As illustrated on the upper side in FIG. 11, in the general remote live system, any care such as correction on a deviation of the reaction of the other person is not performed. Therefore, the reaction of each spectator is presented as it is. Therefore, even under a condition that the reactions of the other persons (spectators) are desired to be synchronized, a video in which the reactions of the spectators vary is presented.

On the other hand, on the lower side in FIG. 11, an example of a reaction video presented to the performer, the spectator A, and the spectator B in the remote live system to which the present technology is applied is illustrated. In FIG. 11, as in a case of the upper side, the penlight is displayed as the object that moves according to the reaction of the other person in the reaction video.

In the present technology, a reaction video/voice in which the deviation of the reactions of the other persons has been absorbed by the own terminal is presented, in accordance with the environment of the performer or the spectator.

Therefore, as illustrated on the lower side in FIG. 11, the reactions presented by the performer terminal 12 and each spectator terminal 11, that is, the motions of the objects in the reaction videos are completely different from each other. However, the performer and the spectator to whom the reaction video is presented have no uncomfortable feeling.

Specifically, for example, when the motion of the object in the reaction video presented to the spectator A is compared with the motion of the object in the reaction video presented to the spectator B, the motions are not synchronized. However, for example, in the reaction video presented to the spectator A, the motions of the plurality of objects are synchronized, and the reaction video has less uncomfortable feeling.

Note that, as a method for absorbing the deviation of the reactions of the other persons, a paragraph 125 in Patent Document 3 discloses a method for temporarily storing reaction information of other persons in a server and matching timings, and then, retransmitting the reaction information to all terminals.

However, in this method, since it is necessary to match a timing to a timing of a terminal with a large delay amount, a delay of the reaction information increases. Therefore, it is practically difficult to adapt the method to a remote live of a large number of people. Since the present technology does not need a mechanism described in Patent Document 3, it is possible to adapt the method to the remote live of a large number of people without increasing the delay amount.

Moreover, as in a second embodiment to be described later, the present technology can predict a future reaction video/voice from the reaction information. Therefore, the present technology further has an advantage such that it is hard to detect the delay of the reaction information.

Furthermore, as in Patent Document 4, a method for generating a reaction video with a server and distributing the reaction video to each terminal is considered. However, the present technology is different from Patent Document 4 in that the reaction video (reaction voice) is locally generated on the own terminal.

With this difference, it is possible to change the movement, that is, the processing by the reaction video/voice generation unit 55 or the reaction video/voice generation unit 92 according to the environment of the own terminal as described above, and it is possible to obtain the reaction video/voice with less uncomfortable feeling.

Hereinafter, a specific generation method of "the reaction video/voice that is optimized to the own terminal and has absorbed the deviation of the reactions of the other persons" will be described in each embodiment. Therefore, first, details of processing by the sensing information analysis unit 51 of the spectator terminal 11 will be described, and next, details of the processing by the reaction video/voice generation unit 55 of the spectator terminal 11 and the reaction video/voice generation unit 92 of the performer terminal 12 will be described.

In a first embodiment, an example will be described in which one or more pieces of other person's period information is selected from among the plurality of pieces of acquired other person's period information and the reaction video and the reaction voice are generated using the selected other person's period information.

Figure 12:
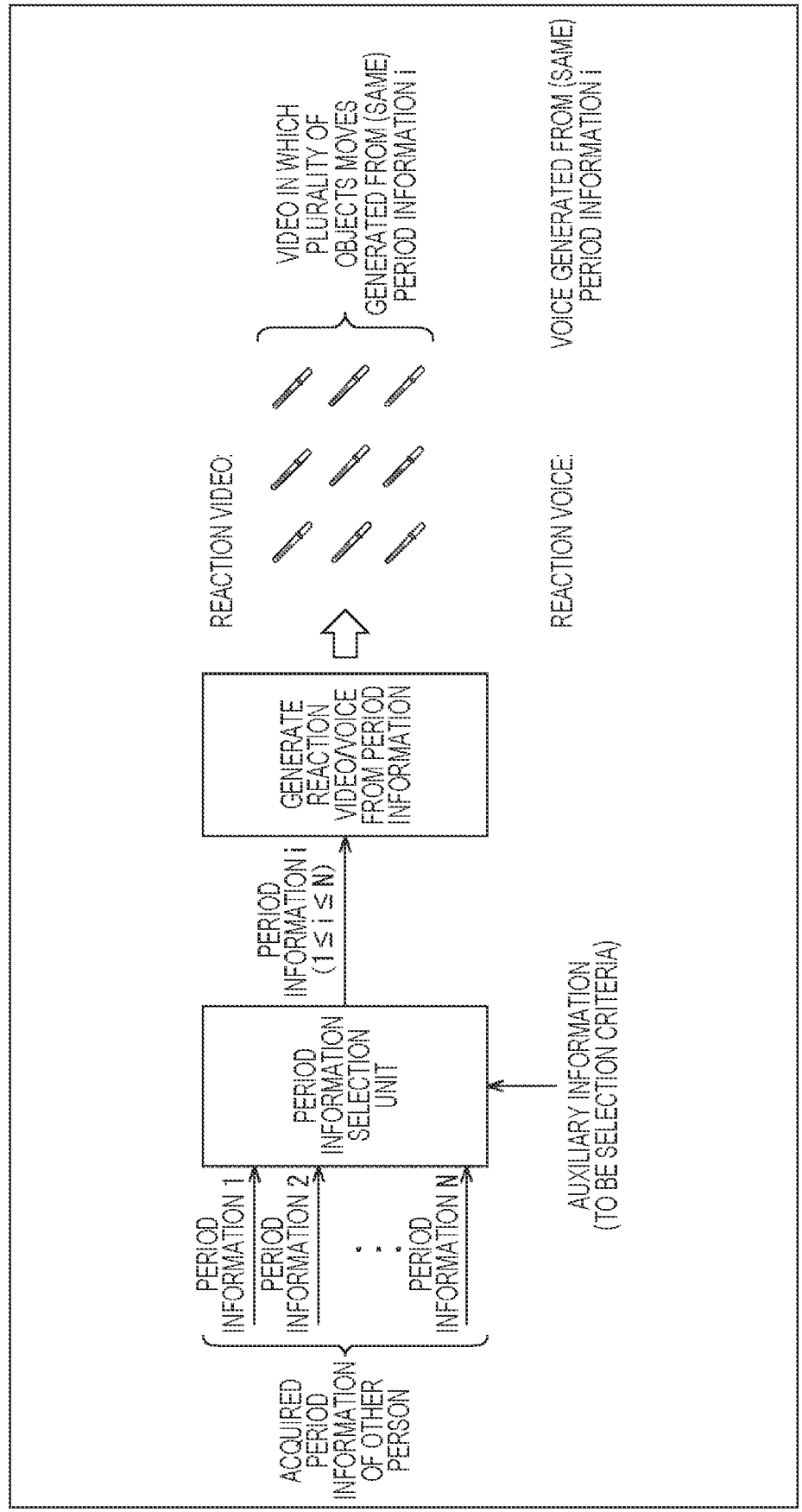
FIG. 12 is a diagram for explaining an outline of the present technology.

FIG. 12 illustrates an outline of the first embodiment.

In FIG. 12, a simple configuration of the reaction video/voice generation unit 55 and the reaction video/voice generation unit 92 is illustrated.

The reaction video/voice generation unit selects one or more pieces of period information from among N pieces of received other person's period information. Then, on the basis of the selected period information, a reaction video in which a plurality of, for example, N objects as many as the number of pieces of input period information move and a reaction voice corresponding to the reaction video are generated.

In this example, since a single piece of period information i is selected, motions of a plurality of objects generated from the single piece of the period information i do not unnaturally vary, and uncomfortable feeling of the reaction video is reduced. In other words, by replacing the reactions of the other persons that vary due to the delay amounts different for the spectator terminals 11 of the plurality of other persons with the same reaction corresponding to the selected period information i, a deviation in the delay amount is corrected, and the reaction video with no uncomfortable feeling is presented.

Although a selection criteria of the period information will be described later, the auxiliary information indicating the environment of the own terminal is referred, and the period information is selected.

Note that Patent Document 4 discloses that a video in which a plurality of objects moves may be generated from a single piece of motion data. However, the present technology is different from Patent Document 4 in that one or more pieces of reaction information are selected from the plurality of pieces of received reaction information (period information), in consideration of the environment of the own terminal. As a result, a different effect that a reaction video that is less likely to generate the uncomfortable feeling for the performer or the spectator corresponding to the own terminal can be generated.

Hereinafter, a specific method for implementing concept described with reference to FIG. 12 in the remote live system to which the present technology is applied will be described in detail.

The present technology can be applied regardless of a type of the reaction if the reaction of the spectator has periodicity. However, for easy understanding of description, hereinafter, an assumed reaction video/voice and content of period information determined in correspondence will be specifically described. This is because specific content of the period information changes depending on content of a reaction video/voice to be presented.

For example, in a case where the reaction video imitates a motion of a penlight or a movement of the spectator for waving the hands and is limited to a movement of the penlight or the hand of the spectator for swinging only to rightward and leftward, only one-dimensional information indicating that swings to the left and right in a certain period is enough for the period information. Furthermore, for example, if the motion of the object in the reaction video is a motion that uses an entire body such as head banging, meta information that can restore a motion upward or downward or a figure eight motion is needed.

Note that it is assumed that a 3D model of the object used to generate the reaction video and a sound source to be a source of generation of the reaction voice (for example, one time of clapping or the like), that is, voice data be recorded in the spectator terminal 11 and the performer terminal 12, for example, with a method for downloading the data from the distributor when participating in the remote live using the remote live system.

In the first embodiment, an example will be described in which a penlight held by the spectator (other person) is an object corresponding to the reaction of the other person and a reaction video in which the penlight moves according to the reaction (motion) of the other person is generated.

That is, in this example, for example, it is assumed that the other person (other spectator) actually hold the penlight, the penlight be assumed as the object corresponding to the other person, and the reaction video be generated in which the penlight moves leftward and rightward from the period information. In this case, in the penlight that is actually held by the other person, a sensor such as an acceleration sensor or a gyro sensor is provided.

Here, to simplify the description, as the motion (movement) of the spectator, a movement of the spectator for swinging the penlight back and forth or upward and downward is ignored. Furthermore, when the video of the penlight alone is superimposed on the presented video, the penlight appears to float in the air and gives unnatural feeling. Therefore, although it is considered to actually present a video in which an arm of an avatar corresponding to the spectator and the penlight synchronously move, only the motion of the penlight is described for convenience of description.

Figure 13:
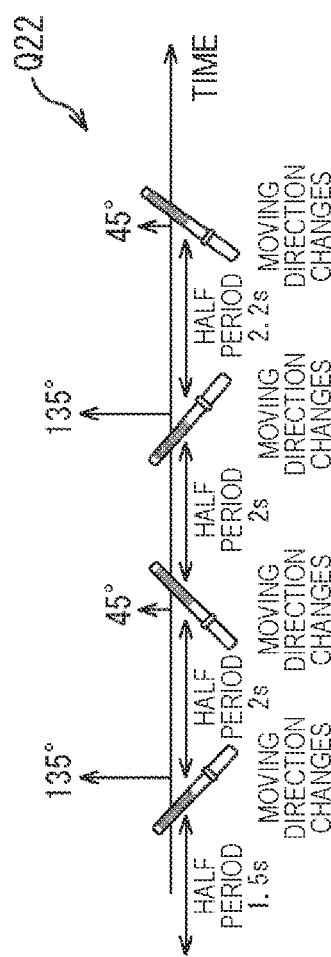
FIG. 13 is a diagram for explaining period information.

In this way, the spectator who views the distribution video/voice holds the penlight and makes the reaction for swinging the penlight rightward and leftward, and the reaction video in which the penlight as the object moves according to the reaction is generated, information illustrated in FIG. 13 is used as the period information that expresses the motion of the penlight.

In FIG. 13, an example in which pieces of period information are arranged in time series is illustrated in a portion indicated by an arrow Q21, and the motion of the penlight is illustrated in a portion indicated by an arrow Q22.

In particular, in the portion indicated by the arrow Q22, the horizontal axis indicates time, and a height of an arrow in the vertical direction represents a magnitude of an angle indicating an inclination of the penlight.

Here, a state where the penlight is provided in the horizontal direction, that is, the penlight is parallel to a horizontal plane is assumed as a state where the angle of the penlight is 0°. Therefore, for example, in a state where the penlight is directed diagonally upward to the right in FIG. 13, the angle of the penlight is 45°, and in a state where the penlight is directed diagonally upward to the left in FIG. 13, the angle of the penlight is 135°.

In this example, the spectator makes a reaction for moving the penlight rightward and leftward while viewing the distribution video/voice. Then, the following two pieces of information are transmitted as the period information indicating the reaction of the spectator.

a penlight angle when a moving direction changes (angle at moment when sign of angular speed changes)

elapsed time from when the direction changes previous time (time of immediately previous half period)

In the portion indicated by the arrow Q21, the period information includes two pieces of information including an "angle" and a "half period", and in FIG. 13, the period information illustrated on the lower side is newer period information.

The angle included in the period information (hereinafter, also referred to as angle information) is an angle of the penlight with respect to the horizontal plane, at a time when the moving direction (direction) of the penlight changes.

Furthermore, the half period included in the period information (hereinafter, also referred to as half period information) indicates a time from a previous (immediately previous) time when the moving direction (direction) of the penlight changes to a time when the moving direction of the penlight changes this time.

In this example, each spectator terminal 11 generates the period information including the angle information and the half period information at the timing when the moving direction of the penlight changes and transmits the period information to the server on the network 14.

Therefore, in a case where the period information at each timing indicated by the arrow Q21 is received, it can be specified that the reaction of the spectator is the reaction indicated by the arrow Q22, from the period information.

Specifically, the angle of the penlight is 1350 at a predetermined time, the angle of the penlight changes to 45° two seconds later, and the angle of the penlight further changes to 135° two seconds later. In this way, it is found that the reaction of the other person is a reaction in which the penlight moves at an angle between 45° and 135°. That is, it is found that the penlight periodically moves leftward and rightward (periodic movement) while changing the moving direction of the penlight, for example, from the right direction to the left direction or the like.

In this case, an elapsed time from when the moving direction of the penlight changes to the time when the moving direction of the penlight changes next time is a half period time of the penlight movement that is the periodic movement.

By only notifying the other spectator terminal 11 of such limited information at a very low frequency, that is, the half period of the motion, each spectator terminal 11 can generate the reaction video.

Therefore, by using the period information as the reaction information, unlike a case where the motion information and the position information are simply transmitted as in an existing technique used for a game or the like and Patent Documents 1, 3, and 4, it is possible to perform scaling to a large number of people.

<Description of Period Information Generation Processing>

Here, processing executed when the period information is generated will be described. That is, hereinafter, period information generation processing by the spectator terminal 11 will be described with reference to the flowchart in FIG. 14. This period information generation processing is executed at a constant interval, for example, for each time period of several tens of samples of the sensing information or several frames of the video, in synchronization with the acquisition timing of the sensing information.

In step S11, the sensing information analysis unit 51 acquires the sensing information from the sensing device 41 and obtains (acquire) time-series data based on a sensing result of an angular acceleration, an angular speed, an angle, or the like of the spectator (penlight) from the acquired sensing information.

Figure 14:
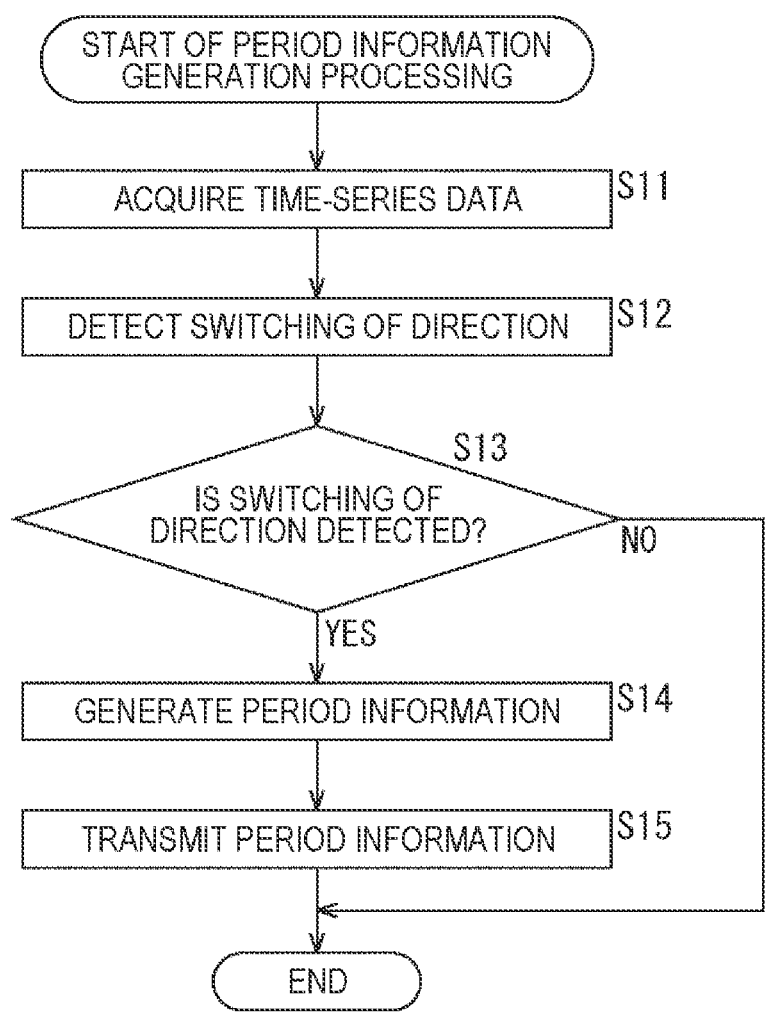
FIG. 14 is a flowchart for explaining period information generation processing.
Figure 15:
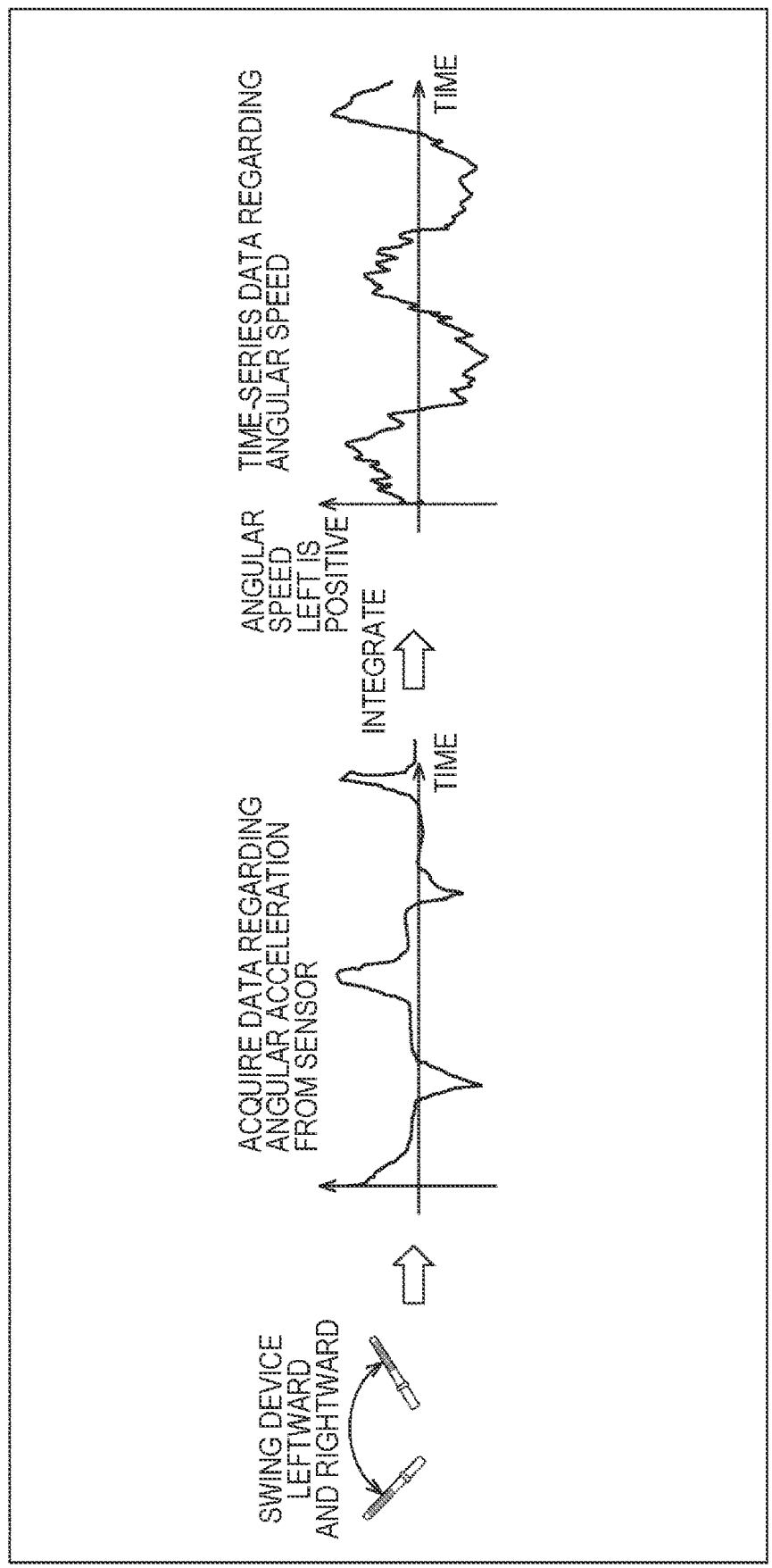
FIG. 15 is a diagram for explaining sensing information.

For example, as illustrated on the left side in FIG. 15, it is assumed that the sensing information analysis unit 51 acquire the sensing information from the sensing device 41 as illustrated in the middle of FIG. 14, in a state where the spectator swings the penlight including the sensing device 41 therein leftward and rightward.

In this example, the sensing device 41 includes the acceleration sensor and the gyro sensor, and the sensing information analysis unit 51 acquires time-series data of the angular acceleration as the sensing information.

By processing the time-series data with a predetermined method, for example, integrating the time-series data of the angular acceleration acquired in this way, the sensing information analysis unit 51 obtains time-series data regarding the angular speed and the angle indicating the motion of the penlight as illustrated on the right side in FIG. 14. In this example, by integrating the time-series data of the angular acceleration, the time-series data of the angular speed is acquired.

Figure 16:
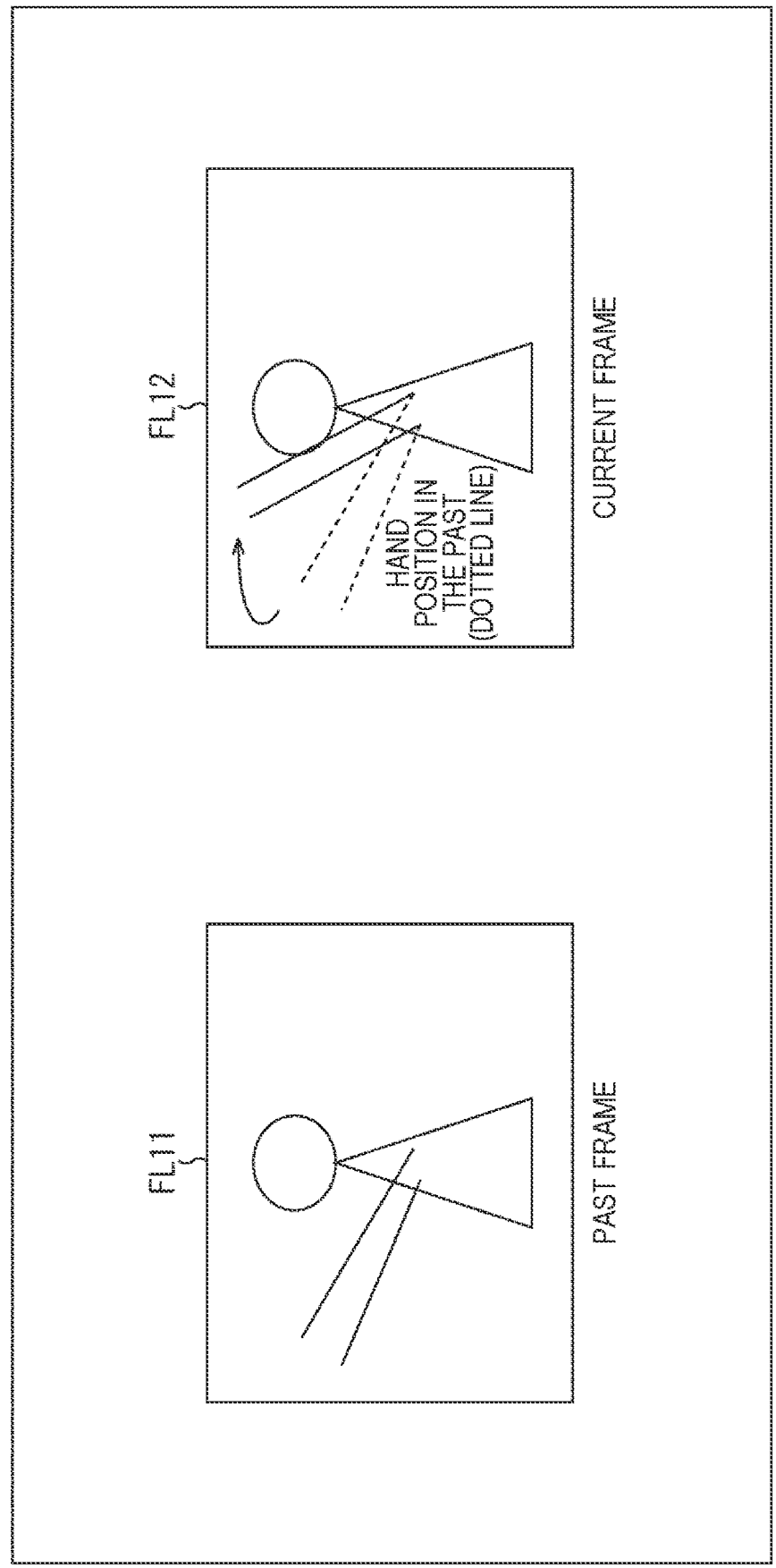
FIG. 16 is a diagram for explaining the sensing information.

Furthermore, for example, as illustrated in FIG. 16, by comparing a video frame FL11 as the sensing information acquired in the past and a video frame FL12 newly acquired as the sensing information this time, a motion of a hand (arm) of the spectator may be detected.

In this example, the video obtained by imaging the spectator as the subject is set as the sensing information, and in the video frames FL11 and FL12, a state where the spectator waves hands is imaged as the subject. In this case, for example, by executing analysis processing on the video frame supplied as the sensing information, the sensing information analysis unit 51 can detect the hand or the arm of the spectator and obtain a direction of the hand or the arm, that is, an angle of the hand or the arm with respect to the horizontal plane.

Therefore, by comparing temporally successive frames such as the video frames FL11 and FL12, more specifically, the angles of the hands or the arms obtained for the frames, it is possible to obtain the time-series data regarding the motion of the hand (arm) of the spectator, that is, an angular speed of the hand or the like.

Note that, to detect the hand or the arm of the spectator from the video frame, for example, a detector obtained through machine learning such as deep neural network (DNN) or the like may be used, or detection may be performed using image recognition on the video frame or the like.

Returning to the description of the flowchart in FIG. 14, in step S12, the sensing information analysis unit 51 detects switching of the direction of the motion of the spectator (penlight), on the basis of the time-series data obtained in step S11.

Specifically, for example, the sensing information analysis unit 51 detects the switching of the motion indicating the reaction of the spectator, that is, the direction of the motion of the penlight, on the basis of at least one of the following two criteria.

Figure 17:
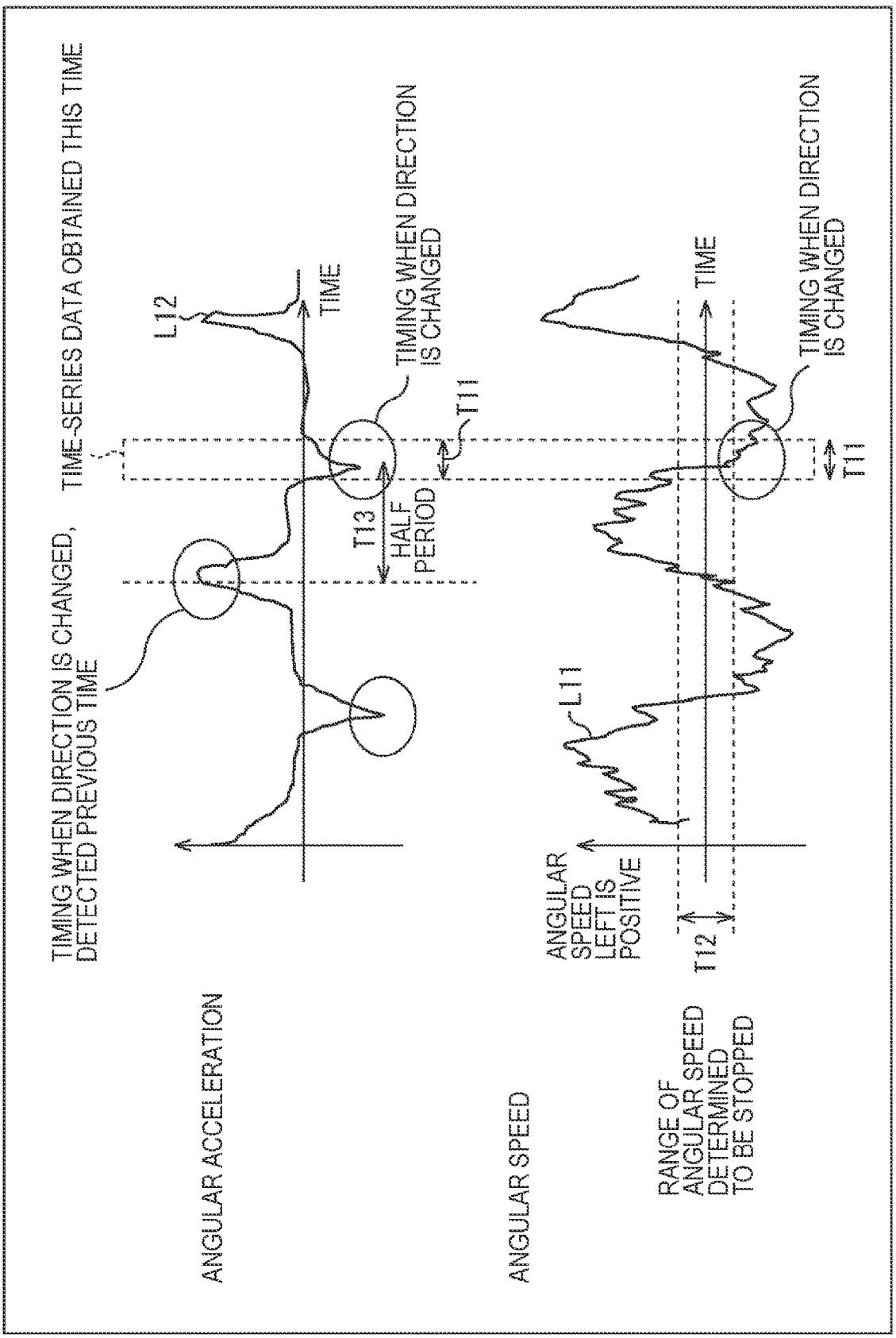
FIG. 17 is a diagram for explaining switching of a direction of a motion indicating the reaction.

Criterion 1: there are points where the acceleration becomes maximum and minimum Criterion 2: the sign of the angular speed changes For example, as illustrated on the lower side in FIG. 17, it is assumed that the time-series data of the angular speed be obtained from the sensing information. Here, a polygonal line L11 indicates the time-series data of the angular speed, and in particular, it is assumed that time-series data in a portion of a period T11 be obtained through the processing in immediately preceding step S11. Furthermore, in FIG. 17, an upper region than the horizontal axis on the lower side is a region where the angular speed (motion in left direction) is positive, and a region on the lower side of the horizontal axis is a region where the angular speed is negative.

In this case, a timing (time) when a sign of the angular speed changes can be assumed as a timing when the direction of the motion indicating the reaction of the spectator has changed.

For example, in the period T11 in the time-series data of the angular speed, the sign of the angular speed changes from positive to negative. Therefore, the sensing information analysis unit 51 detects the timing (time) when the sign of the time-series data has changed as the timing when the direction of the motion indicating the reaction of the spectator is switched.

Furthermore, for example, in a case where a range T12 in which an absolute value of the angular speed is equal to or less than a certain value is set as a range of the angular speed in which it is determined that the motion of the spectator stops and the angular speed is within the range T12, it may be determined that the motion indicating the reaction of the spectator stops. In this case, a timing (time) when the angular speed changes from the value within the range T12 to a value outside the range T12 is detected as the timing when the direction of the motion indicating the reaction of the spectator is switched.

Moreover, for example, as illustrated on the upper side in the drawing, depending on whether or not there is a maximum or a minimum in the time-series data of the angular acceleration, the switching of the direction of the motion indicating the reaction of the spectator may be detected. In FIG. 17, on the upper side, a polygonal line L12 indicates the time-series data of the angular acceleration, and in particular, it is assumed that the time-series data in the portion of the period T11 be obtained through the processing in the immediately preceding step S11.

In this case, the sensing information analysis unit 51 detects a timing at which the angular acceleration is the maximum or minimum, as the timing when the direction of the motion indicating the reaction of the spectator is switched.

For example, since the timing to be the minimum is included in the period T11 in the time-series data of the angular acceleration, the sensing information analysis unit 51 sets the timing (time) as the timing when the direction of the motion indicating the reaction of the spectator is switched.

In this case, for example, a length of a period T13 from a timing of becoming the maximum immediately before the period T11 to a timing of becoming the minimum in the period T11, in the time-series data of the angular acceleration is a half period time of the motion indicating the reaction of the spectator.

Note that, since actual sensing information includes noises, the sensing information analysis unit 51 may execute the processing in step S12, after smoothing a moving average or the like on the time-series data obtained in step S11.

Furthermore, for example, as illustrated on the upper side in FIG. 18, the actual motion of the penlight includes a motion such as a so-called "holding motion" for moving the penlight little without changing the angle of the penlight for a certain period of time when the direction is changed.

On the upper side in FIG. 18, a state is illustrated in which the spectator makes a motion for swinging (move) a penlight PL11 to the left and right while holding the penlight PL11 and performing a holding motion.

In this way, in a case where the spectator makes the holding motion at the left and right ends when the spectator swings the penlight PL11 to the left and right, for example, the sensing information analysis unit 51 obtains time-series data of the angular speed illustrated on the lower side in FIG. 18. Here, a polygonal line L21 indicates the time-series data of the angular speed.

In this case, for example, in a range T21 where the absolute value of the angular speed is equal to or less than a certain value, it can be determined that the motion of the penlight PL11 stops.

Therefore, the sensing information analysis unit 51 records an elapsed time $p_{stop}$ from when it is assumed (determined) the penlight PL11 stop most recently, and in a case where the elapsed time $p_{stop}$ becomes equal to or more than a predetermined period $p_1$, the sensing information analysis unit 51 assumes that the motion of the penlight PL11 is in a holding state.

For example, in this example, a portion of a period T22 in the polygonal line L21 corresponds to a state illustrated at the center in FIG. 18, that is, a state where the penlight PL11 is held at the right end. In FIG. 18, in the portion illustrated at the center, when the penlight PL11 is held at the right end, it is found that the direction of the penlight PL11 is nearly unchanged.

For example, when the processing in step S12 is executed last time, the penlight PL11 is in a holding state. However, when the processing in step S12 is executed this time, it is assumed that the switching of the direction of the motion of the penlight PL11 be detected.

In such a case, the sensing information analysis unit 51 may supply the elapsed time $p_{stop}$ at the time when the switching of the direction of the motion is detected as additional information indicating a time of the holding motion of the penlight PL11, to the transmission unit 52.

However, in a case where a predetermined time sufficiently longer than the period $p_1$ is set as $p_2$ and the elapsed time $p_{stop} > p_2$ is satisfied, the sensing information analysis unit 51 assumes that the motion of the penlight PL11 is not the holding motion and the motion of the penlight PL11 has stopped. Then, the sensing information analysis unit 51 may supply information indicating that the motion of the penlight PL11 stops, that is, the reaction of the spectator is lost, to the transmission unit 52.

Returning to the description of the flowchart in FIG. 14, in step S13, the sensing information analysis unit 51 determines whether or not the switching of the direction of the motion of the spectator (penlight) is detected, through the processing in step S12.

In a case where it is determined in step S13 that the switching of the direction is detected, in step S14, the sensing information analysis unit 51 generates the period information, and supplies the period information to the transmission unit 52 and the reaction video/voice generation unit 55. Note that, for example, in a case where the additional information indicating the time of the holding motion is generated in step S12, the processing in step S13 is executed.

For example, the sensing information analysis unit 51 obtains a difference $(t-t_{before})$ between a time $t_{before}$ when the direction of the motion of the spectator (penlight) has changed last time and a time t when the direction of the motion of the spectator has changed this time, as a time corresponding to the half period of the motion of the spectator (half period information). Furthermore, the sensing information analysis unit 51 obtains an angle indicating the motion of the spectator at the time t, that is, for example, an angle of the penlight with respect to the horizontal plane, as the angle information.

The sensing information analysis unit 51 supplies information including the obtained half period information and angle information to the transmission unit 52 and the reaction video/voice generation unit 55, as the period information. At this time, the period information may include the additional information indicating the time of the holding motion described above and the additional information indicating that the reaction of the spectator is lost.

Note that, in a case where a single spectator corresponding to the spectator terminal 11 holds penlight type holding devices (sensing device 41) with the right hand and the left hand and these holding devices are connected in a wireless manner or the like, a plurality of pieces of sensing information may be obtained.

In such a case, the sensing information analysis unit 51 may execute the processing in steps S11 to S14 twice and generate and transmit the period information for each sensing information (sensing device 41).

In addition, from a viewpoint for avoiding an increase in an operation load and an increase in an information amount caused by executing the processing in steps S11 to S14 twice, processing may be executed only on the information (sensing information) regarding one of the penlights according to a communication state or a calculation resource of the spectator terminal 11 so as to generate the period information.

In step S15, the transmission unit 52 transmits the period information supplied from the sensing information analysis unit 51 to the server on the network 14 and ends the period information generation processing.

Furthermore, in a case where it is determined in step S13 that the switching of the direction is not detected, since the period information is not transmitted, the processing in steps S14 and S15 is not executed, and the period information generation processing ends.

As described above, the spectator terminal 11 generates the period information on the basis of the sensing information and transmits the period information to the server on the network 14. Since the spectator terminal 11 generates the period information only in a case where the switching of the direction of the motion of the spectator is detected, even in a case where there are a large number of spectator terminals 11, the remote live can be realized with a less communication amount and a less processing load.

<Description of Content Reproduction Processing>

Furthermore, while executing the period information generation processing described above, the spectator terminal 11 simultaneously executes content reproduction processing for receiving the other person's period information and the distribution video/voice and presenting the presented video/voice as content. Hereinafter, the content reproduction processing executed by the spectator terminal 11 will be described with reference to the flowchart in FIG. 19. For example, the content reproduction processing is executed for each frame of the distribution video and the distribution voice.

In step S41, the reception unit 53 receives the distribution video/voice transmitted from the server on the network 14, more specifically, the encoded distribution video/voice, and supplies the distribution video/voice to the video/voice decoding unit 54.

In step S42, the reception unit 53 receives period information of the other spectator terminal 11 transmitted from the server on the network 14, that is, the other person's period information, and supplies the period information to the reaction video/voice generation unit 55.

Note that, whereas the distribution video/voice is transmitted in frame units or the like at certain time intervals, the other person's period information is transmitted at indefinite time intervals. That is, the other person's period information is transmitted at the timing when the switching of the direction of the motion of the other person (other spectator) is detected by the other spectator terminal 11. Therefore, more specifically, the processing in step S42 is not constantly executed at the time when the content reproduction processing for one frame is executed, and the processing in step S42 is executed at the timing when the other person's period information is transmitted.

In step S43, the distribution video/voice decoding unit 54 decodes the distribution video/voice supplied from the reception unit 53 and supplies the distribution video/voice to the reaction video/voice generation unit 55 and the video/voice superimposing unit 56.

In step S44, the reaction video/voice generation unit 55 generates the reaction video/voice on the basis of the other person's period information supplied from the reception unit 53 and supplies the reaction video/voice to the video/voice superimposing unit 56.

At this time, the reaction video/voice generation unit 55 generates the reaction video/voice, appropriately using the own terminal period information supplied from the sensing information analysis unit 51 and the distribution video/voice supplied from the distribution video/voice decoding unit 54 as the auxiliary information.

For example, in step S44, only one of the reaction video and the reaction voice may be generated or both of the reaction video and the reaction voice may be generated.

However, here, description is continued while assuming that both of the reaction video and the reaction voice are generated.

Furthermore, in step S44, processing for generating a correspondence table indicating a correspondence between the object and the period information is executed as necessary. Note that details of the generation of the reaction video and the reaction voice and the correspondence table will be described later.

In step S45, the video/voice superimposing unit 56 generates the presented video/voice on the basis of the distribution video/voice supplied from the distribution video/voice decoding unit 54 and the reaction video/voice supplied from the reaction video/voice generation unit 55 and supplies the presented video/voice to the video/voice output unit 57.

In step S46, the video/voice output unit 57 executes processing for appropriately converting a format (format) on the presented video/voice supplied from the video/voice superimposing unit 56 and outputs the presented video/voice obtained as a result to the video/voice output device 42.

As a result, the video/voice output device 42 displays the presented video and outputs the presented voice. That is, content provided by the remote live system is reproduced. When the presented video/voice is presented to the spectator, the content reproduction processing ends.

As described above, the spectator terminal 11 generates the reaction video/voice appropriately using the auxiliary information such as the own terminal period information or the distribution video/voice, in other words, the information indicating the environment of the own terminal and presents the presented video/voice obtained from the reaction video/voice to the spectator.

In this way, it is possible to present the presented video/voice with less uncomfortable feeling, and as a result, the remote live with the sense of unity can be realized.

<Description of Reaction Reproduction Processing>

Furthermore, at the time when the distribution video/voice is distributed, the performer terminal 12 executes reaction reproduction processing for receiving the period information transmitted from the plurality of spectator terminals 11 and presenting the reaction video/voice. Hereinafter, the reaction reproduction processing executed by the performer terminal 12 will be described with reference to the flowchart in FIG. 20.

In step S71, the reception unit 91 receives the period information transmitted from the server on the network 14 and supplies the period information to the reaction video/voice generation unit 92.

In step S72, the reaction video/voice generation unit 92 generates the reaction video/voice on the basis of the period information supplied from the reception unit 91 and supplies the reaction video/voice to the video/voice output unit 93.

At this time, the reaction video/voice generation unit 92 generates the reaction video/voice appropriately using the raw video/voice supplied from outside, as the auxiliary information.

In step S73, the video/voice output unit 93 executes processing for appropriately converting the format, on the reaction video/voice supplied from the reaction video/voice generation unit 92 and outputs the reaction video/voice obtained as a result to the video/voice output device 81 as the presented video/voice.

As a result, the video/voice output device 81 displays the reaction video and outputs the reaction voice. Therefore, the performer can perform a performance while viewing the reactions of a large number of spectators. When the reaction video/voice is presented in this way, the reaction reproduction processing ends.

As described above, the performer terminal 12 generates the reaction video/voice, appropriately using the raw video/voice that is the information indicating the environment of the own terminal as the auxiliary information and presents the reaction video/voice to the performer.

In this way, it is possible to present the reaction video/voice with less uncomfortable feeling, and as a result, the remote live with the sense of unity can be realized.

<Configuration Example of Reaction Video/Voice Generation Unit>

Subsequently, a specific example of configurations and operations of the reaction video/voice generation unit 55 and the reaction video/voice generation unit 92 will be described.

Figure 21:
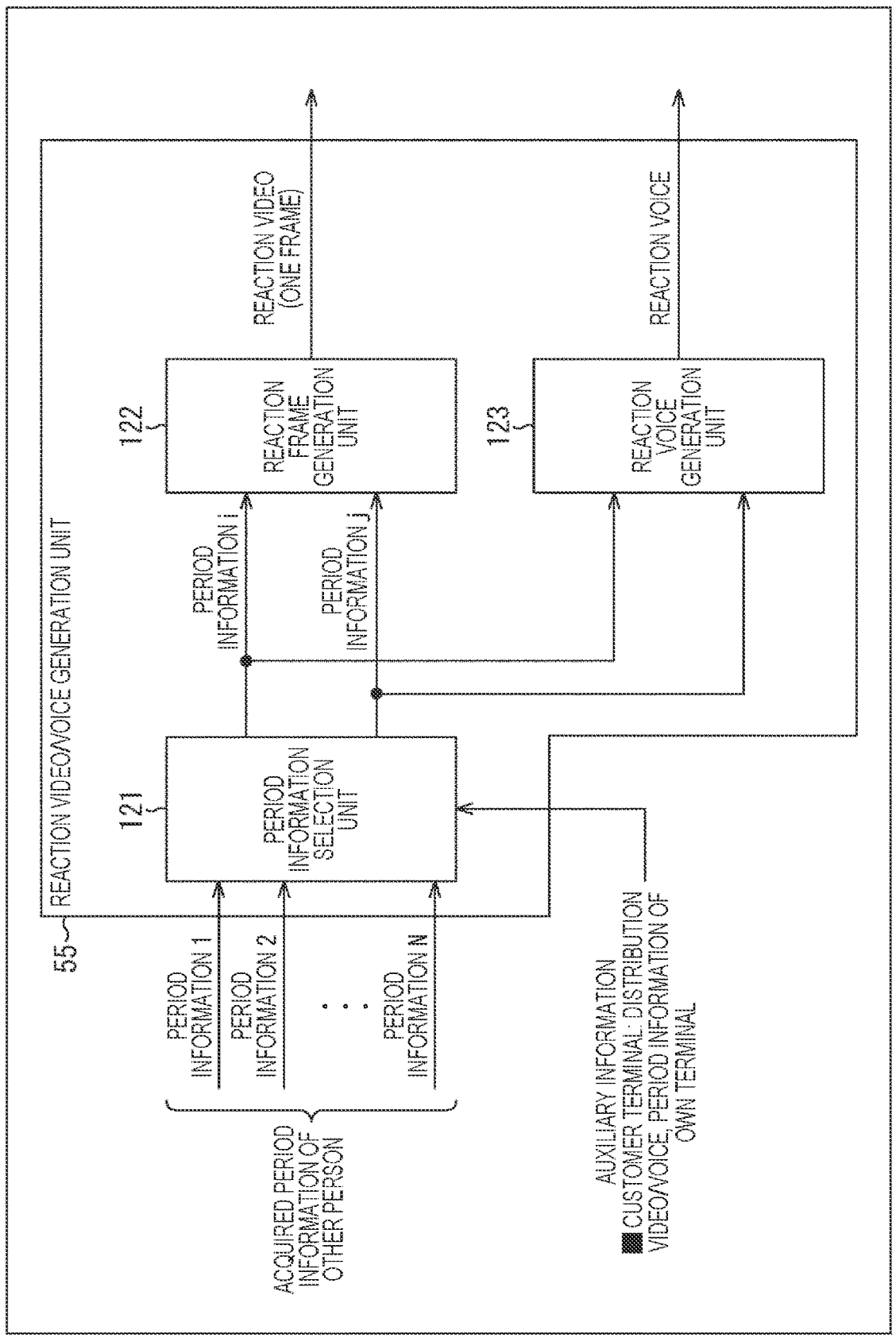
FIG. 21 is a diagram illustrating a configuration example of a reaction video/voice generation unit.

The reaction video/voice generation unit 55 is more specifically configured, for example, as illustrated in FIG. 21.

The reaction video/voice generation unit 55 includes a period information selection unit 121, a reaction frame generation unit 122, and a reaction voice generation unit 123.

The period information selection unit 121 selects a predetermined number (one or more) of pieces of other person's period information from among the plurality of pieces of other person's period information, on the basis of the other person's period information supplied from the reception unit 53 and the auxiliary information supplied from the sensing information analysis unit 51 and the distribution video/voice decoding unit 54 and supplies the selected other person's period information to the reaction frame generation unit 122 and the reaction voice generation unit 123.

For example, the period information selection unit 121 selects the period information, using at least one of the own terminal period information supplied from the sensing information analysis unit 51 or the distribution video/voice supplied from the distribution video/voice decoding unit 54, as the auxiliary information.

Here, an ID used to identify (specify) the period information is referred to as a period information ID, and period information of which the period information ID is n is written as period information n. This period information ID can be an ID used to specify a spectator terminal 11 of the other person.

In the example in FIG. 21, N pieces of other person's period information having period information IDs 1 to N are received. Then, two pieces of other person's period information including period information i and period information j (however, $1 \leq i$, $j \leq N$) are selected from among the N pieces of other person's period information, and the other person's period information is supplied to the reaction frame generation unit 122 and the reaction voice generation unit 123.

Note that, hereinafter, the period information selected from among the plurality of pieces of other person's period information by the reaction video/voice generation unit 55 and the reaction video/voice generation unit 92 is also particularly referred to as selection period information.

The reaction frame generation unit 122 generates an image for one frame of the reaction video, on the basis of the period information i and the period information j supplied from the period information selection unit 121, that is, the selection period information and supplies the image to the video/voice superimposing unit 56.

The reaction voice generation unit 123 generates the reaction voice on the basis of the selection period information (period information i and period information j) supplied from the period information selection unit 121 and supplies the reaction voice to the video/voice superimposing unit 56.

Figure 22:
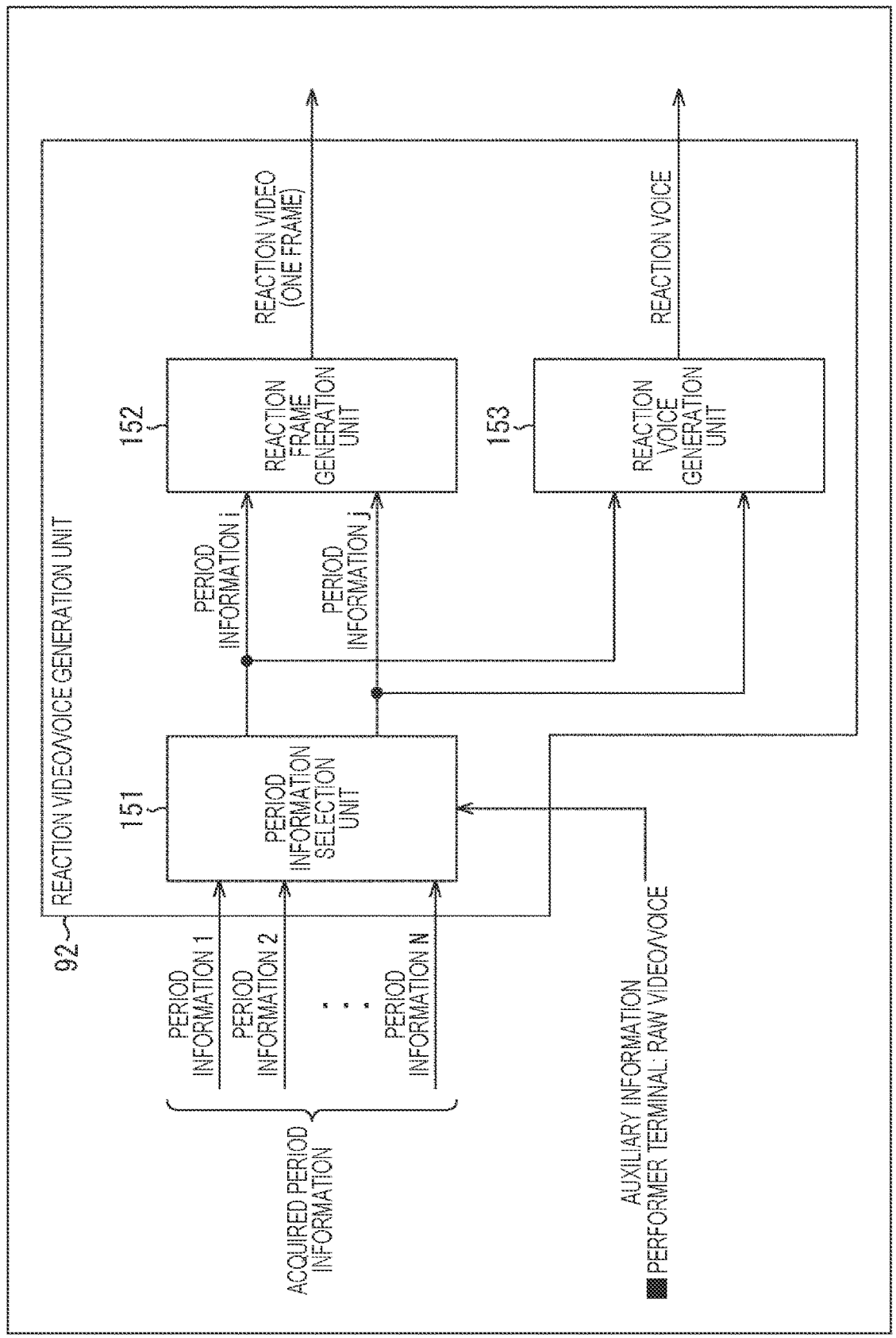
FIG. 22 is a diagram illustrating a configuration example of the reaction video/voice generation unit.

Furthermore, the reaction video/voice generation unit 92 is configured, for example, as illustrated in FIG. 22.

In this example, the reaction video/voice generation unit 92 includes a period information selection unit 151, a reaction frame generation unit 152, and a reaction voice generation unit 153.

Since these period information selection unit 151 to the reaction voice generation unit 153 are respectively similar to the period information selection unit 121 to the reaction voice generation unit 123 of the reaction video/voice generation unit 55, description thereof is omitted. However, the raw video/voice is supplied from outside to the period information selection unit 151 as the auxiliary information.

<About Operation of Period Information Selection Unit>

Next, operations of the period information selection unit 121 of the reaction video/voice generation unit 55 and the period information selection unit 151 of the reaction video/voice generation unit 92 will be described.

Since processing executed by the period information selection unit 121 and processing executed by the period information selection unit 151 are basically the same, hereinafter, description is continued as assuming that the processing is mainly executed by the period information selection unit 121.

The period information selection unit 121 selects the most appropriate period information for the own terminal from among the plurality of acquired pieces of other person's period information, on the basis of selection criteria to be specifically described below.

Note that it is desirable that the selection criteria to be described below be dynamically switched according to a situation. That is, the selected period information may be dynamically changed. Furthermore, the number of pieces of selected period information can be dynamically changed. The selected period information and the number of pieces of selection period information can be dynamically changed not only by the period information selection unit 121 but also by the period information selection unit 151.

For example, in a case where valid information is not obtained when a selection criterion is adopted, the period information selection unit 121 selects the period information by prioritizing another selection criterion. Furthermore, regarding the selection criteria to be described below, it is desirable to use a part or all of the selection criteria in combination.

(Use Tempo Information and Beat (Pulse) Information of Voice)

First, an example will be described in which the tempo information or the beat information of the voice is used as the selection criterion when the period information is selected.

For example, it is possible to use a tempo of the distribution voice (or raw voice), that is, tempo information indicating a beat, that can be acquired using known beat tracking rhythm recognition technique, DNN, or the like, using the distribution voice (or raw voice) being viewed as an input, for the selection of the period information.

In this case, the period information in which a value of the half period indicated by the half period information of the period information is the same as the length of one beat of the distribution voice (or raw voice) indicated by the tempo information obtained from the auxiliary information or is the closest to an integral multiple of the length of the one beat of the distribution voice (or raw voice) is selected as the selection period information. In this way, it is possible to select the period information that is synchronized with a tempo of a song reproduced by the distribution voice relatively well.

Figure 23:
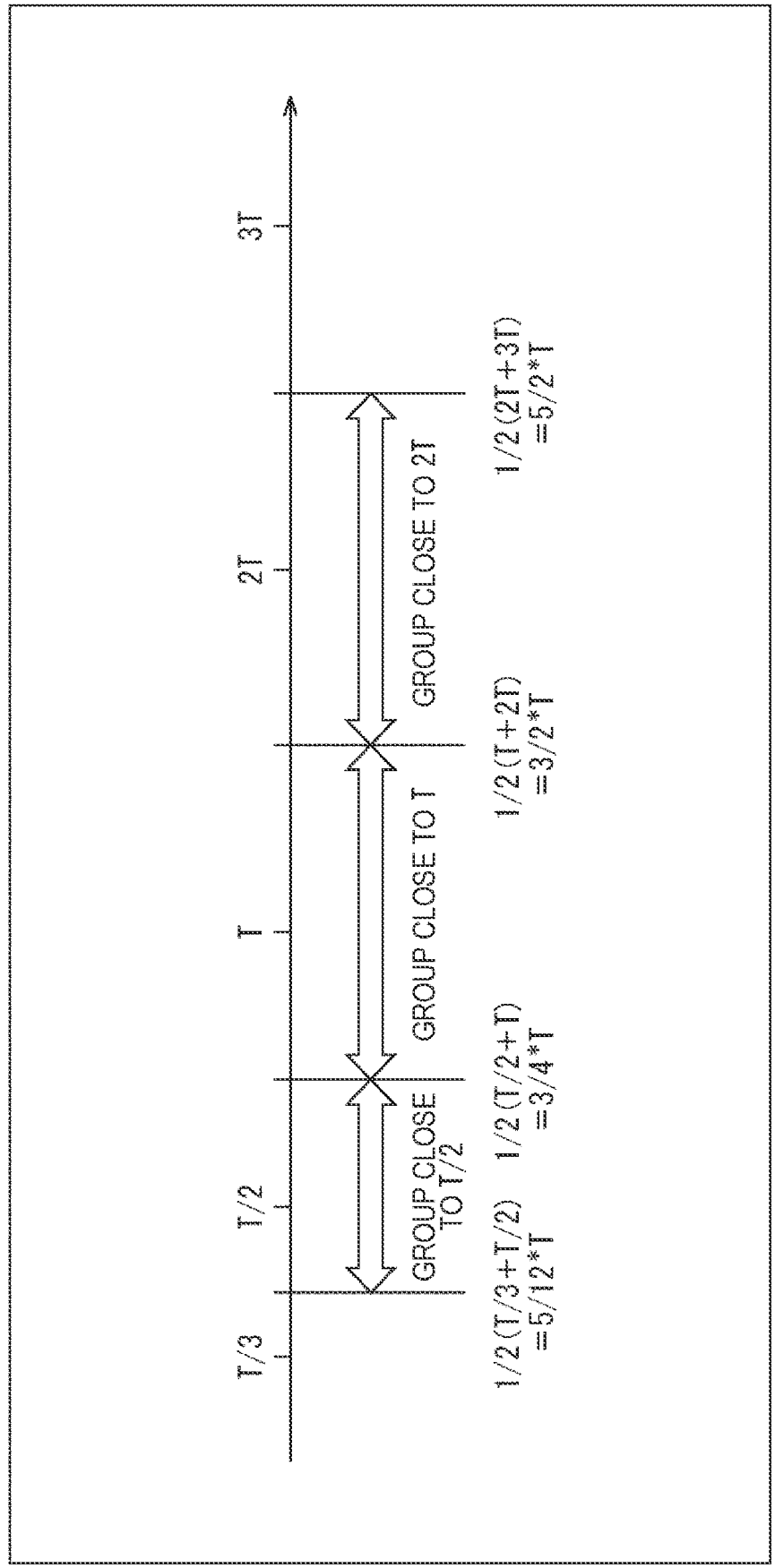
FIG. 23 is a diagram for explaining selection of the period information based on tempo information.

At this time, for example, in a case where the length of the one beat of the distribution voice indicated by the tempo information is T, as illustrated in FIG. 23, grouping is performed so that each period information belongs to any one of a plurality of groups including a group of which the length of the half period is close to T/2, a group of which the length of the half period is close to T, and a group of which the length of the half period is close to 2T, and the like.

In the example in FIG. 23, the group is formed based on an average value of the length of the beat, and for example, period information of which the length of the half period is equal to or more than 5/12T and less than 3/4T is classified into the "group of which the length of the half period is close to T/2".

Then, for example, the single or the plurality of pieces of period information is selected as the selection period information, from the group to which the largest number of pieces of period information belong.

As a more specific example, for example, it is assumed that a value of the tempo information of the distribution voice obtained on the basis of the distribution voice by the period information selection unit 121 as the auxiliary information be 60 BPM [second].

In this case, the period information selection unit 121 groups each piece of the period information acquired from the reception unit 53 into period information of which the half period is close to 1 (=60/60) seconds, period information of which the half period is close to two seconds, . . . .

Then, the period information selection unit 121 selects a group to which the largest number of pieces of period information belong from among the plurality of groups and selects period information to be the pieces of selection period information as many as a predetermined number, from the period information belonging to the selected group, on the basis of the half period information.

For example, if it is assumed that the group having the largest number of pieces of period information be the group of which the half period is close to two seconds, the period information selection unit 121 selects a predetermined number of pieces of period information as the selection period information from period information of which the half period indicated by the half period information is closer to two seconds in order, from among the pieces of period information belonging to the group.

Figure 24:
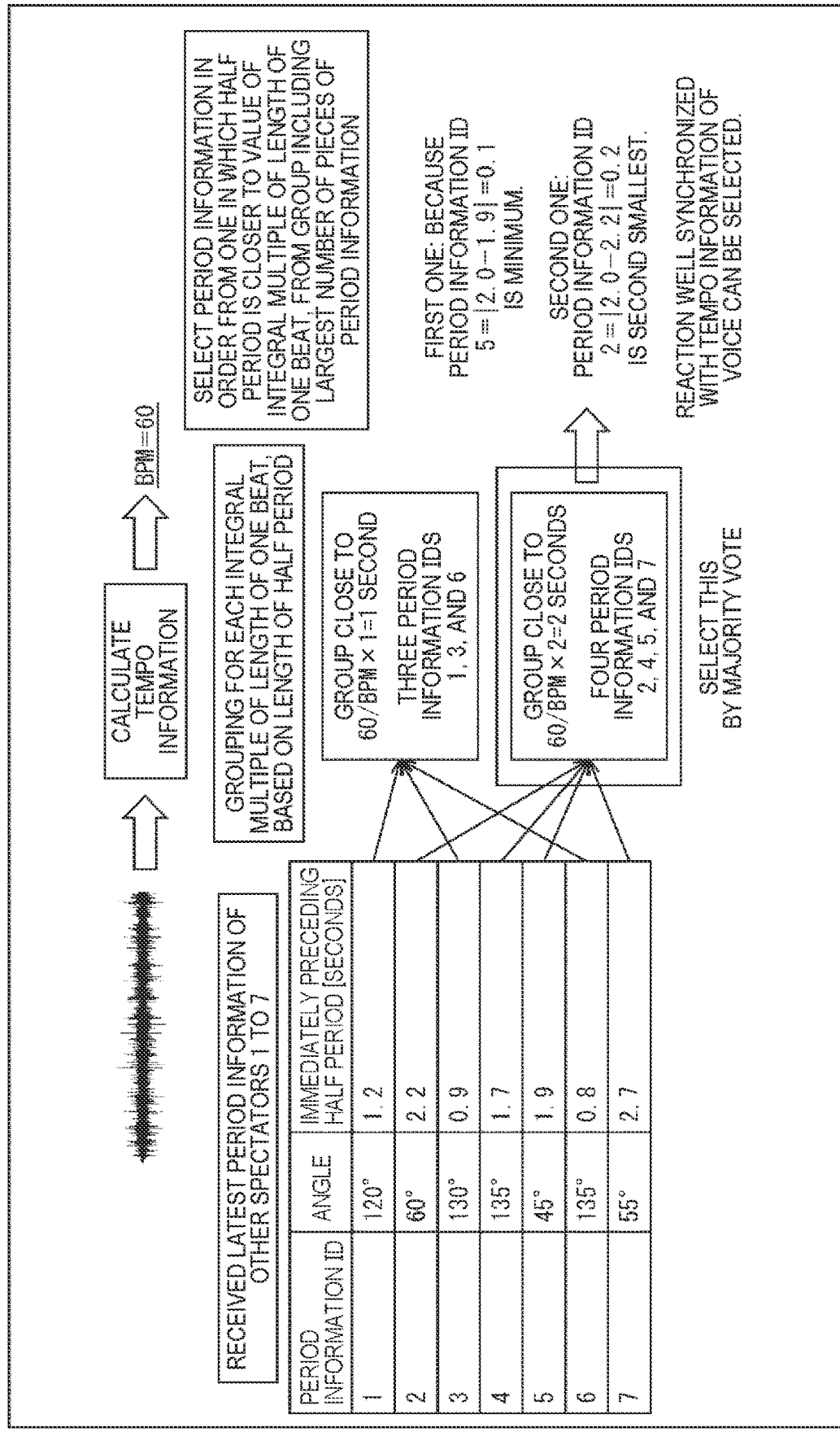
FIG. 24 is a diagram for explaining the selection of the period information based on the tempo information.

A more specific example is illustrated in FIG. 24.

As illustrated on the upper side in FIG. 24, it is assumed that the tempo information indicating the tempo "60 BPM" be obtained, as a result of calculating the tempo information of the distribution voice by the period information selection unit 121. That is, it is assumed that a length of one beat of the distribution voice be one second.

Furthermore, as latest period information, as illustrated on the left side in FIG. 24, it is assumed that period information 1 to period information 7 that are the other person's period information be acquired and two pieces of period information be selected from among the seven pieces of period information. Here, for each of the period information 1 to the period information 7, a period information ID, angle information (angle), and half period information (immediately preceding half period) are indicated.

Now, when the other person's period information is grouped for each integer multiple of the length of the one beat on the basis of the length of the half period, as illustrated at the center in FIG. 24, the other person's period information is divided into a group of which the half period is close to one second and a group of which the half period is close to two seconds.

In this example, three pieces of period information in total including the period information 1, the period information 3, and the period information 6 belong to the "group close to one second", and the remaining four pieces of period information in total including the period information 2, the period information 4, the period information 5, and the period information 7 belong to the "group close to two seconds".

Next, the period information selection unit 121 selects the group to which more pieces of period information belong, from among the two groups obtained by grouping. Therefore, here, the "group close to two seconds" to which the four pieces of period information belong is selected.

Then, the period information selection unit 121 selects two pieces of period information as the selection period information from among the pieces of period information belonging to the selected "group close to two seconds".

Specifically, for example, period information having the half period close to the value of the integral multiple of the length of the one beat of the distribution voice, here, "two seconds" that is twice of the length of the one beat is selected.

In this case, a difference between the half period and "two seconds" that is twice of the length of the one beat (difference absolute value) is the smallest in a case of the period information 5 of which the half period is "1.9", and the difference is "0.1".

Furthermore, in a case of the period information 2 of which the half period is "2.2", the difference between the half period and "two seconds" is small subsequent to the period information 5, the difference is "0.2".

Therefore, the period information 5 and the period information 2 are selected as the selection period information. Since these pieces of selection period information are period information of a reaction of other person (spectator) that is the most synchronized with the tempo of the distribution voice, it can be said that these pieces of selection period information are appropriate selection period information.

Furthermore, for example, using time-series information such as a beat generation time or a sound generation time of an instrument sound, obtained from the beat tracking rhythm recognition technique, the DNN, or the like, period information updated (received) at a timing closest to the beat generation time or the sound generation time of the instrument sound may be selected.

Since the timing when the period information is updated is exactly the timing when the swinging direction of the penlight changes, with this method, it is possible to select the reaction for swinging the penlight in synchronization with the beat of the distribution voice.

Figure 25:
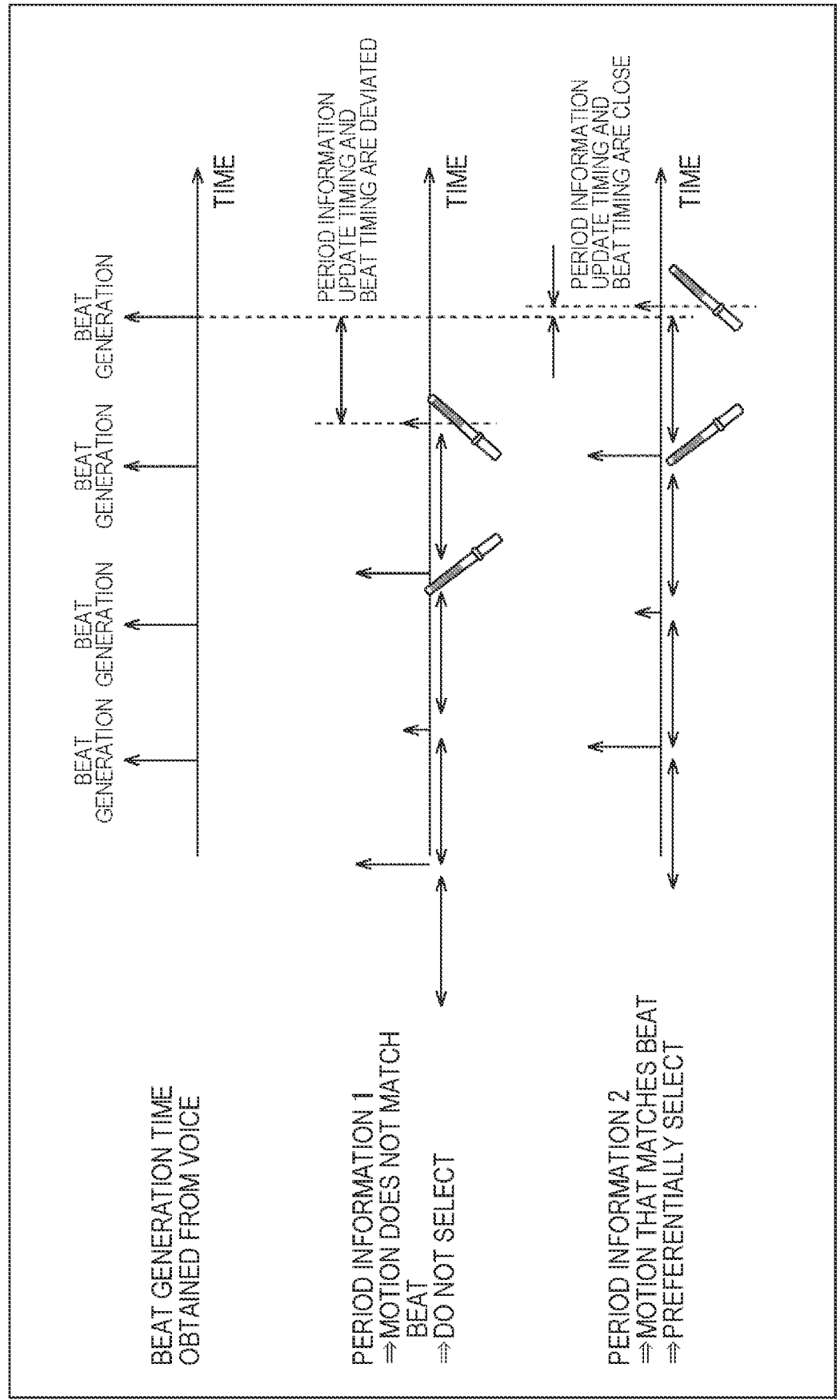
FIG. 25 is a diagram for explaining selection of the period information based on beat information.

Specifically, for example, it is assumed that the period information selection unit 121 obtain (generated) the time-series information indicating the beat (beat) generation time as illustrated on the upper side in FIG. 25, as the beat information of the distribution voice, on the basis of the distribution voice as the auxiliary information.

On the upper side in FIG. 25, the horizontal axis indicates a time (time), and in FIG. 25, an upward convex arrow represents a beat generation time of the distribution voice.

Furthermore, it is assumed that the period information selection unit 121 acquire the period information 1 illustrated at the center in FIG. 25 and the period information 2 illustrated on the lower side in FIG. 25, and select one of the period information 1 and the period information 2 as the selection period information.

Note that, at the center and the lower side in FIG. 25, the horizontal axis indicates a time (time), and an upward convex arrow in FIG. 25 indicates the timing when the period information is updated, that is, the timing when the moving direction of the penlight that moves leftward and rightward is switched.

Here, when the timing when the period information 1 is updated and the beat generation time indicated by the beat information, that is, the beat timing are compared, the timings deviate from each other. Therefore, it cannot be said that the period information 1 is appropriate as the period information for the distribution voice.

On the other hand, since the timing when the period information 2 is updated is close to the timing of the beat indicated by the beat information, a reaction of a spectator corresponding to the period information 2, that is, the motion of the penlight by the spectator is a motion in accordance with the beat of the distribution voice. Therefore, it can be said that the period information 2 is appropriate period information for the distribution voice.

Therefore, the period information selection unit 121 preferentially selects the period information 2 that is updated at the timing closer to the beat generation timing indicated by the beat information as the selection period information, among the period information 1 and the period information 2.

(Use Period Information Acquired by Own Terminal)

Furthermore, for example, in the spectator terminal 11, the period information selection unit 121 may select the selection period information from among the plurality of pieces of other person's period information, using the own terminal period information acquired from the sensing information analysis unit 51 by the period information selection unit 121 as the auxiliary information.

Here, a period information ID of the own terminal period information is set to "0", and the own terminal period information is written as period information 0 to be distinguished from the period information 1 to the period information N that are the other person's period information.

For example, the period information selection unit 121 selects other person's period information of which a half period is the closest to a half period indicated by half period information of the period information 0, from among the plurality of pieces of other person's period information.

As a specific example, for example, as illustrated in FIG. 26, it is assumed that, as the latest period information, the period information 0 that is the own terminal period information and the period information 1 to the period information 4 that are the other person's period information be acquired. Here, regarding each of the period information 0 to the period information 4, the angle information (angle), the half period information (immediately preceding half period), and a difference between the period information 0 and the half period are indicated.

Now, two pieces of period information are selected as the selection period information, from among the period information 1 to the period information 4. In particular, it is assumed that two pieces of which the length of the half period is close to the period information 0 be selected from among the four pieces of period information.

In this case, since other person's period information having a half period that is the closest to the half period "1.1" of the period information 0 is the period information 1 of which the difference of the half period is "+0.1", the period information 1 is selected as first selection period information. Furthermore, since the period information 3 of which the difference of the half period is "−0.2" has the second smallest difference from the half period of the period information 0, the period information 3 is selected as second selection period information.

Furthermore, for example, the other person's period information updated (received) at the timing closest to the timing when the period information 0 is updated, that is, the moving direction of the penlight (object) of the spectator corresponding to the own terminal is switched may be selected as the selection period information.

In this way, a possibility increases that it is possible to select the other person's period information in which not only the period but also the swinging direction of the penlight are synchronized. As a result, the spectator can feel the motion got along with the other person when viewing the presented video.

Specifically, for example, it is assumed that the period information be obtained at a timing illustrated in FIG. 27.

Note that, in FIG. 27, the horizontal axis indicates a time (time), and an upward convex arrow in FIG. 27 indicates a timing when the period information is updated, that is, the timing when the moving direction of the penlight that moves leftward and rightward is switched. In particular, in FIG. 27, a size of an upward convex arrow indicates a size of the angle information in the period information.

In FIG. 27, on the upper side in FIG. 27, a timing when the period information 0 is updated is illustrated, at the center in FIG. 27, a timing when the period information 1 is updated is illustrated, and on the lower side in FIG. 27, a timing when the period information 2 is updated is illustrated.

Furthermore, here, it is assumed that the period information selection unit 121 acquire the period information 1 and the period information 2 and one of the period information 1 and the period information 2 be selected as the selection period information.

In this case, when the period information 0 is compared with the period information 1, a deviation (time difference) of the update timings of these pieces of period information increases. Therefore, there is a possibility that the direction of the motion indicating the reaction of the spectator of the own terminal is different from that of the other person (other spectator) corresponding to the period information 1.

On the other hand, when the period information 0 is compared with the period information 2, a deviation (time difference) of the update timings of these pieces of period information is significantly smaller than that in a case of the period information 1. Therefore, there is a high possibility that the direction of the motion indicating the reaction of the spectator of the own terminal is the same as that of the other person (other spectator) corresponding to the period information 2.

Therefore, the period information selection unit 121 preferentially selects the period information 2 with the smaller deviation of the update timing from the period information 0, from the period information 1 and the period information 2, as the selection period information. As a result, the deviation is caused, for example, by a possibility that the direction of the motion indicating the reaction of the spectator of the own terminal and that of the other person (other spectator) are different can be more reliably suppressed.

(Use Period Information that can be Generated from Video)

Moreover, for example, depending on the program of the remote live, a motion of a performer who keeps rhythm with the hand or body is detected by a method such as known image recognition or motion detection from the distribution video (or raw video), and the period information can be obtained by executing processing similar to that in a case of the sensing information analysis unit 51.

Therefore, the period information selection unit 121 may generate the period information from the distribution video and select the selection period information with the above method using the period information instead of the period information 0. In this case, the period information selection unit 151 can also use the period information generated from the raw video, instead of the period information 0.

(Receive Period Information to be Reference)

Furthermore, for example, the distributor, in particular, a person in charge of public address (PA) may transmit period information to be a reference to the spectator terminal 11 or the performer terminal 12 via the server on the network 14, by the recording/distribution device 13 or the like.

In such a case, for example, the period information selection unit 121 of the spectator terminal 11 and the period information selection unit 151 of the performer terminal 12 select the selection period information, using the received period information to be the reference, instead of the period information 0.

In addition, for example, the period information selection unit 121 and the period information selection unit 151 may use the received period information to be the reference, as one of the selection period information.

Such a method using the period information to be the reference is particularly effective for a program or the like of which the tempo information is hard to be acquired.

(Analyze History of Half Period)

Moreover, a history of values of the past half period is analyzed for each period information, and period information with a smaller variance of the half period may be preferentially selected. This is because, in a case where the variance of the half period is small, a possibility is high that the spectator (penlight) performs a stable and periodic motion.

Specifically, for example, it is assumed that period information illustrated in FIG. 28 be obtained. Note that, in FIG. 28, on each of the upper left side and the lower left side in FIG. 28, angle information (angle) and half period information (half period) included in period information at each time for a single period information ID are illustrated.

Furthermore, in FIG. 28, on the upper right side and the lower right side, timings when the period information illustrated on the upper left side and the period information on the lower left side in FIG. 28 are acquired are illustrated. In particular, the horizontal axis indicates a time (time), and an upward convex arrow in FIG. 28 indicates the timing when the period information is updated, that is, the timing when the moving direction of the penlight that moves to leftward and rightward is switched. Furthermore, in FIG. 28, a size of an upward convex arrow indicates the side of the angle information in the period information.

In FIG. 28, in the example of the period information illustrated on the upper side, the half period at each time is a value between 1.1 and 1.5, and it is found that the variance of the period information is small. The reaction of the spectator corresponding to such period information, that is, the motion of the penlight is a motion with high periodicity for moving the penlight to the left and right at certain time intervals.

Therefore, if such period information is used as the selection period information, it is possible to easily generate the reaction video of the object that makes a periodic motion.

Therefore, the period information selection unit 121 and the period information selection unit 151 may obtain the variance of the half period based on the period information by analyzing the history of the period information for each other user (other person) and preferentially select period information of which the obtained variance is small, as the selection period information.

On the other hand, in the example of the period information illustrated on the lower side in FIG. 28, the half period at each time is a value between 0.3 and 2.7, and it is found that the variance of the period information is large.

That is, the reaction of the spectator (motion of penlight) corresponding to the period information varies, and the reaction is a motion with low periodicity.

Therefore, since such period information is not suitable for generating the reaction video, it is sufficient to make it difficult to select the period information as the selection period information.

As described above, the period information selection unit 121 and the period information selection unit 151 can select the selection period information, on the basis of the analysis result of the history of the other person's period information received at each time.

<About Correspondence Between Period Information and Object>

Although the period information selection unit 121 and the period information selection unit 151 select one or more pieces of selection period information by the method described above, whether or not to actually generate each object included in the reaction video from which selection period information is managed, for example, according to the correspondence table illustrated in FIG. 29.

In FIG. 29, an example of the correspondence table in a case where 50 objects are displayed in the reaction video is illustrated. For example, each object corresponds to the spectator corresponding to each spectator terminal 11. Note that, hereinafter, an ID used to identify (specify) the object in the reaction video is referred to as an object ID.

The correspondence table defines which selection period information is used to generate each object. In the correspondence table, the object ID and a period information ID of the selection period information used to generate the object indicated by the object ID are associated.

In this example, on the basis of the correspondence table, a reaction video in which 50 objects are arranged on a screen is generated.

At this time, for example, it is found that 10 objects in total having object IDs 26 to 35 are generated on the basis of the period information 2 having the period information ID of two. This period information 2 is, for example, period information generated by the spectator terminal 11B.

Note that a maximum number of objects displayed in the reaction video may be determined, for example, on the basis of a screen resolution of the video/voice output device 42 or the video/voice output device 81 that displays the reaction video, calculation resources of the spectator terminal 11 and the performer terminal 12, or the like.

Furthermore, it is sufficient that which object is generated on the basis of which selection period information be determined according to an arrangement position of each object in the reaction video or the like. For example, if objects arranged at positions close to each other are generated on the basis of the same selection period information, it is possible to obtain a reaction video with less uncomfortable feeling in which the motions of the objects are synchronized.

Here, as a specific example, a case where nine objects in the reaction video are generated will be described with reference to FIG. 30.

Figure 30:
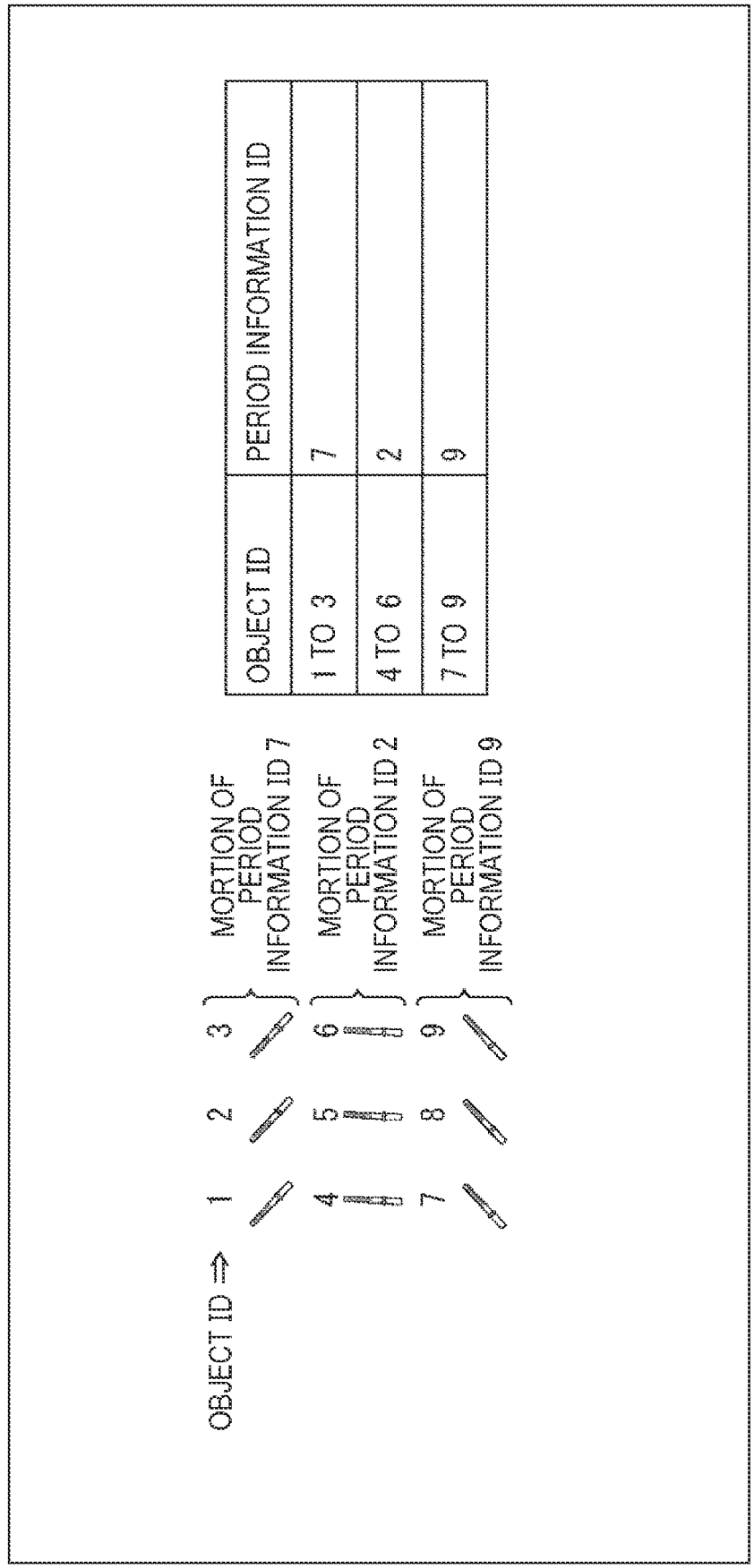
FIG. 30 is a diagram for explaining generation of an object based on the correspondence table.

In FIG. 30, the correspondence table is illustrated on the right side in FIG. 30, and a penlight as the object generated according to the correspondence table is illustrated on the left side in FIG. 30.

In this example, objects having object IDs 1 to 3 are generated on the basis of the selection period information of which the period information ID is seven. Therefore, as illustrated in an upper portion on the left side in FIG. 30, the respective objects having the object IDs 1 to 3 make a motion same as the motion indicated by the period information 7, and the directions of the objects are the same.

Furthermore, the objects having object IDs 4 to 6 are generated on the basis of the selection period information of which the period information ID is two. Therefore, as illustrated in a middle portion on the left side in FIG. 30, the respective objects having the object IDs 4 to 6 make a motion same as the motion indicated by the period information 2, and the directions of the objects are the same.

However, it is found that the motions (direction) of the objects with the object IDs 4 to 6 are different motions from the motions of the objects with the object IDs 1 to 3 generated from the different piece of period information.

Similarly, the objects having object IDs 7 to 9 are generated on the basis of the selection period information of which the period information ID is nine. Therefore, as illustrated in a lower portion on the left side in FIG. 30, the respective objects having the object IDs 7 to 9 make a motion same as the motion indicated by the period information 9, and the directions of the objects are the same.

However, it is found that the motions (direction) of the objects having the object IDs 7 to 9 are motions different from the motions of the objects having the object IDs 1 to 3 and the motions of the objects having the object IDs 4 to 6, generated from the different pieces of period information.

Figure 19:
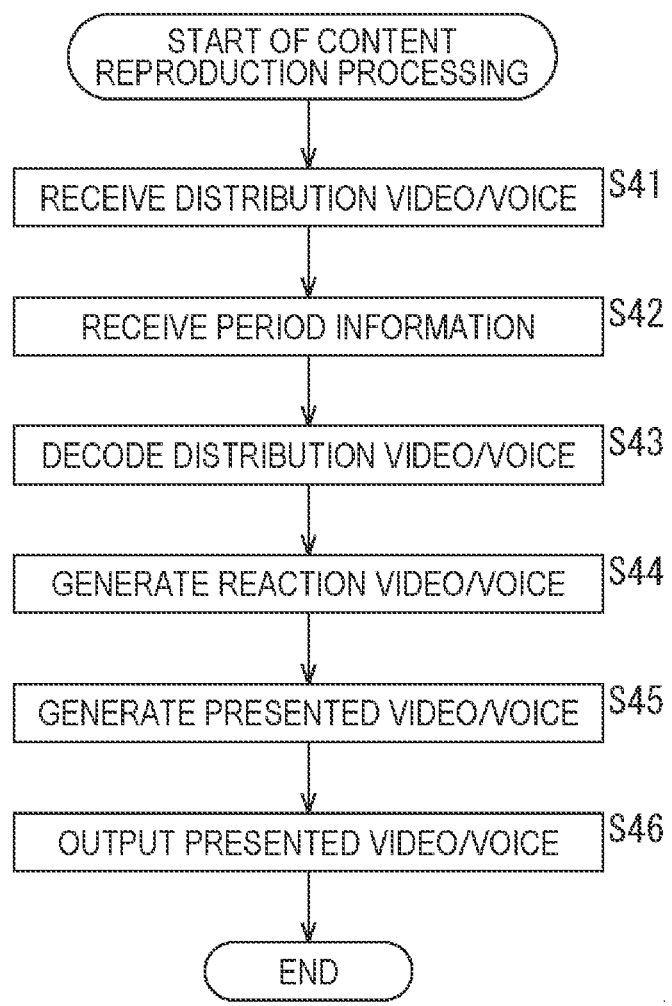
FIG. 19 is a flowchart for explaining content reproduction processing.

For example, in step S44 in the content reproduction processing described with reference to FIG. 19, the processing for selecting the selection period information by the period information selection unit 121 and the processing for generating (updating) the correspondence table according to a selection result of the selection period information are appropriately executed as necessary.

In this case, the period information selection unit 121 supplies the selection period information and the correspondence table to the reaction frame generation unit 122 and the reaction voice generation unit 123.

Note that it is considered that the processing for selecting the selection period information and the processing for generating the correspondence table are executed, for example, when the program (song) of the remote live is changed or repeatedly and continuously executed in a period when clapping and calls for requesting an encore occur.

Figure 20:
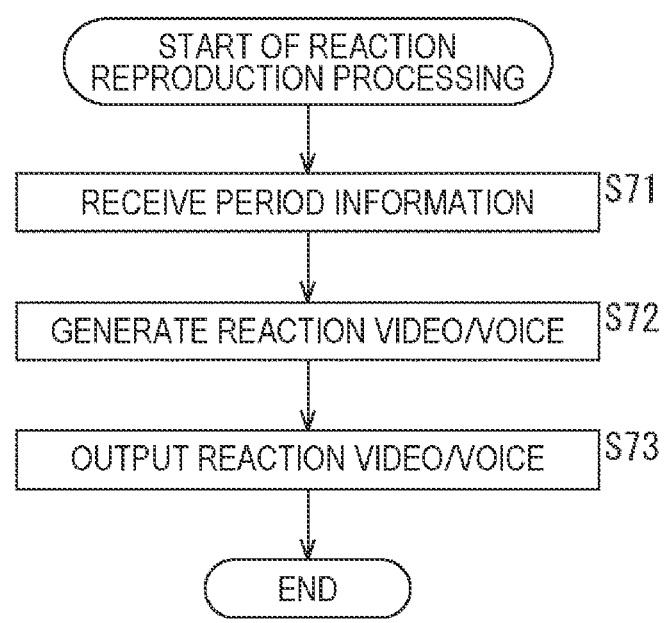
FIG. 20 is a flowchart for explaining reaction reproduction processing.

Furthermore, for example, in step S72 in the reaction reproduction processing described with reference to FIG. 20, the processing for selecting the selection period information by the period information selection unit 151 and the processing for generating (updating) the correspondence table according to a selection result of the selection period information are appropriately executed as necessary.

<About Generation of Reaction Video>

Next, operations of the reaction frame generation unit 122 of the reaction video/voice generation unit 55 illustrated in FIG. 21 and the reaction frame generation unit 152 of the reaction video/voice generation unit 92 illustrated in FIG. 22 will be described.

For example, the reaction video is a video in which an angle of an object, that is, a direction of the object changes at a frame rate similar to that in the distribution video (for example, 30 fps).

Therefore, the processing for generating the reaction video is periodically executed in synchronization with the processing for decoding the distribution video, and an image corresponding to one frame of the distribution video is output.

Here, an outline of the processing for generating the reaction video will be described with reference to FIG. 31.

Note that, hereinafter, to simplify description, a motion of which an angular speed is fixed is assumed as a motion of an object, and it is assumed that there is no period information (additional information) in a holding state, and no problem is caused such that it is not possible to notify (transmit and receive) the period information.

Figure 31:
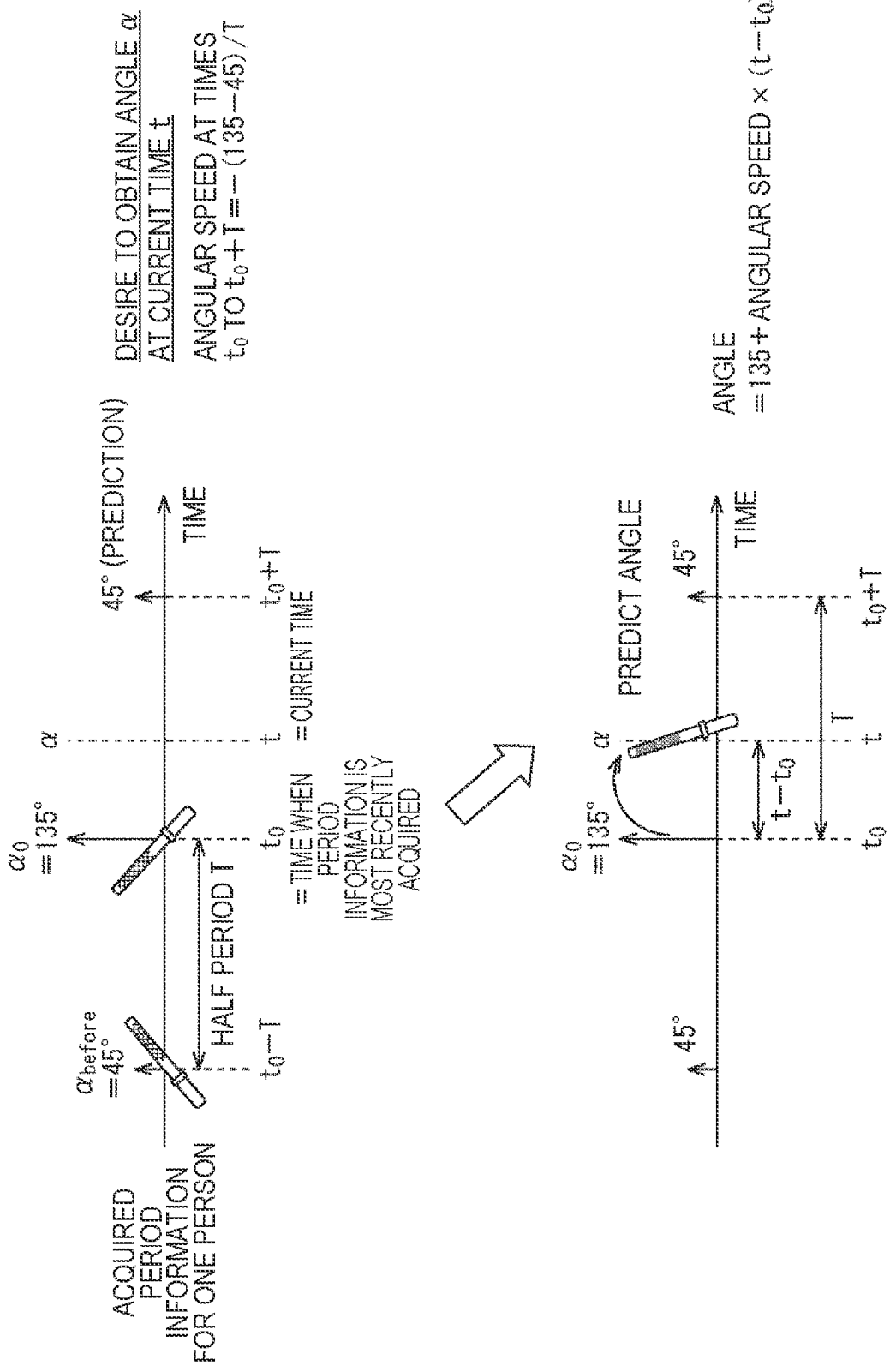
FIG. 31 is a diagram for explaining generation of a reaction video.

Furthermore, in FIG. 31, the horizontal axis indicates a timing (time), and an upward convex arrow in FIG. 31 indicates the timing when the period information is updated, that is, the timing when the direction of the penlight that moves to leftward and rightward is switched. Furthermore, in FIG. 31, a size of the upward convex arrow indicates the size of the angle information in the period information, that is, the direction (angle) of the penlight.

On the upper side in FIG. 31, selection period information at each time for a single period information ID is illustrated.

Here, a current time is t, and a time when the period information is acquired (received) most recently is $t_0$. Furthermore, an angle $\alpha_0$ indicated by angle information included in the period information at the time $t_0$ is 135°, and a length of a half period indicated by half period information included in the period information at the time $t_0$ is T.

Moreover, a time when the period information is acquired (received) immediately before the time $t_0$ is $(t_0-T)$, and an angle $\alpha_{before}$ indicated by angle information included in the period information at the time $(t_0-T)$ is 45°.

Now, it is considered to obtain the angle $\alpha$ of the object (penlight) at the time t that is the current time.

Here, the angle $\alpha$ is obtained on the basis of the time $t_0$ and the period information at the time $t_0$, that is, the angle $\alpha_0$, the half period T, and an angle $\alpha_{before}$ at the time $(t_0-T)$, and an image of an object facing a direction indicated by the angle $\alpha$ is generated.

Specifically, first, the angular speed is obtained from the two pieces of period information most recently acquired.

In this example, since the angle indicated by the angle information changes from the angle $\alpha_{before}=45°$ to the angle $\alpha_0=135°$ in the half period T, the angular speed $\omega$ from the time $(t_0-T)$ to the time to can be obtained by the following formula (1).

[Expression 1]

$$\omega = \frac{\alpha_0 - \alpha_{before}}{T} \quad (1)$$

Furthermore, in a next half period after the time to, the object is expected to move at the same angular speed in the opposite direction to that in a case between the time $(t_0-T)$ and the time $t_0$.

Therefore, the angular speed $\omega$ between the time to and the time $(t_0+T)$ can be obtained by the following formula (2) by inverting the sign in the formula (1) above.

[Expression 2]

$$\omega = -\frac{\alpha_0 - \alpha_{before}}{T} \quad (2)$$

In the example on the upper side in the drawing, the angular speed $\omega$ between the time $t_0$ and the time $(t_0+T)$ is $\omega=-(135-45)/T$ according to the formula (2).

Next, as illustrated on the lower side in the drawing, from the obtained angular speed $\omega$, the direction of the object at the time t, that is, the angle $\alpha$ indicating the direction of the object is obtained.

Specifically, if the angular speed is $\omega$ and the current time is t, the angle $\alpha$ to be obtained can be obtained according to the following formula (3), using the time to when the period information is most recently received (updated) and the angle $\alpha_0=135°$ at the time $t_0$.

[Expression 3]

$$\alpha = \alpha_0 + \omega(t - t_0) \quad (3)$$

In the example on the lower side in the drawing, since the angle $\alpha_0=135°$, $\alpha=135+\omega(t-t_0)$ according to the formula (3)

<Description of Reaction Frame Generation Processing>

Next, processing executed by the reaction frame generation unit 122 will be more specifically described.

In step S44 in the content reproduction processing described with reference to FIG. 19, the reaction frame generation unit 122 executes reaction frame generation processing for generating a reaction frame that is the reaction video for one frame on the basis of the selection period information.

Hereinafter, the reaction frame generation processing executed by the reaction frame generation unit 122 will be described with reference to the flowchart in FIG. 32.

In step S101, the reaction frame generation unit 122 acquires an object ID indicating an object to be processed and period information corresponding to the object ID.

For example, the reaction frame generation unit 122 acquires and records the correspondence table from the period information selection unit 121 in advance, and acquires the selection period information indicated by the period information ID associated with the acquired object ID in the correspondence table from the period information selection unit 121.

In step S102, the reaction frame generation unit 122 determines whether or not the angle $\alpha$ indicating the direction of the object (penlight) at the current time has been already calculated for the acquired selection period information.

For example, in the example of the correspondence table illustrated in FIG. 29, for the object (penlight) of which the object ID is one and the objects of which the object IDs are two to 25, the angle $\alpha$ is calculated on the basis of the same period information 7.

Therefore, for example, in a case where the angle $\alpha$ has been already calculated for the object of which the object ID is one, when the objects of which the object IDs are two to 25 are processing targets, it is determined in step S102 that the angle $\alpha$ has been calculated.

Similarly, for example, in a case where the angle α of the object of which the object ID is 26 has been calculated, it is determined that the angle α of the objects of which the object IDs are 27 to 35 has been calculated. Furthermore, in a case where the angle α of the object of which the object ID is 36 has been calculated, it is determined that the angle α of the objects of which the object IDs are 37 to 50 has been calculated.

In a case where it is determined in step S102 that the angle α has not been calculated, the reaction frame generation unit 122 determines whether or not the period information is updated in step S103.

For example, in a case where new selection period information that has not been acquired so far is acquired in step S101, it is determined that the period information is updated.

In a case where it is determined in step S103 that the period information is updated, the reaction frame generation unit 122 updates the angular speed ω of the motion of the object in step S104.

For example, as described with reference to FIG. 31, the reaction frame generation unit 122 calculates the angular speed ω by calculating the following formula (4), on the basis of an angle $\alpha_0$ indicated by angle information of the updated (latest) selection period information, a half period T indicated by half period information of the updated selection period information, and an angle $\alpha_{before}$ indicated by the angle information of the selection period information before update. This formula (4) is similar to the formula (2) described above.

[Expression 4]

$$\omega = -\frac{\alpha_0 - \alpha_{before}}{T} \quad (4)$$

Note that, here, description is made as assuming that the angle $\alpha_{before}$ exists. However, since the angle $\alpha_{before}$ does not exist when the period information is received first, the processing in steps S104 to S108 is skipped in such a case.

In a case where the processing in step S104 is executed, or the period information is not updated in step S103, that is, it is determined that the new selection period information is not received, the processing in step S105 is executed.

In step S105, the reaction frame generation unit 122 calculates the angle α indicating the direction of the motion of the object at the current time t, on the basis of the angular speed ω of the motion of the object.

For example, the reaction frame generation unit 122 obtains the angle α by calculating the following formula (5), on the basis of the time to when the selection period information has been most recently received, the current time t, the angular speed ω, and the angle $\alpha_0$. The formula (5) is similar to the formula (3) described above.

[Expression 5]

$$\alpha = \alpha_0 + \omega(t - t_0) \quad (5)$$

Note that a maximum value $\alpha_{max}$ or a minimum value $\alpha_{min}$ of the angle α is determined as $\alpha_{max} \mp \alpha_{before}$ or $\alpha_{min} \approx \alpha_{before}$, in a case where the angle α has reached the maximum value $\alpha_{max}$ or the minimum value $\alpha_{min}$, the method for calculating the angle α may be changed as indicated by the following formula (6), until the selection period information is updated next time.

[Expression 6]

$$\alpha = \alpha_{max} \pm \delta \text{ or } \alpha_{min} \pm \delta \quad (6)$$

In the formula (6), ±δ is a random minute value indicating a swing caused by holding the penlight as the object with the hand. That is, the object is held and kept to be inclined to the right or the left at this stage.

Furthermore, in a case where it is determined in step S102 that the angle α has been calculated, the processing in steps S103 to S105 is skipped, and the processing proceeds to step S106.

In step S106, the reaction frame generation unit 122 adds a random value (random value) equal to or less than a certain amount, to the angle α of the object to be processed.

Through this processing, it is possible to prevent the motions of the respective objects generated from the same selection period information from being completely the same and from being felt as a mechanical motion.

When the processing in step S105 or in step S106 is executed, thereafter, the processing in step S107 is executed.

In step S107, the reaction frame generation unit 122 generates an image of a single object facing a direction indicated by the angle α of the object to be processed as an object image.

In this case, an object having a specific object ID may be displayed in a special display format different from normal ones, on the basis of a price of a donation for the remote live, that is, a consumption amount for support and meta information of the object corresponding to the spectator, for example, indicating that the spectator has purchased goods in advance. Furthermore, for example, by a method for transmitting unique object information (3D model or the like) as the meta information, together with the period information by each spectator terminal 11 only once, the method for displaying the specific object may be changed on the basis of the meta information.

By the above method, it is possible to make each spectator strongly recognize that the spectator sees the object corresponding to the existing other person and more strongly have feeling of participating in the live event together with the other persons.

In step S108, the reaction frame generation unit 122 overwrites and arranges the object image of the object to be processed generated in the step S107, on an image for one frame (frame image) of the reaction video to be generated. In other words, the object image is synthesized with the frame image.

Note that, an arrangement position of the object image on the frame image may be determined for each object ID in advance or may be dynamically changed according to a screen resolution of the own terminal (video/voice output device 42) or the like. For example, a method is considered, for example, for arranging objects associated with the same period information ID at relatively close positions in the frame image.

The reaction frame generation unit 122 executes the processing described above as many as the number of objects displayed in the reaction video.

That is, in step S109, the reaction frame generation unit 122 determines whether or not there is an object to be processed that has not been set to be a processing target yet.

In a case where it is determined in step S109 that there is an object to be processed, the processing returns to step S101, and the above processing is repeatedly executed. That is, an object that has not been set as the processing target yet is set as a new processing target object, and the object image is generated, and the frame image is updated on the basis of the object image.

On the other hand, in a case where it is determined in step S109 that there is no object to be processed, the reaction frame generation unit 122 outputs the frame image obtained (updated) by the processing in step S108 that has been most recently executed to the video/voice superimposing unit 56 as the image for one frame of the reaction video, and ends the reaction frame generation processing.

Note that there is a case where the reaction voice is not generated in step S44 in the content reproduction processing described with reference to FIG. 19.

In such a case, the processing by the reaction voice generation unit 123 is not executed, and zero data (zero data) may be output from the reaction voice generation unit 123 as the reaction voice, and the reaction voice may be invalidated.

Furthermore, in the reaction frame generation processing described above, a case where there is no elapsed time $p_{stop}$ indicating the holding time, that is, no additional information indicating the holding time has been described.

On the other hand, in a case where there is the additional information indicating the holding time, at the time when the angular speed ω is calculated, it is sufficient to perform calculation in the following formula (7), instead of the formula (4).

[Expression 7]

$$\omega = -\frac{\alpha_0 - \alpha_{before}}{T - p_{stop}} \quad (7)$$

Note that the formula (7) is a formula in which the holding time indicated by the additional information is set to $p_{stop}$ and the half period T in the formula (4) is replaced with "$T-p_{stop}$".

In this way, after the update of the selection period information, the angle α reaches the maximum value $\alpha_{max}$ or the minimum value $\alpha_{min}$ at a relatively early stage, and a motion with less change in the angle α is realized, and this enables an expression of the holding state.

As described above, the reaction frame generation unit 122 generates the reaction video on the basis of the selection period information. In particular, the reaction frame generation unit 122 generates the object images of the plurality of objects on the basis of the one or more pieces of period information selected by the period information selection unit 121, and the object images are arranged on the frame image. In this way, it is possible to present the reaction video with less uncomfortable feeling in which the motions (reactions) of the plurality of objects is synchronized.

Note that, in step S72 in the reaction reproduction processing described with reference to FIG. 20, the reaction frame generation unit 152 executes processing similar to the reaction frame generation processing described with reference to FIG. 32. Therefore, it is possible to present the reaction video with less uncomfortable feeling by the performer terminal 12.

Another Example 1 of First Embodiment

<Example of Generating Reaction Video and Reaction Voice>

Note that, in the above, an example in which only the reaction video is generated has been described. However, both of the reaction video and the reaction voice may be generated.

Hereinafter, a case will be described where the reaction video and the reaction voice are generated at the same time. In particular, hereinafter, as an example, a case will be described where the reaction video is a video in which the object corresponding to the spectator claps and the reaction voice is clapping sounds of a large number of people.

Even in such a case, the configuration of the remote live system is set as the configuration illustrated in FIG. 7. Therefore, here, only differences from the first embodiment to be described below will be described.

Operation of sensing information analysis unit 51
Operations of reaction voice generation unit 123 and reaction voice generation unit 153

Note that, in the example described below, since the object in the reaction video is different from that in a case of the first embodiment, the operations of the reaction frame generation unit 122 and the reaction frame generation unit 152 are strictly different from those in a case of the first embodiment.

However, as described later, only a point that the information regarding the angle (angle information) is not included in the period information is different. Since the reaction video can be generated with the method similar to that in a case of the first embodiment in the example described below, the description thereof is omitted.

(Example of Period Information)

First, an example of the period information will be described.

Figure 33:
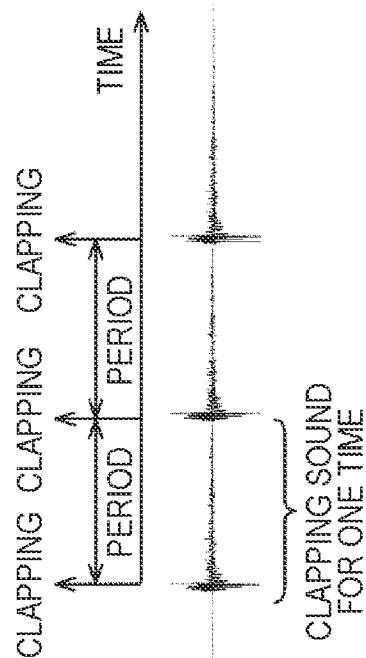
FIG. 33 is a diagram for explaining the period information.

For example, in a case where the motion (reaction) of the spectator is a clapping motion, the period information generated by each spectator terminal 11 is elapsed time information indicating an elapsed time from when clapping by the spectator is generated last time as illustrated on the left side in FIG. 33 to when clapping is generated this time. That is, the elapsed time information is time information indicating a time (length) of one period of clapping as the reaction of the spectator.

This is because, if there is elapsed time information indicating a time for one period of the clapping motion, it is possible to generate a reaction video including an object that performs the clapping motion and a reaction voice including the clapping sound.

The reaction voice generation unit 123 and the reaction voice generation unit 153 define a timing of clapping on the basis of time-series period information as illustrated on the right side in the drawing. Then, by reproducing a one-time clapping sound a plurality of times according to the timing, a reproduction sound for one object corresponding to one spectator is obtained.

Note that, on the right side in the drawing, the horizontal axis indicates a time (time), and in the drawing, an upward convex arrow indicates a timing when clapping occurs specified on the basis of a predetermined single piece of period information i.

Furthermore, in the drawing, a waveform illustrated on the right side indicates a waveform of the reproduction sound of the clapping of one object, including a waveform of the clapping sound reproduced at the timing when the clapping is generated. In this example, sound of three times of clapping generated on the basis of the period information i is reproduced.

(Operation of Sensing Information Analysis Unit)

Subsequently, the operation of the sensing information analysis unit 51 will be described.

The operation of the sensing information analysis unit 51 is basically similar to a case of the first embodiment. However, for example, instead of detecting the motion of the spectator on the basis of the sensing information, a clapping timing may be detected by analyzing a voice obtained by collecting (recording) sound with the microphone as the sensing device 41 through processing such as known voice section detection, and the elapsed time information as the period information may be generated from the detection result. That is, the sensing information analysis unit 51 may convert a sound collection signal as the sensing information into the period information.

(Operation of Reaction Voice Generation Unit)

Figure 34:
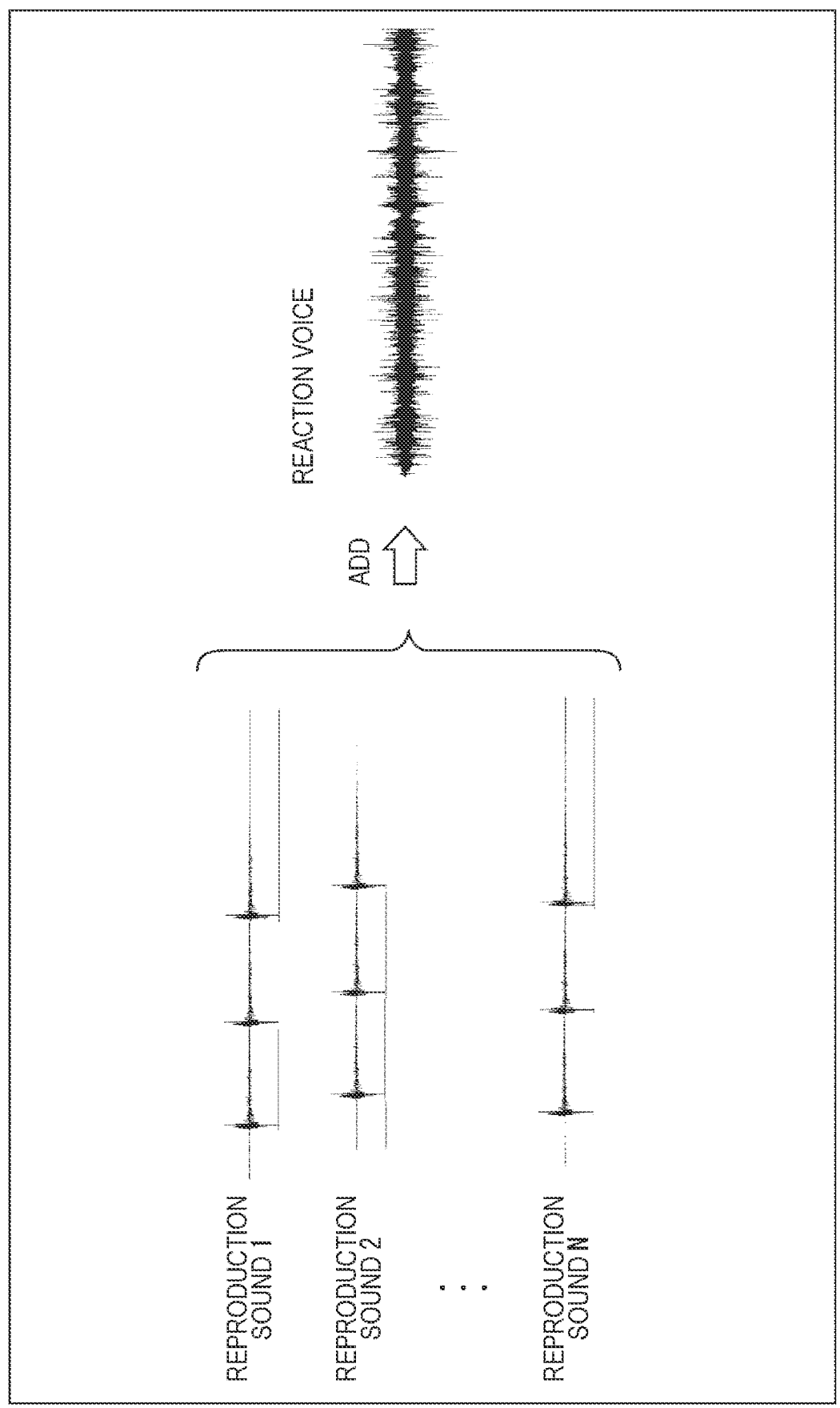
FIG. 34 is a diagram for explaining generation of a reaction voice.

Next, an outline of the operations of the reaction voice generation unit 123 and the reaction voice generation unit 153 is illustrated in FIG. 34.

On the left side in FIG. 34, waveforms of reproduction sounds 1 to N respectively for N persons, that is, N objects generated on the basis of some pieces of selection period information are illustrated.

Here, processing for generating the reproduction sound that is the clapping sound of one object is executed N times on the basis of the selection period information, and the N reproduction sounds 1 to N are generated.

Then, the reproduction sounds 1 to N are synthesized, that is, added (added) so as to generate a single reaction voice. In the drawing, on the right side, a waveform of the generated reaction voice is illustrated, and this reaction voice is a clapping sound when the N persons (N objects) clap, that is, clapping sounds of the N persons.

<Description of Reaction Voice Generation Processing>

Figure 32:
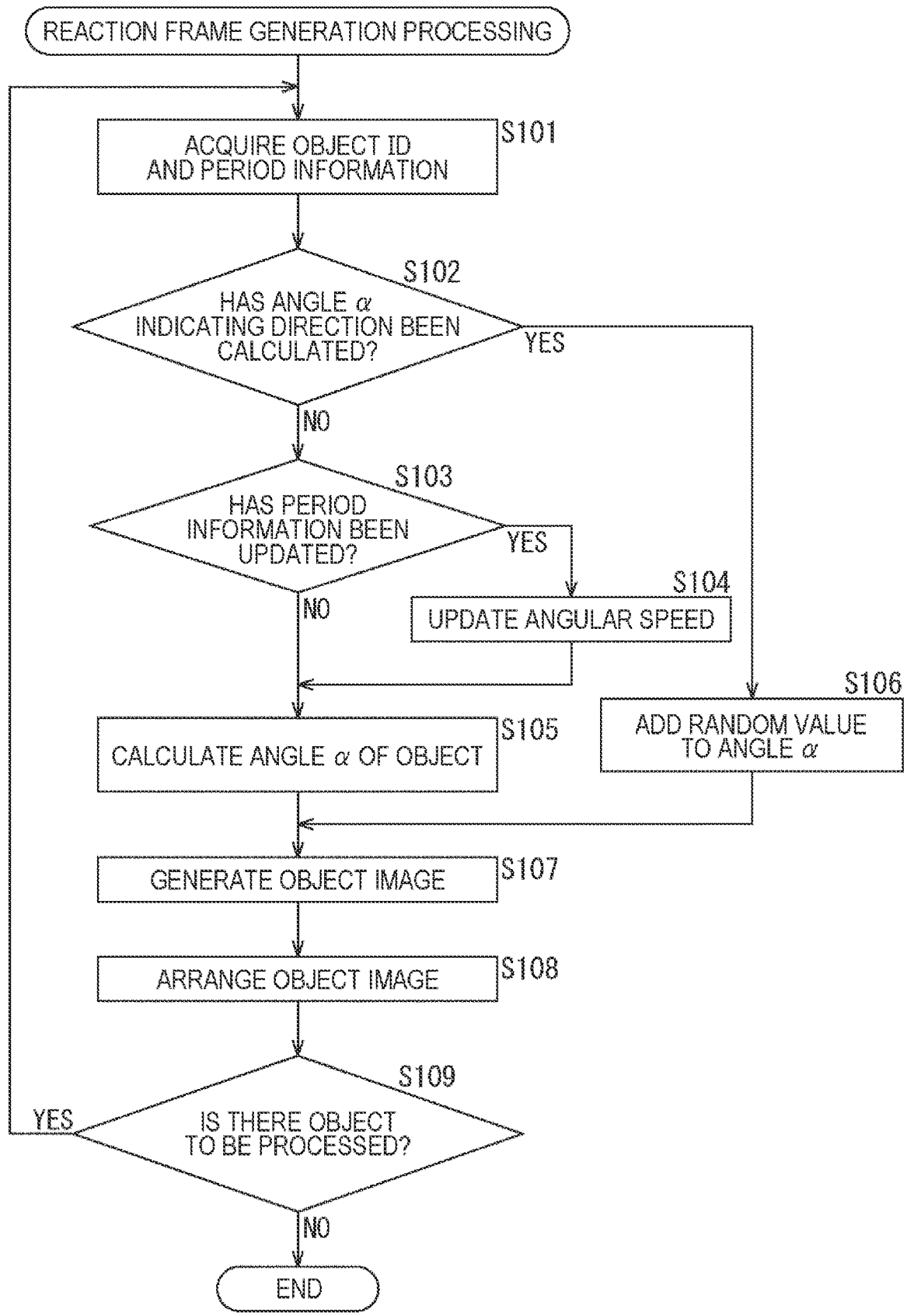
FIG. 32 is a flowchart for explaining reaction frame generation processing.

In this embodiment, in step S44 in the content reproduction processing described with reference to FIG. 19, processing similar to the reaction frame generation processing described with reference to FIG. 32 is executed by the reaction frame generation unit 122, and the reaction voice generation processing is executed by the reaction voice generation unit 123.

Figure 35:
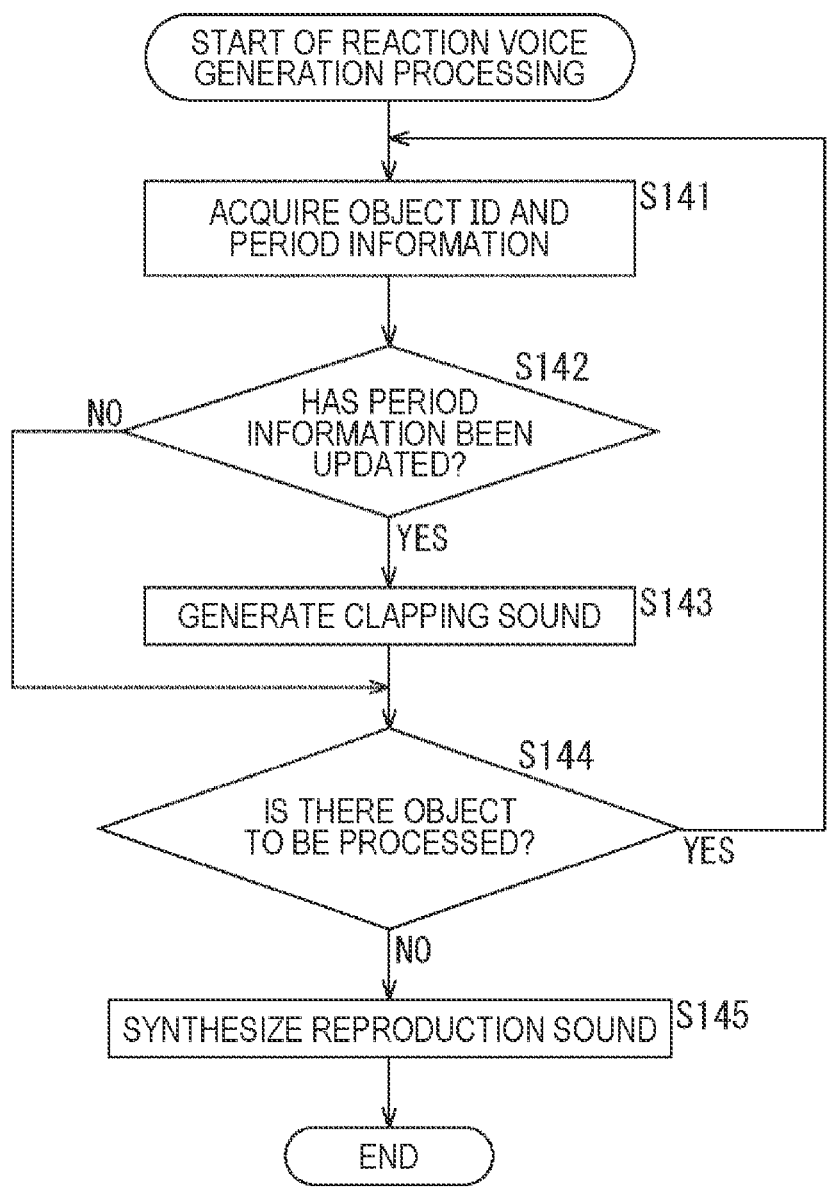
FIG. 35 is a flowchart for explaining reaction voice generation processing.

Hereinafter, with reference to the flowchart in FIG. 35, the reaction voice generation processing executed by the reaction voice generation unit 123 will be described.

In step S141, the reaction voice generation unit 123 acquires an object ID of an object to be processed and period information corresponding to the object ID.

For example, the reaction voice generation unit 123 acquires and records the correspondence table from the period information selection unit 121 in advance, and acquires the selection period information indicated by the period information ID associated with the acquired object ID in the correspondence table from the period information selection unit 121.

In step S142, the reaction voice generation unit 123 determines whether or not the period information has been updated. For example, in a case where new selection period information that has not been acquired so far is acquired in step S141, it is determined that the period information has been updated.

In a case where it is determined in step S142 that the period information has been updated, in step S143, the reaction voice generation unit 123 generates one time of clapping sound as the reproduction sound, on the basis of the selection period information acquired in step S141 and voice data of the clapping sound recorded in advance.

At this time, in a case where the same selection period information is used to generate the reproduction sounds of the plurality of objects, reproduction timings of the clapping sounds in the reproduction sounds are constantly deviated by a time equal to or less than a certain amount. This is because, if the reproduction timings of the clapping sounds of the plurality of objects completely match, it becomes unnatural.

Furthermore, in a case where it is determined in step S142 that the period information is not updated, the processing in step S143 is not executed, and the processing proceeds to step S144.

When the processing in step S143 is executed or it is determined in step S142 that the period information is not updated, processing in step S144 is executed.

That is, in step S144, the reaction voice generation unit 123 determines whether or not there is an object to be processed that has not been set as the processing target yet.

In a case where it is determined in step S144 that there is the object to be processed, the processing returns to step S141, and the processing described above is repeatedly executed. That is, the object that has not been set as the processing target yet is set as a new processing target, and a reproduction sound of the object is generated.

On the other hand, in a case where it is determined in step S144 that there is no object to be processed, in step S145, the reaction voice generation unit 123 generates the reaction voice by synthesizing the reproduction sounds of all the objects generated so far.

The reaction voice generation unit 123 outputs the generated reaction voice to the video/voice superimposing unit 56 and ends the reaction voice generation processing.

As described above, the reaction voice generation unit 123 generates the reaction voice for each object on the basis of the selection period information and generates the reaction voice by synthesizing these reproduction sounds. In particular, for example, if the reaction voice generation unit 123 generates the reproduction sounds of the plurality of objects on the basis of the single piece of period information selected by the period information selection unit 121, it is possible to present the reaction voice with less uncomfortable feeling in which the voices (reaction) of the plurality of objects are synchronized.

Note that, in step S72 in the reaction reproduction processing described with reference to FIG. 20, the reaction voice generation unit 153 executes processing similar to the reaction voice generation processing described with reference to FIG. 35. Therefore, it is possible to present the reaction voice with less uncomfortable feeling by the performer terminal 12.

According to the present technology described above, by dynamically changing the type or the number of pieces of selected period information, an expression that cannot be achieved by a general remote live system can be realized.

For example, an expression can be realized in which, after a specific program of the live event ends, clapping sounds of reaction voices are gradually synchronized so as to request an encore, and the sounds becomes handclap.

Such an expression by the reaction voice in which the clapping sound changes to the handclap will be described with reference to FIG. 36. Note that, here, a case will be described where processing is executed by the period information selection unit 121. However, processing in a case of the period information selection unit 151 is similar processing.

Figure 36:
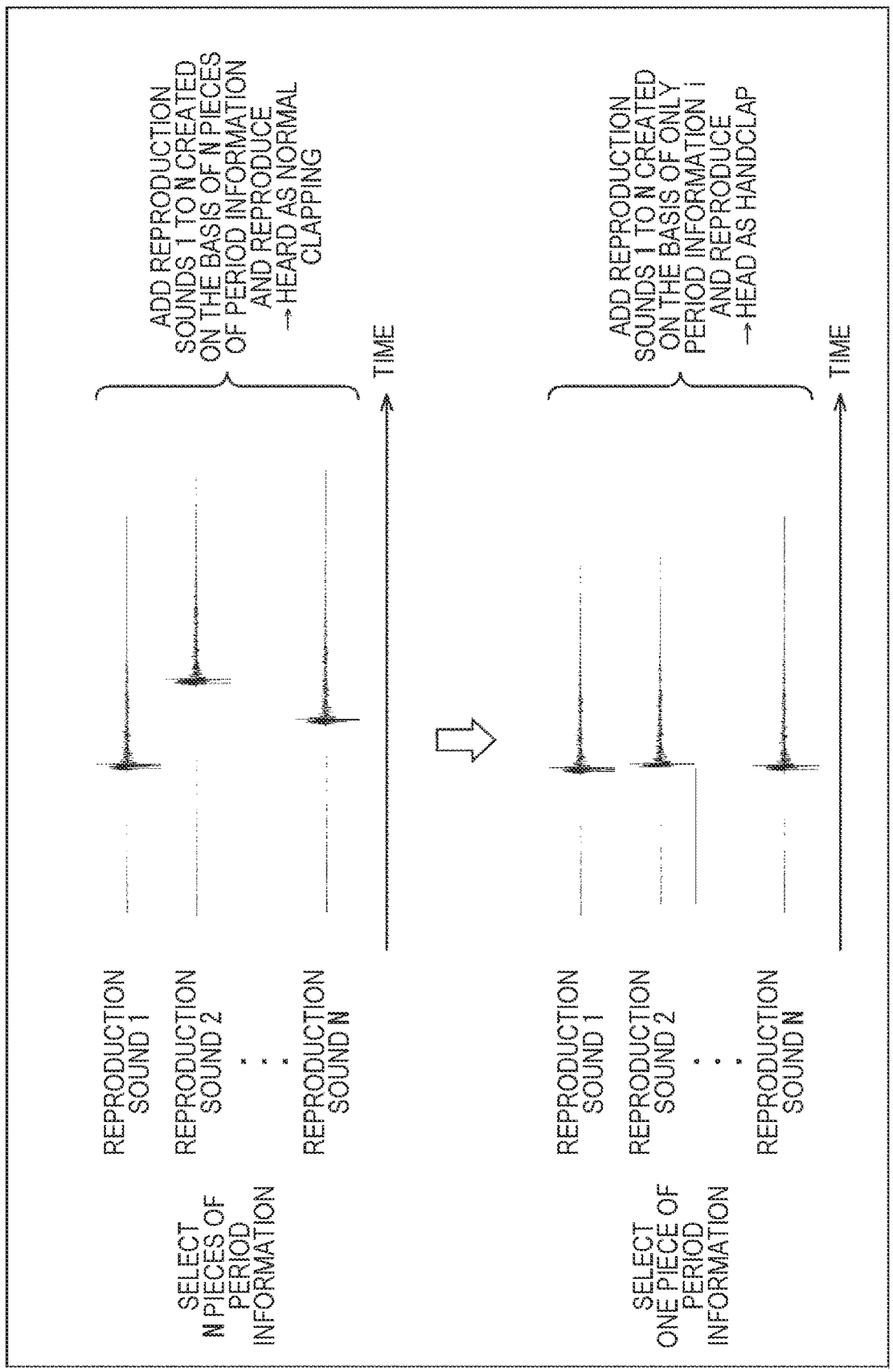
FIG. 36 is a diagram for explaining the number of pieces of selection period information and a change in the reaction voice.

In FIG. 36, a temporal waveform of the reproduction sound (clapping sound) generated for each object on the basis of the selection period information is illustrated, the horizontal direction in the drawing indicates a time (time). In particular, here, the number of objects, that is, the number of spectator terminals 11 to be acquisition sources of the period information is N.

As illustrated on the upper side in the drawing, normally, the period information selection unit 121 selects all the N pieces of received period information as the selection period information and generates a reproduction sound including a clapping sound for each object on the basis of the selection period information. That is, all the pieces of period information are passed through.

In the drawing, on the upper side, waveforms of the reproduction sounds 1 to N generated for the respective N objects are illustrated. In this example, since the selection period information is different for each object, the clapping sounds are reproduced at different timings according to the respective pieces of period information. Therefore, the reaction voice obtained by synthesizing (adding) these reproduction sounds is a voice that can be heard as a sound like a large number of spectators clap at respective timings in the venue.

Furthermore, in a case of detecting encore start according to any trigger or the like, the period information selection unit 121 gradually reduces the number of pieces of period information selected as the selection period information from N with time. Here, for example, it is assumed that the number of pieces of selection period information be reduced from N to one.

Then, when the number of pieces of selection period information becomes one, for example, the reproduction sounds 1 to N respectively for the N objects as illustrated on the lower side in the drawing are obtained. In particular, on the lower side in the drawing, as compared with a case on the upper side in the drawing, the clapping timings in the respective reproduction sounds are substantially the same.

When the number of pieces of selection period information is reduced with time, the timing of the reproduction sound (clapping sound) corresponding to each object is synchronized with time. Therefore, the reaction voice obtained by synthesizing the reproduction sounds of the respective objects is heard as handclap, rather than the clapping of a large number of people.

Note that, as described above, at a reproduction timing of the clapping sound of the object, a random fluctuation (deviation) equal to or less than a certain range is constantly added.

Furthermore, in order to realize such an expression of the reaction voice such that the clapping sound changes to the handclap, the trigger used to detect the encore start is needed.

Therefore, for example, in a case where the period information continues for a certain period or more (continuously updated) after the program ends, the period information selection unit 121 may determine that the encore has been started.

Furthermore, for example, at a stage where it is determined to perform the encore, the recording/distribution device 13 may add trigger information indicating that the encore has started to the distribution video/voice according to an operation of the distributor or the like and transmit the distribution video/voice to the server on the network 14.

Other Example 2 of First Embodiment

<About Processing According to Resource>

Furthermore, in the above, an example has been described in which each spectator terminal 11 or the performer terminal 12 acquires (receive) all the pieces of the period information of the other persons. However, due to communication resources and the calculation resources of each spectator terminal 11 and the performer terminal 12, there is a case where it is difficult to receive and analyze a large number of pieces of period information.

Therefore, for example, the server on the network 14 may analyze a history of values of the half period in the period information about each piece of period information, and it is possible not to distribute period information that is unlikely to be selected by each spectator terminal 11 or the performer terminal 12, for example, because a variance is abnormally large.

Furthermore, for example, each spectator terminal 11 or the performer terminal 12 may notify in advance the server on the network 14 of an indication of the number of pieces of period information that can be received by the own terminal, on the basis of the calculation resource of the own terminal or the like.

In this case, the server transmits only a predetermined number of pieces of period information, notified in advance, limited on the basis of the number of pieces of period information that can be received to the spectator terminal 11 and the performer terminal 12. That is, in the server, pre-screening of the period information is performed before transmission according to the resource of each terminal.

Note that, when it takes time to analyze the period information on the server, a delay of the transmission of the period information increases. Therefore, the simple following method may be used to avoid generation of such a delay.

That is, first, as a first method, since each piece of the period information is information corresponding to each spectator, it is considered that the server preferentially (with priority) transmits period information of which meta information such as donations or article purchase prices satisfies a predetermined standard to each spectator terminal 11 and the performer terminal 12.

This is because a spectator who spend much money for the live event, called so-called hardcore people, should have a strong mind that the spectator oneself creates the live event together and the period information of such a spectator has high affinity with the program.

Note that, for example, the server may transmit the meta information added to the period information or individually indicating the price of the donation or the like to the spectator terminal 11 and the performer terminal 12. It can be said that this meta information indicates a priority of the user based on the price of the donation or the like, that is, a priority of the period information. In this case, for example, the period information selection unit 121 of the spectator terminal 11 and the period information selection unit 151 of the performer terminal 12 select period information with a high priority as the selection period information, on the basis of the meta information received from the server.

Furthermore, as a second method, it is considered that the server analyzes the history of the values of the half period in the past of the spectator terminal 11 and preferentially transmits the period information with a small variance of the half period to each spectator terminal 11 and the performer terminal 12.

In a case where the period information is selectively transmitted with these methods, it is sufficient that the spectator terminal 11 or the performer terminal 12 separately receive only information regarding the number of participants in the remote live, that is, the spectators from the server. In this way, the spectator terminal 11 and the performer terminal 12 can prevent the number of objects that can be displayed from being changed, even if the number of pieces of acquired period information is small.

Second Embodiment

<About Calculation of Delay Amount and Prediction of Reaction>

By the way, a spectator terminal 11 and a performer terminal 12 can obtain a delay amount of acquired period information of another person and predict a reaction of the other person at a time advanced by the delay amount.

Hereinafter, an example will be described in which a reaction of the other person at the current time is predicted and a reaction video/voice is generated on the basis of the prediction result.

First, an outline of a second embodiment according to the present technology will be described with reference to FIG. 37.

Figure 37:
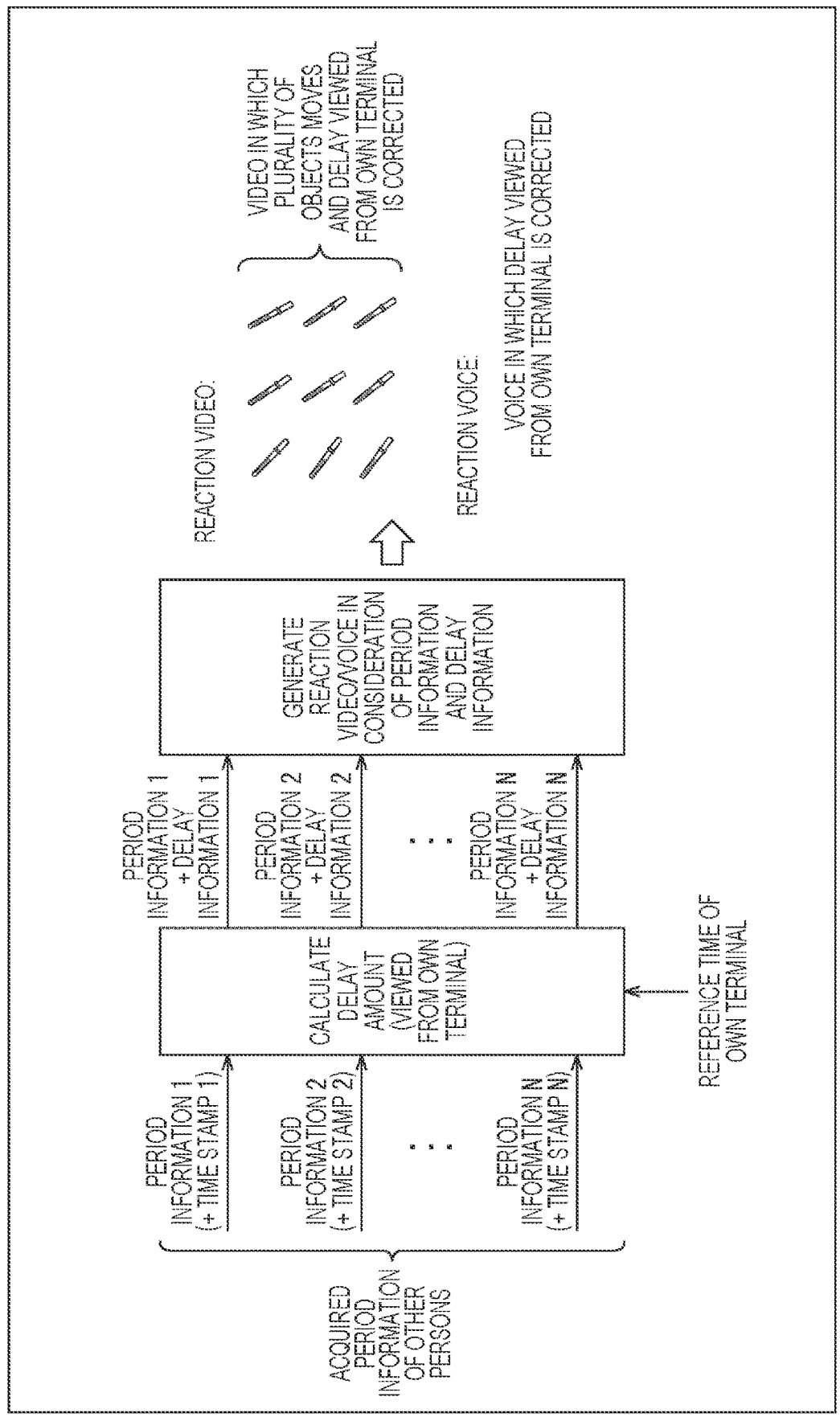
FIG. 37 is a diagram for explaining the outline of the present technology.

In FIG. 37, a simple configuration of a reaction video/voice generation unit 55 and a reaction video/voice generation unit 92 is illustrated.

The reaction video/voice generation unit calculates a delay amount from a reference time of the own terminal, for acquired N pieces of period information of the other persons and predicts and generates a reaction video/voice obtained by correcting the delay amount.

In other words, regarding the reaction of the other person, by obtaining the delay amount viewed from the own terminal (delay amount of other person's period information for reference time) for each reaction of the other person and predicting a reaction at a time (future) advanced by the delay amount, the delay of the reaction of the other person viewed from the own terminal is corrected, and the reaction video with less uncomfortable feeling is presented.

Specifically, first, each spectator terminal 11 adds a time stamp of the distribution video being viewed by the own terminal to the period information to be transmitted. That is, by adding the time stamp of the distribution video (content) being reproduced at the time when the period information is generated (generation time) to the period information to be transmitted, this means that information indicating that the period information is a reaction for a distribution video at which time (reproduction time) is added.

Hereinafter, in particular, a time stamp added to period information n of which a period information ID is n (for example, 0≤n≤N) is referred to as a time stamp n.

Furthermore, the spectator terminal 11 and the performer terminal 12 calculate the delay amount of the period information viewed from the own terminal, on the basis of the reference time of the own terminal, for each received piece of the period information of the other persons.

In this example, N pieces of period information 1 to N are received, and the delay amount is obtained on the basis of the reference time, for each of the N pieces of period information. As a result, delay information 1 to delay information N indicating the delay amount are respectively obtained for the period information 1 to the period information N.

Here, the reference time of the spectator terminal 11 is, for example, a time of the distribution video being viewed by the spectator terminal 11 (own terminal), that is, a reproduction time of the distribution video being reproduced at a current time (current time). Furthermore, for example, the reference time of the performer terminal 12 is the current time acquired by the performer terminal 12, that is, a system time or the like.

Furthermore, the delay amount of the period information viewed from the own terminal is a value obtained by subtracting the value of the time stamp added to the period information from the reference time (reference time−time stamp included in period information).

The spectator terminal 11 and the performer terminal 12 predict a future reaction video/voice by a time of the delay amount indicated by the delay information, from the delay amount corresponding to the period information.

In the own terminal, since the reaction video/voice obtained by the prediction is at the same time as the distribution video being viewed, the delay of the reaction of the other person viewed from the own terminal seems to be eliminated. That is, the reaction video/voice in which the delay of the reaction of the other person viewed from the own terminal is corrected is obtained.

Therefore, in the second embodiment, unlike the first embodiment, it is possible to realize an expression in which the reactions of the spectators are intentionally deviated, for example, an expression of a wave or the like that is hard to realize in the remote live.

Note that, in the second embodiment, since a configuration of a remote live system is set as the configuration illustrated in FIG. 7, here, only differences from the first embodiment below will be described.

Furthermore, for easy description, description is continued as assuming that the system time is synchronized with sufficient accuracy in each of the spectator terminal 11 and the performer terminal 12, by a known method such as network time protocol (NTP).

(Configuration of Reaction Video/Voice Generation Unit)

Figure 38:
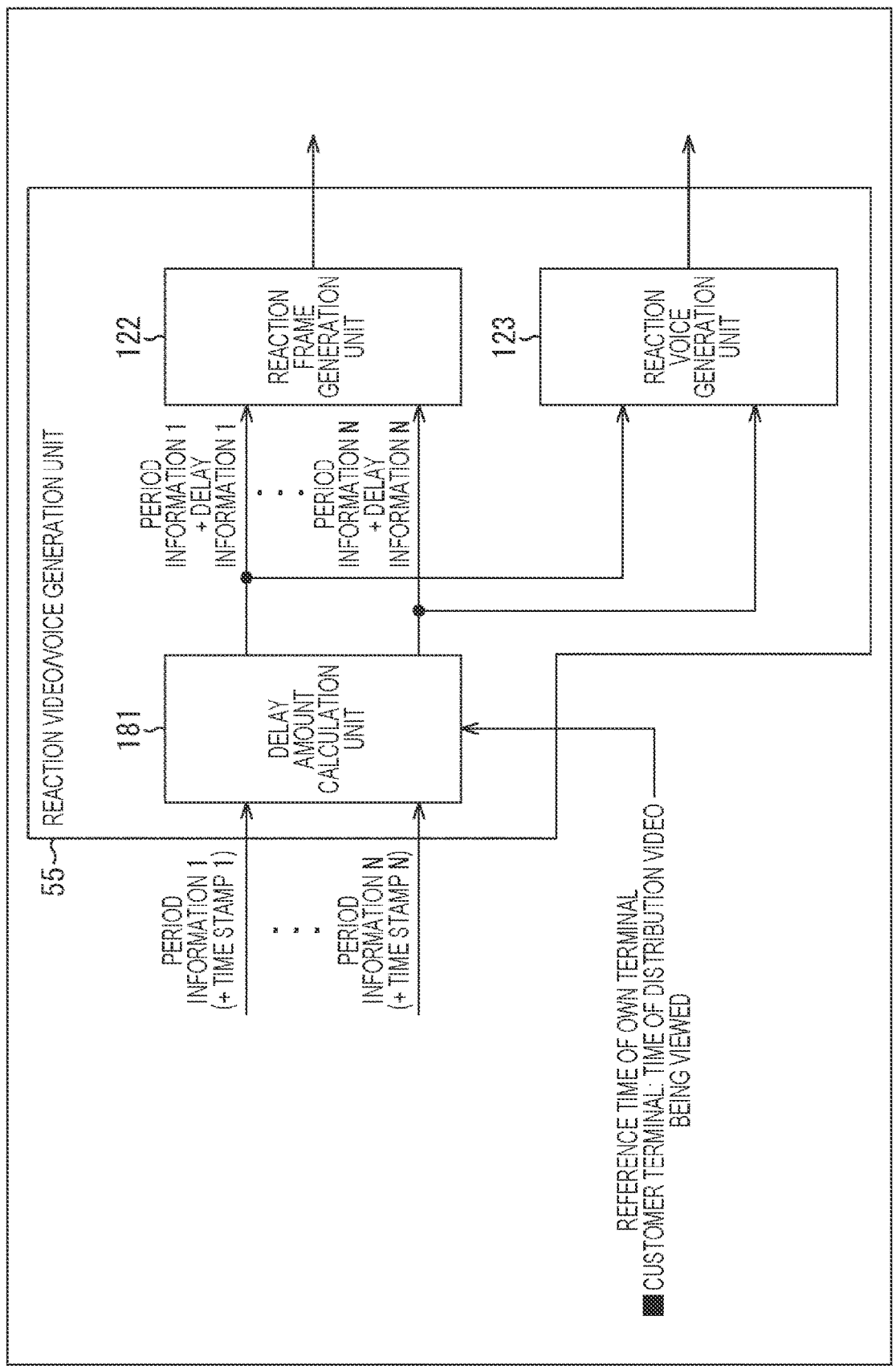
FIG. 38 is a diagram illustrating a configuration example of the reaction video/voice generation unit.

In the second embodiment, the reaction video/voice generation unit 55 is configured, for example, as illustrated in FIG. 38. Note that, in FIG. 38, portions corresponding to those in FIG. 21 are denoted by the same reference signs, and the description thereof will be omitted as appropriate.

The reaction video/voice generation unit 55 includes a delay amount calculation unit 181, a reaction frame generation unit 122, and a reaction voice generation unit 123.

Other person's period information to which a time stamp is added it supplied from a reception unit 53 to the delay amount calculation unit 181, and a reproduction time of a distribution video is supplied from a distribution video/voice decoding unit 54 to the delay amount calculation unit 181 as the reference time of the own terminal.

In this example, the N pieces of period information 1 to N and N time stamps 1 to N added to the pieces of period information 1 to N are supplied to the delay amount calculation unit 181. Furthermore, it can be said that the reference time of the own terminal supplied from the distribution video/voice decoding unit 54 is information indicating an environment of the own terminal (spectator terminal 11), as in auxiliary information.

The delay amount calculation unit 181 generates the delay amount of the other person's period information viewed from the own terminal, that is, the delay information from the reference time of the other person's period information, for each piece of the other person's period information, on the basis of the time stamp added to the other person's period information and the reference time of the own terminal.

Furthermore, the delay amount calculation unit 181 supplies the other person's period information and the delay information to the reaction frame generation unit 122 and the reaction voice generation unit 123.

In this example, the pieces of delay information 1 to N are respectively generated for the supplied pieces of period information 1 to N, and the period information 1 to N and the delay information 1 to N are supplied to the reaction frame generation unit 122 and the reaction voice generation unit 123.

The reaction frame generation unit 122 generates a frame image for one frame of a reaction video, on the basis of period information n and delay information n (however, n=1, 2, . . . , and N) supplied from the delay amount calculation unit 181 and supplies the frame image to a video/voice superimposing unit 56.

The reaction voice generation unit 123 generates a reaction voice on the basis of the period information n and the delay information n (however, n=1, 2, . . . , and N) supplied from the delay amount calculation unit 181 and supplies the reaction voice to the video/voice superimposing unit 56.

The reaction video/voice generation unit 55 having the above configuration is different from that in the first embodiment in that all the received pieces of period information of the other persons are used (selected) to generate the delay information and the period information and the delay information are supplied to the reaction frame generation unit 122 and the reaction voice generation unit 123 together.

Note that, in the second embodiment, since the configuration of the reaction video/voice generation unit 92 is similar to the configuration of the reaction video/voice generation unit 55 illustration in FIG. 38, illustration and description thereof will be omitted. However, the reaction video/voice generation unit 92 supplies the system time (current time) acquired by the performer terminal 12 to a block corresponding to the delay amount calculation unit 181, as the reference time of the own terminal.

(Operation of Sensing Information Analysis Unit)

Subsequently, the operation of the sensing information analysis unit 51 will be described.

An operation of the sensing information analysis unit 51 is basically similar to that in a case of the first embodiment, and the sensing information analysis unit 51 executes the period information generation processing described with reference to FIG. 14.

However, in step S14, the sensing information analysis unit 51 not only generates the period information but also acquires the time stamp of the distribution video (frame thereof) being viewed by the own terminal from the distribution video/voice decoding unit 54, adds the time stamp to the period information, and transmits the period information to the transmission unit 52.

<Description of Delay Amount Calculation Processing>

Next, processing executed by the reaction video/voice generation unit 55 will be more specifically described. In particular, hereinafter, as in a case of the first embodiment, an example will be described in which a video in which a penlight as an object moves is generated as the reaction video.

In such a case, in step S44 in the content reproduction processing described with reference to FIG. 19, as the processing for generating the reaction video, delay amount calculation processing by the delay amount calculation unit 181 and reaction frame generation processing by the reaction frame generation unit 122 are executed.

Figure 39:
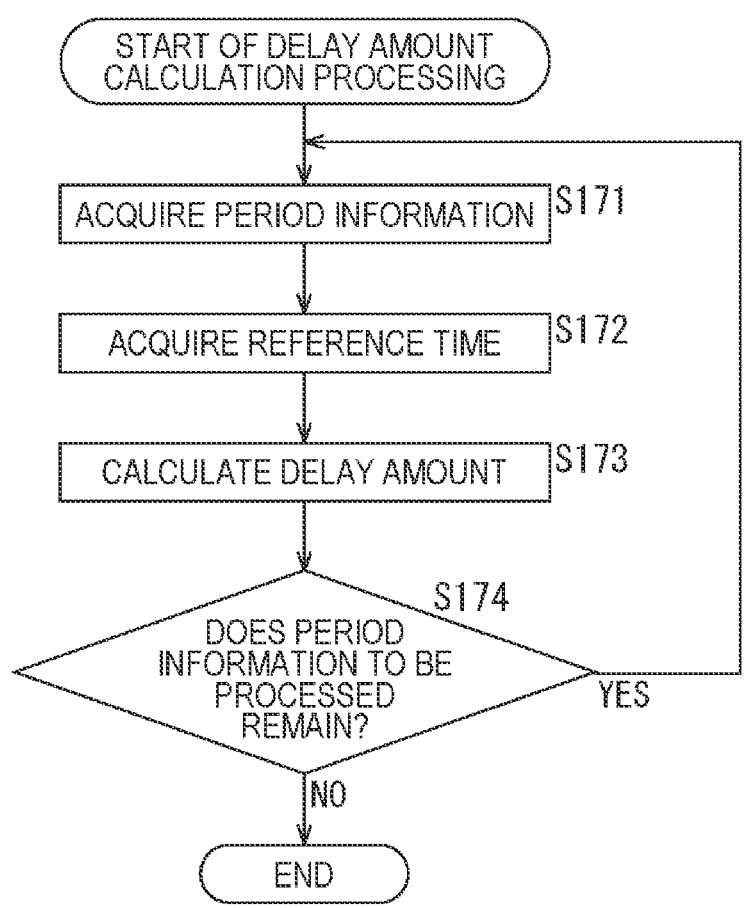
FIG. 39 is a flowchart for explaining delay amount calculation processing.

First, the delay amount calculation processing by the delay amount calculation unit 181 will be described with reference to the flowchart in FIG. 39.

In step S171, the delay amount calculation unit 181 acquires necessary period information of the other person from the reception unit 53. In this case, a time stamp is added to the period information to be acquired.

In step S172, the delay amount calculation unit 181 acquires the reproduction time (for example, time stamp) of the distribution video at the current time, as the reference time of the own terminal, from the distribution video/voice decoding unit 54.

Note that, here, since a case of the spectator terminal 11 is described, the reproduction time of the distribution video is acquired as the reference time. However, for example, the performer terminal 12 acquires the current time (system time) as the reference time of the own terminal.

In step S173, the delay amount calculation unit 181 calculates a delay amount $\Delta t_{delay}$ of the period information viewed from the own terminal, from the acquired period information and reference time.

Specifically, for example, the delay amount calculation unit 181 obtains the delay amount $\Delta t_{delay}$ by calculating a difference between the reference time and the time stamp added to the period information, according to the following formula (8).

[Expression 8]

$$\Delta t_{delay} = \text{(REFERENCE TIME)} - \text{(TIME STAMP OF PERIOD INFORMATION)} \qquad (8)$$

The delay amount calculation unit 181 supplies delay information indicating the delay amount $\Delta t_{delay}$ obtained in this way and the period information, associated (in association) with each other, to the reaction frame generation unit 122 and the reaction voice generation unit 123.

In step S174, the delay amount calculation unit 181 determines whether or not there is period information to be processed, that is, whether or not period information to be processed remains. In a case where the processing for obtaining the delay amount for the period information of all the spectator terminals 11 is executed, it is determined in step S174 that there is no period information to be processed.

In a case where it is determined in step S174 that there is the period information to be processed, the processing returns to step S171, and the processing described above is repeatedly executed. That is, the delay amount calculation unit 181 acquires new period information that has not been processed yet from the reception unit 53 and generates delay information for the acquired period information.

On the other hand, in a case where the all the pieces of period information have been processed, that is, it is determined in step S174 that there is no period information to be processed, the delay amount calculation processing ends.

As described above, the delay amount calculation unit 181 generates the delay information indicating the delay amount of the period information generated by the spectator terminals 11, for all the spectator terminals 11.

As a result, it is possible to obtain the delay information corresponding to each piece of period information, and it is possible to obtain a reaction video and a reaction voice with no deviation in which the delay amount is corrected at the subsequent stage. That is, it is possible to obtain a reaction video/voice with less uncomfortable feeling.

(Operation of Reaction Frame Generation Unit)

Next, an operation of the reaction frame generation unit 122 according to the second embodiment will be described. That is, the reaction frame generation processing by the reaction frame generation unit 122 that is executed after the delay amount calculation processing is executed by the delay amount calculation unit 181 will be described.

Although the reaction frame generation unit 122 executes processing basically same as the reaction frame generation processing described with reference to FIG. 32, only in the processing in step S105, processing different from that in a case of the first embodiment is executed.

In step S105, an angle α indicating a direction of a motion of an object is calculated. However, a difference between the methods for calculating the angle α in a case of the first embodiment and in a case of the second embodiment is illustrated in FIG. 40.

Figure 40:
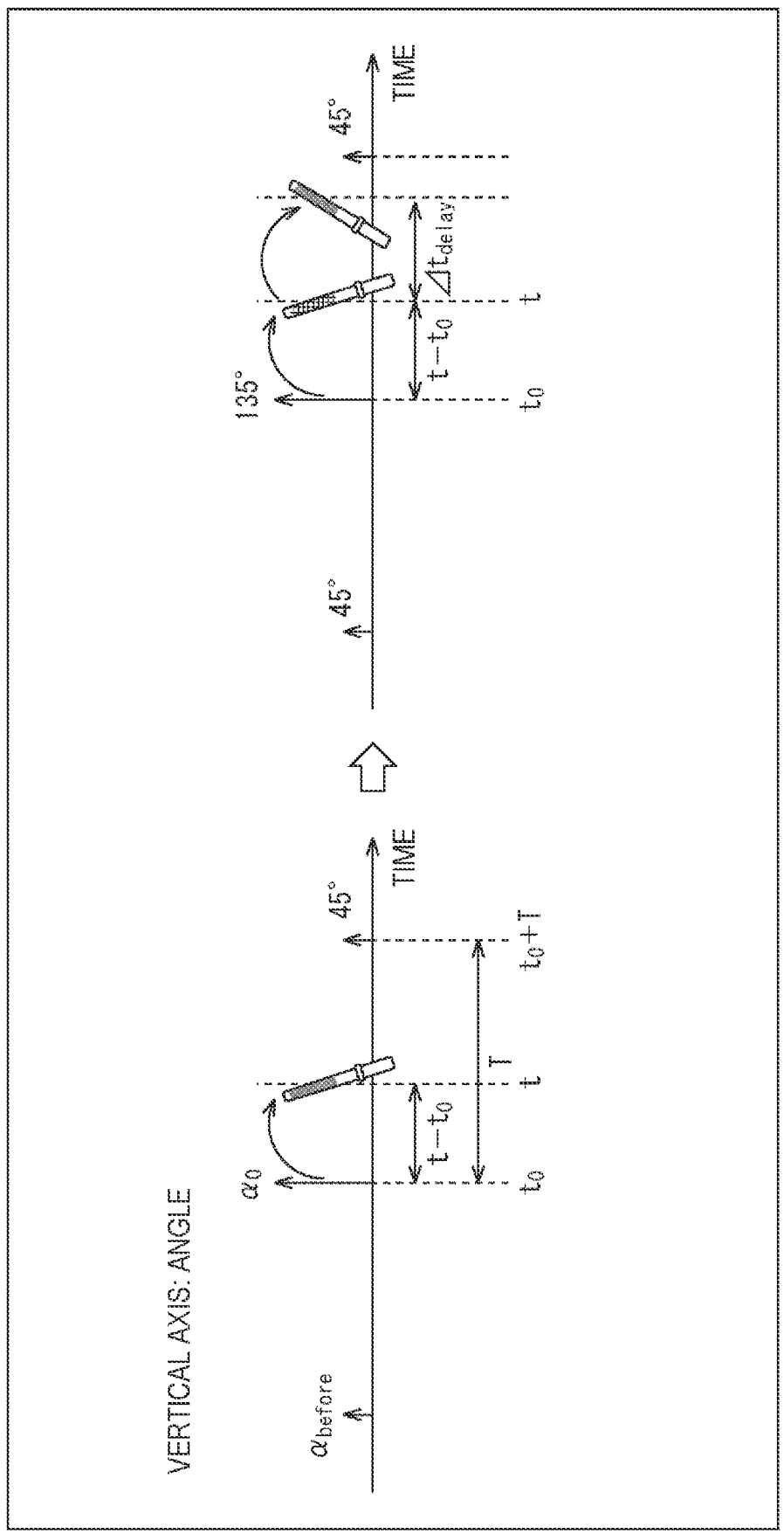
FIG. 40 is a diagram for explaining the generation of the reaction video.

Note that, in FIG. 40, the horizontal axis indicates a timing (time), and an upward convex arrow in FIG. 40 indicates a timing when the period information is updated, that is, a timing when a moving direction of the penlight leftward and rightward is switched. Furthermore, in FIG. 31, a size of the upward convex arrow indicates the size of the angle information in the period information, that is, the direction (angle) of the penlight.

On the left side in the drawing, the method for calculating the angle α indicating the direction of the object (penlight) at a current time t, described in the first embodiment, is illustrated.

That is, in this calculation method, only an elapsed time ($t-t_0$) from when the period information is most recently received at the time $t_0$ is considered. Therefore, the angle α is obtained by adding an angle ω ($t-t_0$) that changes with the elapsed time ($t-t_0$) to an angle $\alpha_0$ indicated by angle information of the period information that is most recently received at the time to.

Specifically, the angle α is obtained according to the following formula (9). Note that the formula (9) is similar to the formula (3) described above.

[Expression 9]

$$\alpha = \alpha_0 + \omega(t - t_0) \quad (9)$$

On the other hand, in the second embodiment, as illustrated on the right side in the drawing, the angle α indicating the direction of the object (penlight) is calculated.

Specifically, the reaction frame generation unit 122 obtains an angle of the penlight at a time ($t+\Delta t_{delay}$) further elapsed by a time of the delay amount $\Delta t_{delay}$ as the angle α, in order to correct the delay amount $\Delta t_{delay}$ in the period information received from the other spectator terminal 11 at the time $t_0$. That is, in the formula (9), ($t-t_0$) is replaced with ($t-t_0+\Delta t_{delay}$).

Therefore, in a case where the angular speed is co, the time when the period information is most recently received is to, the angle indicated by the angle information included in the period information at the time $t_0$ is $\alpha_0$, and the delay amount of the period information at the time $t_0$ is $\Delta t_{delay}$, the angle α is obtained by the following formula (10).

[Expression 10]

$$\alpha = \alpha_0 + \omega(t - t_0 + \Delta t_{delay}) \quad (10)$$

The angle α obtained in this way is a predicted value of the angle indicating the direction of the object (penlight), at the time ($t+\Delta t_{delay}$) advanced by the delay amount $\Delta t_{delay}$ from the current time t, if the delay amount $\Delta t_{delay}$ is not considered.

However, actually, the angle $\alpha_0$ is an angle indicating the direction of the object at the time ($t_0-\Delta t_{delay}$) before the time $t_0$ when the period information is received, by the delay amount $\Delta t_{delay}$. Therefore, the angle α obtained by the formula (10) is actually a predicted value of the angle indicating the direction of the object at the current time t. In other words, according to the calculation in the formula (10), a more accurate angle α in which the delay amount $\Delta t_{delay}$ is corrected can be obtained.

Note that "$t-t_0+\Delta t_{delay}$" (hereinafter, also referred to as $\Delta t_{pred}$) in a second item in the formula (10) may be larger than a half period T.

However, in such a case, it is sufficient that the second item "$\omega(t-t_0+\Delta t_{delay})$" in the formula (10) be replaced as in the following formula (11), from assumed periodicity. Note that mod in the formula (11) indicates a remainder operation.

[Expression 11]

$$\begin{cases} \omega(x) & (x \leq T) \\ \omega(2T - x) & (x > T) \end{cases} \quad (11)$$

HOWEVER $x = \Delta t_{pred} \bmod 2T$

Furthermore, in the second embodiment, the period information is not selected as in the first embodiment. Therefore, a correspondence table indicating a correspondence between the period information and the object is a correspondence table in which all object IDs and period information IDs have one-to-one correspondence, as the object ID=the period information ID.

That is, object images of a plurality of objects is not generated on the basis of the same period information. Therefore, in the second embodiment, in the reaction frame generation processing, the processing in step S106 for adding a random value to the calculated angle α is not executed.

Furthermore, in the above, the processing executed by the reaction video/voice generation unit 55 has been described. However, processing similar to that in a case of the reaction video/voice generation unit 55 is executed by the reaction video/voice generation unit 92 of the performer terminal 12.

Another Example 1 of Second Embodiment

<Example of Generating Reaction Video and Reaction Voice>

Note that, in the above, an example in which only the reaction video is generated has been described. However, both of the reaction video and the reaction voice may be generated.

Hereinafter, a case will be described where the reaction video and the reaction voice are generated at the same time. In particular, hereinafter, as an example, a case will be described where the reaction video is a video in which the object corresponding to the spectator claps and the reaction voice is clapping sounds of a large number of people.

Even in such a case, the configuration of the remote live system is set as the configuration illustrated in FIG. 7, and the reaction video/voice generation unit 55 has the configuration illustrated in FIG. 38.

Furthermore, since the reaction video can be generated as in a case of the second embodiment, description thereof is omitted here, and only an operation of the reaction voice generation unit different from that in the second embodiment will be described.

Note that, since an operation of the reaction voice generation unit 153 corresponding to the reaction voice generation unit 123 in the reaction video/voice generation unit 92 of the performer terminal 12 is similar to that in a case of the reaction voice generation unit 123, illustration and description thereof will be omitted.

Figure 41:
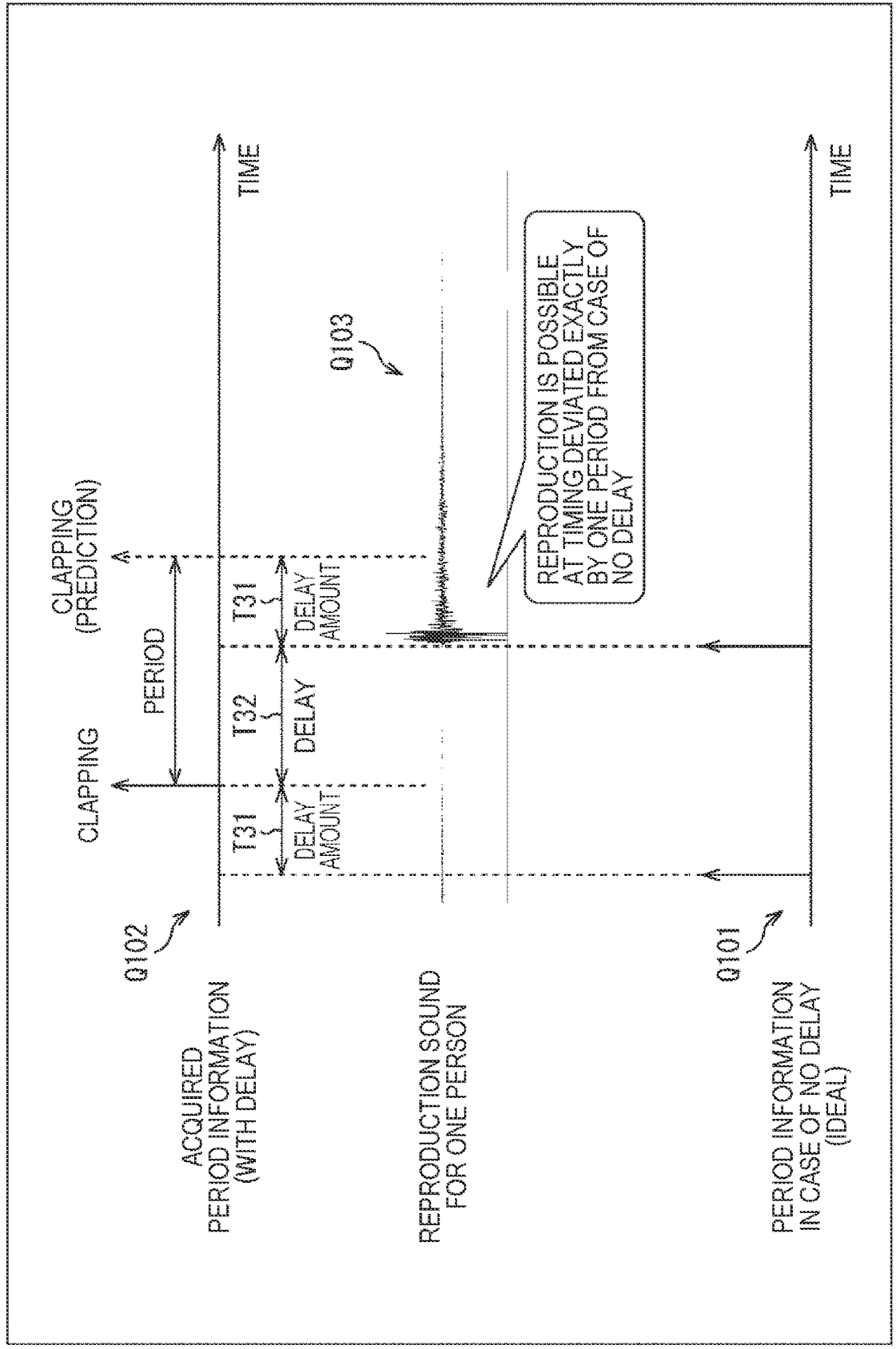
FIG. 41 is a diagram for explaining the generation of the reaction voice.

The reaction voice generation unit 123 generates the reaction voice, for example, as illustrated in FIG. 41. In this case, it is assumed that the period information be described with reference to FIG. 33, for example.

Note that, in FIG. 41, the horizontal axis indicates a time (time), and an upward convex arrow in FIG. 41 indicating the timing when the period information is received, in other words, a timing when reproduction of a reproduction sound of clapping that is a sound indicating the reaction of the object is started.

In a portion indicated by an arrow Q101, a reproduction start timing of the reproduction sound (clapping sound) in a case where the period information is not delayed, that is, an ideal case is illustrated.

However, since the actually acquired period information is delayed by the time of the delay amount $\Delta t_{delay}$, the reproduction start timing of the reproduction sound (clapping sound) deviates from an ideal reproduction start timing as indicated by an arrow Q102. Here, a length of a period T31 represents the delay amount of the period information, that is, the delay amount $\Delta t_{delay}$ described above.

However, since the clapping that is the reaction of the spectator is a substantially periodic reaction (motion), it can be predicted that a clapping timing comes one period ahead of the reproduction start timing of the reproduction sound (clapping sound) based on the acquired period information.

Therefore, the reaction voice generation unit 123 delays the reproduction start timing of the reproduction sound (clapping sound) by a time (period–delay amount) of a correction amount T32 obtained by subtracting the delay amount $\Delta t_{delay}$ of the period information, from the one-period time indicated by the period information (elapsed time information).

In such a case, the reaction voice generation unit 123 basically executes processing similar to the reaction voice generation processing described with reference to FIG. 35.

However, in step S143, when generating one time of the clapping sound as the reproduction sound on the basis of the period information and the voice data of the clapping sound, the reaction voice generation unit 123 delays a timing when the reproduction of the clapping sound is started by a time of (period–delay amount).

In other words, the reproduction start timing of the reproduction sound is corrected on the basis of a difference between a period indicated by the period information and the delay amount of the period information.

In this way, as indicated by an arrow Q103, the reproduction start timing of the clapping sound is a timing delayed from the exact ideal reproduction start timing in a case where the period information is not delayed by one period. Since the clapping as the reaction of the object is periodic, by deviating the reproduction start timing of the clapping sound by one period from that in the ideal case, the deviation of the clap timing caused by the delay amount of the period information is corrected.

Therefore, by correcting the delay of the period information in this way, even in a case where the period information of all the spectator terminals 11 is used, it is possible to present the reaction voice with less uncomfortable feeling in which the voices (reaction) of the plurality of objects are synchronized.

Furthermore, according to the method described in this embodiment, even if an encore start is not detected as in a case of the other example 1 of the first embodiment, it is possible to realize "an expression in which clapping gradually changes to handclap".

Third Embodiment

<Configuration Example of Reaction Video/Voice Generation Unit>

By the way, a reaction video/voice generation unit 55 and a reaction video/voice generation unit 92 may select period information as in the first embodiment and may generate delay information and perform correction according to a delay amount as in the second embodiment.

In particular, a method for selecting the period information in such a case (hereinafter, also referred to as period information selection method) and a method for performing correction according to the delay amount (hereinafter, also referred to as delay amount correction method) may be selectively used according to a calculation resource of an own terminal or the like.

For example, when the own terminal, that is, a spectator terminal 11 or a performer terminal 12 is a game machine or the like and there is a room for processing, it is considered that the delay amount correction method having a relatively wide width of expression is mainly used.

Furthermore, for example, in a case where the own terminal, that is, the spectator terminal 11 or the performer terminal 12 is a smartphone, a tablet, or the like, that is a device having relatively insufficient resources, it is considered to mainly use the period information selection method with a relatively low calculation load.

In this way, it is possible to present a reaction video/voice that cannot be realized only by the method such as the delay amount correction method and to reduce the calculation load of the own terminal to be low.

Even in a case where the period information selection method and the delay amount correction method are used in combination, a configuration of a remote live system is set as the configuration illustrated in FIG. 7. Therefore, the configurations of the reaction video/voice generation unit 55 and the reaction video/voice generation unit 92 with a difference will be described.

In particular, the configuration and an operation of the reaction video/voice generation unit 92 are basically similar to those of the reaction video/voice generation unit 55, hereinafter, the reaction video/voice generation unit 55 will be described, and description regarding the reaction video/voice generation unit 92 will be omitted.

For example, some configurations depending on how to combine the period information selection method and the delay amount correction method are considered as the configuration of the reaction video/voice generation unit 55. However, here, as an example, an example will be described in which the period information selection unit 121 and the delay amount calculation unit 181 are cascade-connected.

Figure 42:
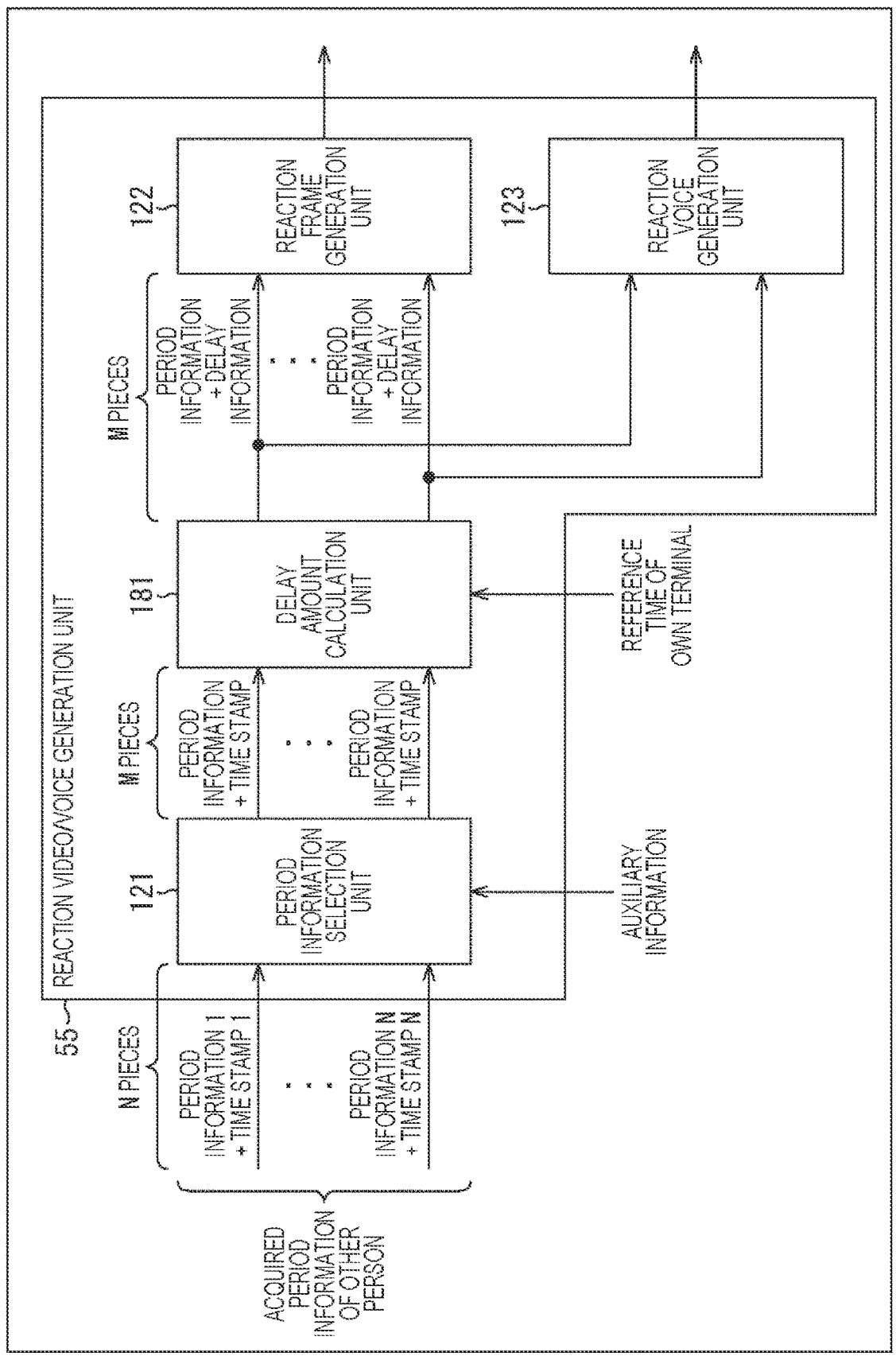
FIG. 42 is a diagram illustrating a configuration example of the reaction video/voice generation unit.

In such a case, the reaction video/voice generation unit 55 is configured as illustrated in FIG. 42. Note that, in FIG. 42, portions corresponding to those in FIG. 21 or FIG. 38 are denoted by the same reference signs, and the description thereof will be omitted as appropriate.

The reaction video/voice generation unit 55 illustrated in FIG. 42 includes the period information selection unit 121, the delay amount calculation unit 181, a reaction frame generation unit 122, and a reaction voice generation unit 123.

In this example, to the period information selection unit 121, period information 1 to N received from N spectator terminals 11 are supplied from a reception unit 53. Time stamps 1 to N are added to these pieces of period information 1 to N.

Furthermore, to the period information selection unit 121, own terminal period information from a sensing information analysis unit 51 and a distribution video/voice from a distribution video/voice decoding unit 54 are supplied as auxiliary information. Note that, in the performer terminal 12, a raw video/voice is supplied as the auxiliary information.

As in a case of the first embodiment, the period information selection unit 121 selects M pieces of period information less than N (M≤N) as selection period information, from among the N pieces of supplied other person's period information, on the basis of the auxiliary information.

The period information selection unit 121 supplies the M pieces of period information selected as the selection period information and the time stamps added to these pieces of period information to the delay amount calculation unit 181.

In this case, for example, the period information selection unit 121 determines the number M that is the number of pieces of period information to be selected, on the basis of the calculation resource of the own terminal (spectator terminal 11) at the current time or the like. In particular, for example, in a case where there are the calculation resources of the own terminal equal to or more than a predetermined value, when it is desired to increase a ratio of the delay amount correction method, that is, it is desired to mainly use the delay amount correction method, it is sufficient that the number M of the pieces of the period information to be selected be increased. For example, when the number M of pieces of period information to be selected is M≈N, an operation is made such that the received period information is almost passed through and is supplied to the delay amount calculation unit 181.

As in a case of the second embodiment, to the delay amount calculation unit 181, a reproduction time of a distribution video being reproduced by the spectator terminal 11 (own terminal) is supplied as a reference time of the own terminal from the distribution video/voice decoding unit 54. Note that, in the performer terminal 12, a system time is supplied as the reference time of the own terminal.

As in a case of the second embodiment, the delay amount calculation unit 181 generates delay information on the basis of the time stamp added to the supplied period information and the supplied reference time of the own terminal, for each of the M pieces of period information supplied from the period information selection unit 121.

The delay amount calculation unit 181 supplies the M pieces of period information selected as the selection period information and the M pieces of delay information corresponding to these pieces of period information to the reaction frame generation unit 122 and the reaction voice generation unit 123.

The reaction frame generation unit 122 generates the reaction video on the basis of the M pieces of period information and delay information supplied from the delay amount calculation unit 181 as in a case of the second embodiment. In this case, a reaction video in which M object images are superimposed may be generated, or a reaction video in which N object images are superimposed may be generated by generating a plurality of object images from the single piece of the period information.

Furthermore, the reaction voice generation unit 123 also generates the reaction voice on the basis of the M pieces of period information and delay information supplied from the delay amount calculation unit 181, as in a case of the other example 1 of the second embodiment. In this case, a reaction voice including reaction voices of M objects may be generated, or a reaction voice including reproduction sounds of N objects may be generated by generating reproduction sounds of a plurality of objects from the single piece of the period information.

Note that, when the reaction video or the reaction voice is generated, when the plurality of object images or the reproduction sounds of the objects are generated from the single piece of the period information, as in a case of the first embodiment and the other example 1 of the first embodiment, a minute deviation may be added to an angle of the object or a reproduction timing of the reproduction sound such as a clapping sound.

Specifically, in the third embodiment, when it is necessary to generate the plurality of object images from the single piece of the period information in the reaction frame generation processing, processing in step S106 for adding a random value to the calculated angle α is appropriately executed.

Similarly, in the reaction voice generation processing, when it is necessary to generate the plurality of reproduction sounds from the single piece of period information, a reproduction timing of the clapping sound in the reproduction sound when the processing in step S143 is executed is constantly deviated by a time equal to or less than a certain amount.

<Configuration Example of Computer>

Note that, the above-described series of processing may be executed by hardware or software. In a case where the series of processing is executed by the software, a program forming the software is installed on a computer. Here, examples of the computer include a computer incorporated in dedicated hardware, and for example, a general-purpose personal computer capable of executing various functions by installing various programs or the like.

Figure 43:
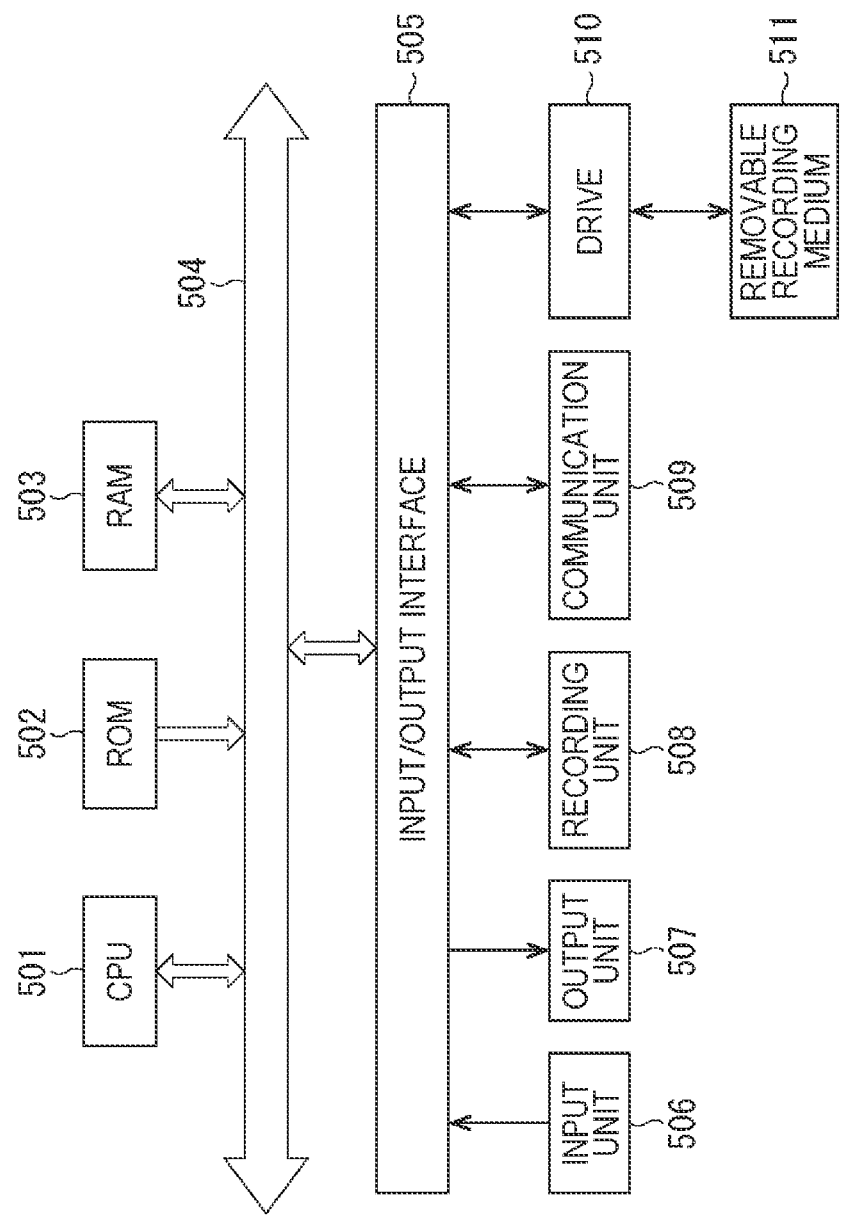
FIG. 43 is a diagram illustrating a configuration example of a computer.

FIG. 43 is a block diagram illustrating a configuration example of hardware of a computer that executes the above-described series of processing by a program.

In the computer, a central processing unit (CPU) 501, a read only memory (ROM) 502, and a random access memory (RAM) 503 are mutually connected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, the CPU 501 loads, for example, a program recorded in the recording unit 508 into the RAM 503 via the input/output interface 505 and the bus 504, and executes the program, so as to execute the above-described series of processing.

The program executed by the computer (CPU 501) can be provided by being recorded on the removable recording medium 511 as a package medium and the like, for example. Furthermore, the program may be provided via a wired or wireless transmission medium, such as a local area network, the Internet, or digital satellite broadcasting.

In the computer, the program can be installed in the recording unit 508 via the input/output interface 505 by mounting the removable recording medium 511 on the drive 510. Furthermore, the program can be received by the communication unit 509 via the wired or wireless transmission medium to be installed on the recording unit 508. In addition, the program can be installed in the ROM 502 or the recording unit 508 in advance.

Note that the program executed by the computer may be a program that executes processing in time series in the order described herein, or a program that executes processing in parallel or at a necessary timing such as when a call is made.

Furthermore, the embodiment of the present technology is not limited to the above-described embodiment and various modifications may be made without departing from the scope of the present technology.

For example, the present technology may be configured as cloud computing in which one function is shared by a plurality of devices over the network to process together.

Furthermore, each step described in the flowchart described above may be executed by one device, or may be executed in a shared manner by a plurality of devices.

Moreover, in a case where a plurality of processes is included in one step, the plurality of processes included in one step can be executed by one device or by a plurality of devices in a shared manner.

Moreover, the present technology may also have following configurations.

(1)

An information processing device including:
 a reception unit that receives reaction information indicating a reaction of another user, generated by each of a plurality of other terminals different from an own terminal; and
 a generation unit that generates a presented video or a presented voice corresponding to the reactions of a plurality of the other users, on a basis of a plurality of pieces of the reaction information and environment information indicating an environment of the own terminal.

(2)

The information processing device according to (1), further including:
 a reaction information generation unit that generates the reaction information indicating a reaction of a user corresponding to the own terminal, on a basis of information acquired by a sensor; and
 a transmission unit that transmits the reaction information indicating the reaction of the user.

(3)

The information processing device according to (2), in which
 the sensor includes at least one of a camera, a microphone, an acceleration sensor, a gyro sensor, or a geomagnetic sensor.

(4)

The information processing device according to any one of (1) to (3), in which
 the reaction information incudes period information based on a period of a reaction.

(5)

The information processing device according to any one of (1) to (4), in which
 the environment information includes at least one of a video of content, a voice of content, or the reaction information indicating the reaction of the user corresponding to the own terminal.

(6)

The information processing device according to any one of (1) to (5), in which
 the generation unit generates the presented video or the presented voice, on a basis of a predetermined number of pieces of the reaction information selected from among the plurality of pieces of the reaction information received by the reception unit.

(7)

The information processing device according to (6), in which
 the generation unit selects the predetermined number of pieces of the reaction information, on a basis of tempo information or beat information obtained from a voice of content.

(8)

The information processing device according to (6), in which
 the generation unit selects the predetermined number of pieces of the reaction information, on a basis of the reaction information indicating the reaction of the user corresponding to the own terminal.

(9)

The information processing device according to (6), in which
 the generation unit selects the predetermined number of pieces of the reaction information, on a basis of an analysis result of a history of the reaction information indicating the reaction of the other user.

(10)

The information processing device according to (6), in which
 the generation unit selects the predetermined number of pieces of the reaction information, on a basis of meta information of the reaction information indicating the reaction of the other user.

(11)

The information processing device according to any one of (6) to (10), in which
 the generation unit dynamically changes the reaction information to be selected and the number of pieces of the reaction information to be selected.

(12)

The information processing device according to any one of (1) to (11), in which
 the generation unit calculates a delay amount of the received reaction information indicating the reaction of the other user with respect to a reference time of the own terminal and generates the presented video or the presented voice, on a basis of the reaction information indicating the reaction of the other user and the delay amount.

(13)

The information processing device according to (12), in which
the generation unit calculates the delay amount on a basis of a time stamp of content at the time of generating the reaction information, added to the reaction information indicating the reaction of the other user.

(14)

The information processing device according to any one of (1) to (13), in which
the generation unit generates a video of an object that moves according to the reaction information indicating the reaction of the other user as the presented video.

(15)

The information processing device according to any one of (1) to (14), further including:
a video superimposition unit that superimposes the presented video generated by the generation unit on a video of content received by the reception unit and sets the video as the final presented video.

(16)

The information processing device according to any one of (1) to (15), in which
the generation unit generates a voice in which a specific sound is reproduced at a timing according to the reaction information indicating the reaction of the other user as the presented voice.

(17)

The information processing device according to any one of (1) to (16), further including:
a voice superimposition unit that synthesizes the presented voice generated by the generation unit with a voice of the content received by the reception unit and sets the voice as the final presented voice.

(18)

The information processing device according to any one of (1) to (17), further including:
an output unit that presents the presented video or the presented voice.

(19)

The information processing device according to (11), in which
the generation unit determines the number of pieces of the reaction information to be selected, on a basis of a calculation resource of the own terminal.

(20)

An information processing method by an information processing device, including:
receiving reaction information indicating a reaction of another user, generated by each of a plurality of other terminals different from an own terminal; and
generating a presented video or a presented voice corresponding to the reaction of a plurality of the other users, on a basis of a plurality of pieces of the reaction information and environment information indicating an environment of the own terminal.

(21)

A program for causing a computer to execute processing including:
receiving reaction information indicating a reaction of another user, generated by each of a plurality of other terminals different from an own terminal; and
generating a presented video or a presented voice corresponding to the reaction of a plurality of the other users, on a basis of a plurality of pieces of the reaction information and environment information indicating an environment of the own terminal.

REFERENCE SIGNS LIST 11A to 11C, 11 Spectator terminal
12 Performer terminal
14 Network
41 Sensing device
51 Sensing information analysis unit
52 Transmission unit
53 Reception unit
55 Reaction video/voice generation unit
56 Video/voice superimposing unit
57 Video/voice output unit
91 Reception unit
92 Reaction video/voice generation unit
121 Period information selection unit
122 Reaction frame generation unit
123 Reaction voice generation unit
181 Delay amount calculation unit

The invention claimed is:

1. An information processing device, comprising:
a central processing unit (CPU) configured to:
receive reaction information indicating a plurality of reactions of a plurality of first users, wherein
each of a plurality of terminals generates a respective reaction of the plurality of reactions, and
each of the plurality of terminals is associated with a respective user of the plurality of first users;
calculate a delay amount of the reaction information from the plurality of terminals, wherein
the delay amount is with respect to a reference time of the information processing device associated with a second user, and
the second user is different from the plurality of first users; and
generate at least one of a presented video or a presented voice, wherein
each of the at least one of the presented video or the presented voice is generated based on a plurality of pieces of the reaction information, the delay amount, and environment information,
the plurality of pieces of the reaction information is associated with the plurality of first users, and
the environment information indicates an environment of the information processing device associated with the second user.

2. The information processing device according to claim 1, wherein:
the CPU is further configured to:
acquire sensing information from a plurality of sensors;
generate the reaction information indicating a reaction of the second user corresponding to the information processing device, based on the acquired sensing information; and
control transmission of the reaction information indicating the reaction of the second user.

3. The information processing device according to claim 2, wherein
the plurality of sensors includes at least one of a camera, a microphone, an acceleration sensor, a gyro sensor, or a geomagnetic sensor.

4. The information processing device according to claim 1, wherein
the reaction information includes period information, and the period information is based on a period of a reaction of the plurality of reactions.

5. The information processing device according to claim 1, wherein the environment information includes at least one of a video of content, a voice of content, or the reaction information indicating a reaction of the second user.

6. The information processing device according to claim 1, wherein
the CPU is further configured to generate each of the at least one of the presented video or the presented voice, based on a specific number of pieces of the reaction information from the plurality of pieces of the reaction information.

7. The information processing device according to claim 6, wherein the CPU is further configured to:
obtain at least one of tempo information or beat information from a voice of content; and
select the specific number of pieces of the reaction information, based on at least one of the tempo information or the beat information.

8. The information processing device according to claim 6, wherein
the CPU is further configured to select the specific number of pieces of the reaction information, based on specific reaction information indicating a reaction of the second user, and
the reaction information comprises the specific reaction information.

9. The information processing device according to claim 6, wherein
the CPU is further configured to select the specific number of pieces of the reaction information, based on of an analysis result of a history of the reaction information indicating the plurality of reactions of the plurality of first users.

10. The information processing device according to claim 6, wherein
the CPU is further configured to select the specific number of pieces of the reaction information, based on meta information of the reaction information indicating the plurality of reactions of the plurality of first users.

11. The information processing device according to claim 6, wherein
the CPU is further configured to dynamically change pieces of the reaction information in the specific number of pieces of the reaction information.

12. The information processing device according to claim 1, wherein the CPU is further configured to:
calculate the delay amount based on a time stamp of content indicating a time of generation of the reaction information of the plurality of first users.

13. The information processing device according to claim 1, wherein
the CPU is further configured to generate the presented video, and
the presented video is a video of an object that moves based on the reaction information indicating the plurality of reactions of the plurality of first users.

14. The information processing device according to claim 1, wherein:
the CPU is further configured to:
superimpose the presented video on a video of content, and
set the superimposed presented video as a final presented video.

15. The information processing device according to claim 1, wherein
the CPU is further configured to generate the presented voice, and
the presented voice is a voice in which a specific sound is reproduced at a timing, based on the reaction information indicating the plurality of reactions of the plurality of first users.

16. The information processing device according to claim 1, wherein:
the CPU is further configured to;
synthesize the presented voice with a voice of content; and
set the synthesized presented voice as a final presented voice.

17. The information processing device according to claim 1, wherein:
the CPU is further configured to present one of the presented video or the presented voice.

18. An information processing method by an information processing device, the information processing method comprising:
receiving reaction information indicating a plurality of reactions of a plurality of first users, wherein
each of a plurality of terminals generates a respective reaction of the plurality of reactions, and
each of the plurality of terminals is associated with a respective user of the plurality of first users;
calculating a delay amount of the reaction information from the plurality of terminals, wherein
the delay amount is with respect to a reference time of the information processing device associated with a second user, and
the second user is different from the plurality of first users; and
generating at least one of a presented video or a presented voice, wherein
each of the at least one of the presented video or the presented voice is generated based on a plurality of pieces of the reaction information, the delay amount, and environment information,
the plurality of pieces of the reaction information is associated with the plurality of first users, and
the environment information indicates an environment of the information processing device associated with the second user.

19. A non-transitory computer-readable medium having stored thereon, computer-executable instructions which, when executed by a computer of an information processing device, cause the computer to execute operations, the operations comprising:
receiving reaction information indicating a plurality of reactions of a plurality of first users, wherein
each of a plurality of terminals generates a respective reaction of the plurality of reactions, and
each of the plurality of terminals is associated with a respective user of the plurality of first users;
calculating a delay amount of the reaction information from the plurality of terminals, wherein
the delay amount is with respect to a reference time of the information processing device associated with a second user, and
the second user is different from the plurality of first users; and
generating at least one of a presented video or a presented voice, wherein
each of the at least one of the presented video or the presented voice is generated based on a plurality of pieces of the reaction information, the delay amount, and environment information, the plurality of pieces of the reaction information is associated with the plurality of first users, and the environment information indicates an environment of the information processing device associated with the second user.

* * * * *